United States Patent
Sun et al.

(10) Patent No.: US 12,267,709 B2
(45) Date of Patent: Apr. 1, 2025

(54) TECHNIQUES FOR WIDE BANDWIDTH POSITIONING IN A WIRELESS LOCAL AREA NETWORK

(71) Applicant: QUALCOMM Incorporated, San Diego, CA (US)

(72) Inventors: Yanjun Sun, San Diego, CA (US); Alireza Raissinia, Monte Sereno, CA (US); Stephen Jay Shellhammer, Ramona, CA (US); Xiaoxin Zhang, Sunnyvale, CA (US); George Cherian, San Diego, CA (US); Alfred Asterjadhi, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/722,197

(22) Filed: Apr. 15, 2022

(65) Prior Publication Data

US 2023/0337025 A1 Oct. 19, 2023

(51) Int. Cl.
*H04W 24/08* (2009.01)
(52) U.S. Cl.
CPC .................................... *H04W 24/08* (2013.01)
(58) Field of Classification Search
CPC ... H04W 24/08; H04W 28/20; H04W 64/003; H04W 72/0473; H04L 69/24;
(Continued)

(56) References Cited

U.S. PATENT DOCUMENTS 11,641,253 B2 * 5/2023 Chu ...................... H04W 28/20
370/329
2019/0261369 A1 * 8/2019 Verma ................... H04L 5/0048
(Continued)

FOREIGN PATENT DOCUMENTS

WO WO-2022212468 A1 * 10/2022 ........ H04W 72/0446
WO WO-2023090567 A1 * 5/2023 ............. H04L 27/26

OTHER PUBLICATIONS 802.11 Working Group of Lan/wan Standard Committee of the IEEE: "Telecommunications and information exchange between systems Local and metropolitan area networks-Specific requirements", Draft P802.11AZ_D4.1_Redline_compared_To_D4.0, Piscataway, NJ, USA, vol. 802.11az drafts, No. D4.1, Feb. 7, 2022, pp. 1-288, XP068191581, fig. 11-37i, 11-37n, tables 9-322h23fb p. 22, lines 18, 23 p. 43, lines 6-12 p. 44, lines 1-4 p. 45, line 1.
(Continued)

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. In some aspects, two devices may support signaling and messaging designs that support bandwidths that are greater than 160 MHz for ranging null data packets (NDPs). For example, various signaling and messaging designs may support a use of a 320 MHz bandwidth for ranging NDPs as part of a ranging measurement procedure, which may offer greater resolution than narrower bandwidths. The signaling and messaging designs may include one or more updates for a null data packet announcement (NDPA) frame, for a trigger frame, for session negation messages (such as one or both of an initial fine timing measurement (IFTM) frame and an IFTM request (IFTMR)

(Continued)

frame), for segmentation techniques for ranging NDPs, or for any combination thereof.

30 Claims, 29 Drawing Sheets

(58) Field of Classification Search
CPC ....... H04L 69/08; H04L 5/0048; G01S 7/006; H03M 13/2771
See application file for complete search history.

(56) References Cited

U.S. PATENT DOCUMENTS

| | | | |
|---|---|---|---|
| 2019/0349011 A1* | 11/2019 | Garzon Bohorquez | ................... H03M 13/2771 |
| 2020/0132857 A1* | 4/2020 | Berger | ................ H04W 64/003 |
| 2021/0288779 A1* | 9/2021 | Da Silva | ........... H04W 72/0473 |
| 2021/0409078 A1* | 12/2021 | Jeon | ........................ H04L 69/08 |
| 2021/0409181 A1* | 12/2021 | Chen | ....................... H04L 69/24 |
| 2022/0308194 A1* | 9/2022 | Zhang | ...................... G01S 7/006 |
| 2023/0319887 A1* | 10/2023 | Huang | .................. H04L 5/0053 370/329 |

OTHER PUBLICATIONS

International Search Report and Written Opinion—PCT/US2023/018084—ISA/EPO—Jul. 27, 2023.
Shellhammer S (Qualcomm): "NDP Selection for 802.11bf", 11-22-0415-02-00BF-NDP-SElection-for-802-11BF, IEEE-SA Mentor, Piscataway, NJ USA vol. 802.11bf, No. 2, Mar. 17, 2022, pp. 1-12, XP068189732, p. 3.
Wilhelmsson L (Ericsson): "Teleconference Minutes Feb.-Mar. 2022", 11-22-0345-05-00BF-Teleconference-Minutesfebruary—Mar. 2022, IEEE-SA Mentor, Piscataway, NJ USA vol. 802.11bf, No. 5, Mar. 3, 2022, 38 p. XP068189256, p. 1, line 2 p. 29, lines 35-36 p. 30, lines 1-6.

* cited by examiner

| AID11 | PartialBW Info | Reserved | Nc Index | Feedback Type and Ng | Disambig- uation | Codebook Size | Reserved |
|---|---|---|---|---|---|---|---|
| Bits: 11 | 9 | 1 | 4 | 2 | 1 | 1 | 3 |

TECHNIQUES FOR WIDE BANDWIDTH POSITIONING IN A WIRELESS LOCAL AREA NETWORK

BACKGROUND

The following relates to wireless communications, including techniques for wide bandwidth positioning in a wireless local area network (WLAN).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include one or more access points (APs) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

SUMMARY

The described techniques relate to improved methods, systems, devices, or apparatuses that support techniques for wide bandwidth positioning in a wireless local area network. Generally, the described techniques provide for signaling and messaging designs for messages associated with a ranging measurement procedure. For example, the signaling and messaging designs may support a bandwidth for ranging null data packets (NDPs) that is greater than 160 megahertz (MHz).

A method for wireless communication at a first device is described. The method may include receiving, from a second device and in a physical layer protocol data unit (PPDU) that includes a ranging null data packet announcement (NDPA) frame, an indication of a bandwidth of ranging NDPs to be used for a ranging measurement procedure between the first device and the second device, the bandwidth of the ranging NDPs being greater than 160 MHz, receiving, from the second device, a first set of one or more ranging NDPs based on the indication of the bandwidth and an indication of a presence of a puncturing pattern that is associated with the bandwidth of the ranging NDPs being greater than 160 MHz, and determining, based on measurements made of the first set of one or more ranging NDPs, a distance between the first device and the second device.

An apparatus for wireless communication at a first device is described. The apparatus may include a processor, memory coupled with the processor, and instructions stored in the memory. The instructions may be executable by the processor to cause the apparatus to receive, from a second device and in a PPDU that includes an NDPA frame, an indication of a bandwidth of ranging NDPs to be used for a ranging measurement procedure between the first device and the second device, the bandwidth of the ranging NDPs being greater than 160 MHz, receive, from the second device, a first set of one or more ranging NDPs based on the indication of the bandwidth and an indication of a presence of a puncturing pattern that is associated with the bandwidth of the ranging NDPs being greater than 160 MHz, and determine, based on measurements made of the first set of one or more ranging NDPs, a distance between the first device and the second device.

Another apparatus for wireless communication at a first device is described. The apparatus may include means for receiving, from a second device and in a PPDU that includes an NDPA frame, an indication of a bandwidth of ranging NDPs to be used for a ranging measurement procedure between the first device and the second device, the bandwidth of the ranging NDPs being greater than 160 MHz, means for receiving, from the second device, a first set of one or more ranging NDPs based on the indication of the bandwidth and an indication of a presence of a puncturing pattern that is associated with the bandwidth of the ranging NDPs being greater than 160 MHz, and means for determining, based on measurements made of the first set of one or more ranging NDPs, a distance between the first device and the second device.

A non-transitory computer-readable medium storing code for wireless communication at a first device is described. The code may include instructions executable by a processor to receive, from a second device and in a PPDU that includes an NDPA frame, an indication of a bandwidth of ranging NDPs to be used for a ranging measurement procedure between the first device and the second device, the bandwidth of the ranging NDPs being greater than 160 MHz, receive, from the second device, a first set of one or more ranging NDPs based on the indication of the bandwidth and an indication of a presence of a puncturing pattern that is associated with the bandwidth of the ranging NDPs being greater than 160 MHz, and determine, based on measurements made of the first set of one or more ranging NDPs, a distance between the first device and the second device.

In some examples of the method, apparatuses, and non-transitory computer-readable medium described herein, receiving the indication of the bandwidth of the ranging NDPs may include operations, features, means, or instructions for receiving the indication of the bandwidth via a bandwidth (BW) field in a universal signal (U-SIG) field of the PPDU.

In some examples of the method, apparatuses, and non-transitory computer-readable medium described herein, the PPDU may be an extremely high throughput multi-user PPDU (EHT MU PPDU) and the U-SIG field may be located in a physical preamble portion of the EHT MU PPDU.

In some examples of the method, apparatuses, and non-transitory computer-readable medium described herein, receiving the indication of the bandwidth of the ranging NDPs may include operations, features, means, or instructions for receiving the indication of the bandwidth via a bit in a SERVICE field of the PPDU.

In some examples of the method, apparatuses, and non-transitory computer-readable medium described herein, the PPDU may be a non-high throughput duplicate PPDU (non-HT duplicate PPDU) and the bit may be a seventh bit in the SERVICE field and may be set to a one value to indicate the bandwidth of the ranging NDPs.

Some examples of the method, apparatuses, and non-transitory computer-readable medium described herein may further include operations, features, means, or instructions for receiving, in one or more of a beacon frame, a fine timing measurement request frame, or a fine timing measurement frame, a message that indicates a configuration of the puncturing pattern for the ranging NDPs.

Some examples of the method, apparatuses, and non-transitory computer-readable medium described herein may further include operations, features, means, or instructions for receiving, in the ranging NDPA frame including the indication of the bandwidth of the ranging NDPs, a message that indicates a dynamic configuration of the puncturing pattern for the ranging NDPs.

Some examples of the method, apparatuses, and non-transitory computer-readable medium described herein may further include operations, features, means, or instructions for applying the puncturing pattern that may be associated with the bandwidth of the ranging NDPs to the first set of one or more ranging NDPs and applying a different puncturing pattern to other ranging NDPs outside of the first set of one or more ranging NDPs.

In some examples of the method, apparatuses, and non-transitory computer-readable medium described herein, the indication of the puncturing pattern that may be associated with the bandwidth may be received in an association identifier subfield of a station (STA) information field of the ranging NDPA frame and the ranging NDPA frame may be transmitted in a non-high throughput duplicate PPDU (non-HT duplicate PPDU).

Some examples of the method, apparatuses, and non-transitory computer-readable medium described herein may further include operations, features, means, or instructions for transmitting, to the second device, a second set of one or more ranging NDPs based on the bandwidth and the indication of the presence of the puncturing pattern, where determining the distance between the first device and the second device may be based on a round-trip time associated with the first set of one or more ranging NDPs and the second set of one or more ranging NDPs.

In some examples of the method, apparatuses, and non-transitory computer-readable medium described herein, the PPDU includes, in a physical layer service data unit (PSDU) portion of the PPDU, the ranging NDPA frame including an NDP announcement variant subfield, the NDP announcement variant subfield including a first bit set to a zero value and a second bit set to a one value.

Some examples of the method, apparatuses, and non-transitory computer-readable medium described herein may further include operations, features, means, or instructions for performing a radio frequency sensing based on the first set of one or more ranging NDPs to obtain channel state information of a local environment.

In some examples of the method, apparatuses, and non-transitory computer-readable medium described herein, the bandwidth of the ranging NDPs may be 320 MHz.

A method for wireless communication at a first device is described. The method may include receiving, from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, transmitting, to the second device, a first set of one or more ranging NDPs based on the indication of the bandwidth and an indication of a presence of a puncturing pattern that is associated with the bandwidth of the ranging NDPs being greater than 160 MHz, and determining, based on the first set of one or more ranging NDPs, a distance between the first device and the second device.

An apparatus for wireless communication at a first device is described. The apparatus may include a processor, memory coupled with the processor, and instructions stored in the memory. The instructions may be executable by the processor to cause the apparatus to receive, from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, transmit, to the second device, a first set of one or more ranging NDPs based on the indication of the bandwidth and an indication of a presence of a puncturing pattern that is associated with the bandwidth of the ranging NDPs being greater than 160 MHz, and determine, based on the first set of one or more ranging NDPs, a distance between the first device and the second device.

Another apparatus for wireless communication at a first device is described. The apparatus may include means for receiving, from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, means for transmitting, to the second device, a first set of one or more ranging NDPs based on the indication of the bandwidth and an indication of a presence of a puncturing pattern that is associated with the bandwidth of the ranging NDPs being greater than 160 MHz, and means for determining, based on the first set of one or more ranging NDPs, a distance between the first device and the second device.

A non-transitory computer-readable medium storing code for wireless communication at a first device is described. The code may include instructions executable by a processor to receive, from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, transmit, to the second device, a first set of one or more ranging NDPs based on the indication of the bandwidth and an indication of a presence of a puncturing pattern that is associated with the bandwidth of the ranging NDPs being greater than 160 MHz, and determine, based on the first set of one or more ranging NDPs, a distance between the first device and the second device.

In some examples of the method, apparatuses, and non-transitory computer-readable medium described herein, receiving the trigger frame may include operations, features, means, or instructions for receiving the indication of the bandwidth based on an association identifier subfield and a bandwidth (BW) subfield of a user information field in the trigger frame.

In some examples of the method, apparatuses, and non-transitory computer-readable medium described herein, receiving the trigger frame may include operations, features, means, or instructions for receiving a bit in a common information field of the trigger frame that indicates a presence of the user information field in the trigger frame, where the user information field immediately follows the common information field, and where receiving the indication of the bandwidth via the association identifier subfield of the user information field in the trigger frame may be based on the bit of the common information field indicating the presence of the user information field in the trigger frame.

In some examples of the method, apparatuses, and non-transitory computer-readable medium described herein, receiving the trigger frame may include operations, features, means, or instructions for receiving the indication of the bandwidth via one or more common information fields in the trigger frame.

In some examples of the method, apparatuses, and non-transitory computer-readable medium described herein, the indication of the bandwidth may be included in an uplink high-efficiency signal A2 reserved (UL-RE-SIG-A2 reserved) subfield and a bit of the UL-RE-SIG-A2 reserved subfield may be set to a zero value to indicate the bandwidth of the ranging NDPs.

In some examples of the method, apparatuses, and non-transitory computer-readable medium described herein, the indication of the bandwidth may be included in a common information field or in a trigger-dependent common information field and at least a bit in the common information field or in the trigger-dependent common information field may be set to a one value to indicate the bandwidth of the ranging NDPs.

In some examples of the method, apparatuses, and non-transitory computer-readable medium described herein, receiving the trigger frame may include operations, features, means, or instructions for receiving a resource unit allocation subfield of a user information field in the trigger frame that indicates the puncturing pattern.

In some examples of the method, apparatuses, and non-transitory computer-readable medium described herein, receiving the trigger frame may include operations, features, means, or instructions for receiving a user information field in the trigger frame that indicates the puncturing pattern via a field format exclusively associated with indicating the puncturing pattern.

Some examples of the method, apparatuses, and non-transitory computer-readable medium described herein may further include operations, features, means, or instructions for receiving, in one or more of a beacon frame, a fine timing measurement request frame, or a fine timing measurement frame, a message that indicates the puncturing pattern for the ranging NDPs.

Some examples of the method, apparatuses, and non-transitory computer-readable medium described herein may further include operations, features, means, or instructions for receiving, from the second device, a second set of one or more ranging NDPs based on the bandwidth and the indication of the presence of the puncturing pattern, where determining the distance between the first device and the second device may be based on a round-trip time associated with the first set of one or more ranging NDPs and the second set of one or more ranging NDPs.

In some examples of the method, apparatuses, and non-transitory computer-readable medium described herein, the bandwidth of the ranging NDPs may be 320 MHz.

A method for wireless communication at a first device is described. The method may include receiving, from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the NDPs being greater than 160 MHz, transmitting, to the second device and in accordance with the session negotiation procedure, a fine timing measurement frame that includes an acknowledgement of the bandwidth of the NDPs being greater than 160 MHz, and receiving, from the second device, a first set of one or more ranging NDPs based on the indication of the bandwidth and an indication of a presence of a puncturing pattern that is associated with the bandwidth of the ranging NDPs being greater than 160 MHz.

An apparatus for wireless communication at a first device is described. The apparatus may include a processor, memory coupled with the processor, and instructions stored in the memory. The instructions may be executable by the processor to cause the apparatus to receive, from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the NDPs being greater than 160 MHz, transmit, to the second device and in accordance with the session negotiation procedure, a fine timing measurement frame that includes an acknowledgement of the bandwidth of the NDPs being greater than 160 MHz, and receive, from the second device, a first set of one or more ranging NDPs based on the indication of the bandwidth and an indication of a presence of a puncturing pattern that is associated with the bandwidth of the ranging NDPs being greater than 160 MHz.

Another apparatus for wireless communication at a first device is described. The apparatus may include means for receiving, from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the NDPs being greater than 160 MHz, means for transmitting, to the second device and in accordance with the session negotiation procedure, a fine timing measurement frame that includes an acknowledgement of the bandwidth of the NDPs being greater than 160 MHz, and means for receiving, from the second device, a first set of one or more ranging NDPs based on the indication of the bandwidth and an indication of a presence of a puncturing pattern that is associated with the bandwidth of the ranging NDPs being greater than 160 MHz.

A non-transitory computer-readable medium storing code for wireless communication at a first device is described. The code may include instructions executable by a processor to receive, from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the NDPs being greater than 160 MHz, transmit, to the second device and in accordance with the session negotiation procedure, a fine timing measurement frame that includes an acknowledgement of the bandwidth of the NDPs being greater than 160 MHz, and receive, from the second device, a first set of one or more ranging NDPs based on the indication of the bandwidth and an indication of a presence of a puncturing pattern that is associated with the bandwidth of the ranging NDPs being greater than 160 MHz.

In some examples of the method, apparatuses, and non-transitory computer-readable medium described herein, transmitting the fine timing measurement frame may include operations, features, means, or instructions for transmitting one or both of the indication of the bandwidth and an indication of the puncturing pattern via a format and bandwidth field of the fine timing measurement frame.

In some examples of the method, apparatuses, and non-transitory computer-readable medium described herein, each value of a subset of values of the format and bandwidth field of the fine timing measurement frame corresponds to one or more of a unique bandwidth that may be greater than 160 MHz, a quantity of local oscillators associated with the unique bandwidth, and a puncturing pattern associated with the unique bandwidth.

In some examples of the method, apparatuses, and non-transitory computer-readable medium described herein, transmitting the fine timing measurement frame may include operations, features, means, or instructions for transmitting, in one or more sub-elements of the fine timing measurement frame that may be associated with the ranging measurement procedure, a sub-element that indicates the puncturing pattern.

In some examples of the method, apparatuses, and non-transitory computer-readable medium described herein, the sub-element includes an extremely high throughput (EHT) operation element of a beacon frame of a basic serving set (BSS) to which the first device belongs.

In some examples of the method, apparatuses, and non-transitory computer-readable medium described herein, the sub-element includes a format exclusively associated with indicating the puncturing pattern and the sub-element includes a bitmap to be used for indicating the puncturing pattern.

In some examples of the method, apparatuses, and non-transitory computer-readable medium described herein, transmitting the fine timing measurement frame may include operations, features, means, or instructions for transmitting, in one or more sub-elements of the fine timing measurement frame that may be associated with the ranging measurement procedure, a sub-element that indicates a transmission power envelope associated with the ranging NDPs, where a transmit power configuration indicated by the transmission power envelope may be associated with the bandwidth of the ranging NDPs being greater than 160 MHz.

Some examples of the method, apparatuses, and non-transitory computer-readable medium described herein may further include operations, features, means, or instructions for transmitting, to the second device, one or more session update messages associated with one or both of an updated bandwidth for the ranging NDPs and an updated puncturing pattern for the ranging NDPs, receiving, from the second device, a second set of one or more ranging NDPs based on the updated bandwidth and the updated puncturing pattern, and determining, based on measurements made of the second set of one or more ranging NDPs, an updated distance between the first device and the second device.

Some examples of the method, apparatuses, and non-transitory computer-readable medium described herein may further include operations, features, means, or instructions for receiving, from the second device, a second fine timing measurement request frame that indicates one or both of the updated bandwidth of the ranging NDPs and the updated puncturing pattern for the ranging NDPs based on the one or more session update messages being associated with a session termination and transmitting, to the second device, a second fine timing measurement frame that acknowledges one or both of the updated bandwidth of the ranging NDPs and the updated puncturing pattern for the ranging NDPs.

In some examples of the method, apparatuses, and non-transitory computer-readable medium described herein, transmitting the fine timing measurement frame may include operations, features, means, or instructions for transmitting the acknowledgement of one or both of the bandwidth and the puncturing pattern via a format and bandwidth field of the fine timing measurement frame.

In some examples of the method, apparatuses, and non-transitory computer-readable medium described herein, transmitting the fine timing measurement frame may include operations, features, means, or instructions for transmitting an acknowledgement of the puncturing pattern via a sub-element of one or more sub-elements of the fine timing measurement frame that may be associated with the ranging measurement procedure.

Some examples of the method, apparatuses, and non-transitory computer-readable medium described herein may further include operations, features, means, or instructions for transmitting, to the second device, a second set of one or more ranging NDPs based on the bandwidth and the puncturing pattern, where a distance between the first device and the second device may be based on a round-trip time associated with the first set of one or more ranging NDPs and the second set of one or more ranging NDPs.

In some examples of the method, apparatuses, and non-transitory computer-readable medium described herein, the bandwidth of the ranging NDPs may be 320 MHz.

In some examples of the method, apparatuses, and non-transitory computer-readable medium described herein, receiving the fine timing measurement frame may include operations, features, means, or instructions for receiving an acknowledgement of the puncturing pattern via a sub-element of one or more sub-elements of the fine timing measurement frame that may be associated with the ranging measurement procedure.

A method for wireless communication at a first device is described. The method may include generating, for a ranging measurement procedure between the first device and a second device, a sequence of pseudo-random octets associated with one or more ranging NDPs, a bandwidth of the one or more ranging NDPs being greater than 160 MHz, segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, transmitting, to the second device, the one or more ranging NDPs based on segmenting the sequence of pseudo-random octets into the set of multiple sequence segments, and determining, based on the one or more ranging NDPs, a distance between the first device and the second device.

An apparatus for wireless communication at a first device is described. The apparatus may include a processor, memory coupled with the processor, and instructions stored in the memory. The instructions may be executable by the processor to cause the apparatus to generate, for a ranging measurement procedure between the first device and a second device, a sequence of pseudo-random octets associated with one or more ranging NDPs, a bandwidth of the one or more ranging NDPs being greater than 160 MHz, segment the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, transmit, to the second device, the one or more ranging NDPs based on segmenting the sequence of pseudo-random octets into the set of multiple sequence segments, and determine, based on the one or more ranging NDPs, a distance between the first device and the second device.

Another apparatus for wireless communication at a first device is described. The apparatus may include means for generating, for a ranging measurement procedure between the first device and a second device, a sequence of pseudo-random octets associated with one or more ranging NDPs, a bandwidth of the one or more ranging NDPs being greater than 160 MHz, means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, means for transmitting, to the second device, the one or more ranging NDPs based on segmenting the sequence of pseudo-random octets into the set of multiple sequence segments, and means for determining, based on the one or more ranging NDPs, a distance between the first device and the second device.

A non-transitory computer-readable medium storing code for wireless communication at a first device is described. The code may include instructions executable by a processor to generate, for a ranging measurement procedure between the first device and a second device, a sequence of pseudo-random octets associated with one or more ranging NDPs, a bandwidth of the one or more ranging NDPs being greater than 160 MHz, segment the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, transmit, to the second device, the one or more ranging NDPs based on segmenting the sequence of pseudo-random octets into the set of multiple sequence segments, and determine, based on the one or more ranging NDPs, a distance between the first device and the second device.

In some examples of the method, apparatuses, and non-transitory computer-readable medium described herein, segmenting the sequence of pseudo-random octets into the set of multiple sequence segments may include operations, features, means, or instructions for inputting the sequence of pseudo-random octets into a segment parser to obtain a quantity of outputs equal to a quantity of the set of multiple sequence segments, where the segment parser may be based on the bandwidth and the puncturing pattern, modulating the quantity of outputs, and allocating, for each of the quantity of outputs, information of an output of the quantity of outputs to frequency domain tones of a respective sequence segment of the set of multiple sequence segments.

In some examples of the method, apparatuses, and non-transitory computer-readable medium described herein, the bandwidth may be of a first value and a sequence segment bandwidth of each of the set of multiple sequence segments may be a second value that may be evenly divisible into the first value.

In some examples of the method, apparatuses, and non-transitory computer-readable medium described herein, segmenting the sequence of pseudo-random octets into the set of multiple sequence segments may include operations, features, means, or instructions for segmenting, using the segment parser, the sequence of pseudo-random octets into four sequence segments based on the puncturing pattern corresponding to a lack of puncturing.

In some examples of the method, apparatuses, and non-transitory computer-readable medium described herein, the bandwidth of the one or more ranging NDPs may be 320 MHz and the four sequence segments may be allocated to frequency domain tones of respective 80 MHz segments of the 320 MHz.

In some examples of the method, apparatuses, and non-transitory computer-readable medium described herein, segmenting the sequence of pseudo-random octets into the set of multiple sequence segments may include operations, features, means, or instructions for segmenting, using the segment parser, the sequence of pseudo-random octets into three sequence segments based on the puncturing pattern corresponding to an 80 MHz puncturing.

In some examples of the method, apparatuses, and non-transitory computer-readable medium described herein, the bandwidth of the one or more ranging NDPs may be 320 MHz, the three sequence segments may be allocated to frequency domain tones of respective 80 MHz segments of the 320 MHz, and one 80 MHz segment of the 320 MHz may be punctured in accordance with the puncturing pattern corresponding to the 80 MHz puncturing.

In some examples of the method, apparatuses, and non-transitory computer-readable medium described herein, the bandwidth may be of a first value, a first sequence segment bandwidth of each of a first subset of the set of multiple sequence segments may be a second value that may be evenly divisible into the first value, and a second sequence segment bandwidth of each of a second subset of the set of multiple sequence segments may be a third value that may be evenly divisible into the second value.

In some examples of the method, apparatuses, and non-transitory computer-readable medium described herein, segmenting the sequence of pseudo-random octets into the set of multiple sequence segments may include operations, features, means, or instructions for segmenting, using the segment parser, the sequence of pseudo-random octets into four sequence segments based on the puncturing pattern corresponding to a 40 MHz puncturing.

In some examples of the method, apparatuses, and non-transitory computer-readable medium described herein, the bandwidth of the one or more ranging NDPs may be 320 MHz, three of the four sequence segments may be allocated to frequency domain tones of respective 80 MHz segments of the 320 MHz, and a first portion of a remaining sequence segment may be allocated to frequency domain tones of a 40 MHz segment of the 320 MHz and a second portion of the remaining sequence segment may be dropped.

Some examples of the method, apparatuses, and non-transitory computer-readable medium described herein may further include operations, features, means, or instructions for receiving, from the second device, a second set of one or more ranging NDPs based on the bandwidth and the puncturing pattern, where determining the distance between the first device and the second device may be based on a round-trip time associated with the first set of one or more ranging NDPs and the second set of one or more ranging NDPs.

In some examples of the method, apparatuses, and non-transitory computer-readable medium described herein, the one or more ranging NDPs include a packet extension field of eight microseconds based on the bandwidth of the one or more ranging NDPs being greater than 160 MHz.

A method for wireless communications is described. The method may include transmitting, to a first device from a second device and in a PPDU that includes an NDPA frame, an indication of a bandwidth of ranging NDPs to be used for a ranging measurement procedure between the first device and the second device, the bandwidth of the ranging NDPs being greater than 160 MHz, transmitting, to the first device, a first set of one or more ranging NDPs based on the indication of the bandwidth and an indication of a presence of a puncturing pattern that is associated with the bandwidth of the ranging NDPs being greater than 160 MHz, and determining, based on the first set of one or more ranging NDPs, a distance between the first device and the second device.

An apparatus for wireless communications is described. The apparatus may include a processor, memory coupled with the processor, and instructions stored in the memory. The instructions may be executable by the processor to cause the apparatus to transmit, to a first device from a second device and in a PPDU that includes an NDPA frame, an indication of a bandwidth of ranging NDPs to be used for a ranging measurement procedure between the first device and the second device, the bandwidth of the ranging NDPs being greater than 160 MHz, transmit, to the first device, a first set of one or more ranging NDPs based on the indication of the bandwidth and an indication of a presence of a puncturing pattern that is associated with the bandwidth of the ranging NDPs being greater than 160 MHz, and determine, based on the first set of one or more ranging NDPs, a distance between the first device and the second device.

Another apparatus for wireless communications is described. The apparatus may include means for transmitting, to a first device from a second device and in a PPDU that includes an NDPA frame, an indication of a bandwidth of ranging NDPs to be used for a ranging measurement procedure between the first device and the second device, the bandwidth of the ranging NDPs being greater than 160 MHz, means for transmitting, to the first device, a first set of one or more ranging NDPs based on the indication of the bandwidth and an indication of a presence of a puncturing pattern that is associated with the bandwidth of the ranging NDPs being greater than 160 MHz, and means for determining, based on the first set of one or more ranging NDPs, a distance between the first device and the second device.

A non-transitory computer-readable medium storing code for wireless communications is described. The code may include instructions executable by a processor to transmit, to a first device from a second device and in a PPDU that includes an NDPA frame, an indication of a bandwidth of ranging NDPs to be used for a ranging measurement procedure between the first device and the second device, the bandwidth of the ranging NDPs being greater than 160 MHz, transmit, to the first device, a first set of one or more ranging NDPs based on the indication of the bandwidth and an indication of a presence of a puncturing pattern that is associated with the bandwidth of the ranging NDPs being greater than 160 MHz, and determine, based on the first set of one or more ranging NDPs, a distance between the first device and the second device.

In some examples of the method, apparatuses, and non-transitory computer-readable medium described herein, transmitting the indication of the bandwidth of the ranging NDPs may include operations, features, means, or instructions for transmitting the indication of the bandwidth via a bandwidth (BW) field in a universal signal (U-SIG) subfield of the PPDU.

In some examples of the method, apparatuses, and non-transitory computer-readable medium described herein, the PPDU may be an extremely high throughput multi-user PPDU (EHT MU PPDU) and the U-SIG subfield may be located in a physical preamble portion of the EHT MU PPDU.

In some examples of the method, apparatuses, and non-transitory computer-readable medium described herein, transmitting the indication of the bandwidth of the ranging NDPs may include operations, features, means, or instructions for transmitting the indication of the bandwidth via a bit in a SERVICE field of the PPDU.

In some examples of the method, apparatuses, and non-transitory computer-readable medium described herein, the PPDU may be a non-high throughput duplicate PPDU (non-HT duplicate PPDU) and the bit may be a seventh bit in the SERVICE field and may be set to a one value to indicate the bandwidth of the ranging NDPs.

Some examples of the method, apparatuses, and non-transitory computer-readable medium described herein may further include operations, features, means, or instructions for transmitting, in one or more of a beacon frame, a fine timing measurement request frame, or a fine timing measurement frame, a message that indicates a configuration of the puncturing pattern for the ranging NDPs.

Some examples of the method, apparatuses, and non-transitory computer-readable medium described herein may further include operations, features, means, or instructions for transmitting, in the ranging NDPA frame including the indication of the bandwidth of the ranging NDPs, a message that indicates a dynamic configuration of the puncturing pattern for the ranging NDPs.

Some examples of the method, apparatuses, and non-transitory computer-readable medium described herein may further include operations, features, means, or instructions for applying the puncturing pattern that may be associated with the bandwidth of the ranging NDPs to the first set of one or more ranging NDPs and applying a different puncturing pattern to other ranging NDPs outside of the first set of one or more ranging NDPs.

In some examples of the method, apparatuses, and non-transitory computer-readable medium described herein, the indication of the puncturing pattern that may be associated with the bandwidth may be transmitted in an association identifier subfield of an STA information field of the ranging NDPA frame and the ranging NDPA frame may be transmitted in a non-high throughput duplicate PPDU (non-HT duplicate PPDU).

Some examples of the method, apparatuses, and non-transitory computer-readable medium described herein may further include operations, features, means, or instructions for receiving, from the first device, a second set of one or more ranging NDPs based on the bandwidth and the indication of the presence of the puncturing pattern, where determining the distance between the first device and the second device may be based on a round-trip time associated with the first set of one or more ranging NDPs and the second set of one or more ranging NDPs.

In some examples of the method, apparatuses, and non-transitory computer-readable medium described herein, the PPDU includes, in a physical layer service data unit (PSDU) portion of the PPDU, the ranging NDPA frame including an NDP announcement variant subfield, the NDP announcement variant subfield including a first bit set to a one value and a second bit set to a zero value.

Some examples of the method, apparatuses, and non-transitory computer-readable medium described herein may further include operations, features, means, or instructions for performing a radio frequency sensing based on the first set of one or more ranging NDPs to obtain an interference measurement of a local environment.

In some examples of the method, apparatuses, and non-transitory computer-readable medium described herein, the bandwidth of the ranging NDPs may be 320 MHz.

A method for wireless communications is described. The method may include transmitting, to a first device from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, receiving, from the first device, a first set of one or more ranging NDPs based on the indication of the bandwidth and an indication of a presence of a puncturing pattern that is associated with the bandwidth of the ranging NDPs being greater than 160 MHz, and determining, based on measurements of the first set of one or more ranging NDPs, a distance between the first device and the second device.

An apparatus for wireless communications is described. The apparatus may include a processor, memory coupled with the processor, and instructions stored in the memory. The instructions may be executable by the processor to cause the apparatus to transmit, to a first device from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, receive, from the first device, a first set of one or more ranging NDPs based on the indication of the bandwidth and an indication of a presence of a puncturing pattern that is associated with the bandwidth of the ranging NDPs being greater than 160 MHz, and determine, based on measurements of the first set of one or more ranging NDPs, a distance between the first device and the second device.

Another apparatus for wireless communications is described. The apparatus may include means for transmitting, to a first device from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, means for receiving, from the first device, a first set of one or more ranging NDPs based on the indication of the bandwidth and an indication of a presence of a puncturing pattern that is associated with the bandwidth of the ranging NDPs being greater than 160 MHz, and means for determining, based on measurements of the first set of one or more ranging NDPs, a distance between the first device and the second device.

A non-transitory computer-readable medium storing code for wireless communications is described. The code may include instructions executable by a processor to transmit, to a first device from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz, receive, from the first device, a first set of one or more ranging NDPs based on the indication of the bandwidth and an indication of a presence of a puncturing pattern that is associated with the bandwidth of the ranging NDPs being greater than 160 MHz, and determine, based on measurements of the first set of one or more ranging NDPs, a distance between the first device and the second device.

In some examples of the method, apparatuses, and non-transitory computer-readable medium described herein, transmitting the trigger frame may include operations, features, means, or instructions for transmitting the indication of the bandwidth based on an association identifier subfield and a bandwidth (BW) subfield of a user information field in the trigger frame.

In some examples of the method, apparatuses, and non-transitory computer-readable medium described herein, transmitting the trigger frame may include operations, features, means, or instructions for transmitting a bit in a common information field of the trigger frame that indicates a presence of the user information field in the trigger frame, where the user information field immediately follows the common information field, and where transmitting the indication of the bandwidth via the association identifier subfield of the user information field in the trigger frame may be based on the bit of the common information field indicating the presence of the user information field in the trigger frame.

In some examples of the method, apparatuses, and non-transitory computer-readable medium described herein, transmitting the trigger frame may include operations, features, means, or instructions for transmitting the indication of the bandwidth via one or more common information fields in the trigger frame.

In some examples of the method, apparatuses, and non-transitory computer-readable medium described herein, the indication of the bandwidth may be included in an uplink high-efficiency signal A2 reserved (UL-RE-SIG-A2 reserved) subfield and a bit of the UL-RE-SIG-A2 reserved subfield may be set to a zero value to indicate the bandwidth of the ranging NDPs.

In some examples of the method, apparatuses, and non-transitory computer-readable medium described herein, the indication of the bandwidth may be included in a common information field or in a trigger-dependent common information field and at least a bit in the common information field or in the trigger-dependent common information field may be set to a one value to indicate the bandwidth of the ranging NDPs.

In some examples of the method, apparatuses, and non-transitory computer-readable medium described herein, transmitting the trigger frame may include operations, features, means, or instructions for transmitting a resource unit allocation subfield of a user information field in the trigger frame that indicates the puncturing pattern.

In some examples of the method, apparatuses, and non-transitory computer-readable medium described herein, transmitting the trigger frame may include operations, features, means, or instructions for transmitting a user information field in the trigger frame that indicates the puncturing pattern via a field format exclusively associated with indicating the puncturing pattern.

Some examples of the method, apparatuses, and non-transitory computer-readable medium described herein may further include operations, features, means, or instructions for transmitting, in one or more of a beacon frame, a fine timing measurement request frame, or a fine timing measurement frame, a message that indicates the puncturing pattern for the ranging NDPs.

Some examples of the method, apparatuses, and non-transitory computer-readable medium described herein may further include operations, features, means, or instructions for transmitting, to the first device, a second set of one or more ranging NDPs based on the bandwidth and the indication of the presence of the puncturing pattern, where determining the distance between the first device and the second device may be based on a round-trip time associated with the first set of one or more ranging NDPs and the second set of one or more ranging NDPs.

In some examples of the method, apparatuses, and non-transitory computer-readable medium described herein, the bandwidth of the ranging NDPs may be 320 MHz.

A method for wireless communications is described. The method may include transmitting, to a first device from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the ranging NDPs being greater than 160 MHz, receiving, from the first device and in accordance with the session negotiation, a fine timing measurement frame that includes an acknowledgement of the bandwidth of the ranging NDPs being greater than 160 MHz, and transmitting, to the first device, a first set of one or more ranging NDPs based on the indication of the bandwidth and an indication of a presence of a puncturing pattern that is associated with the bandwidth of the ranging NDPs being greater than 160 MHz.

An apparatus for wireless communications is described. The apparatus may include a processor, memory coupled with the processor, and instructions stored in the memory. The instructions may be executable by the processor to cause the apparatus to transmit, to a first device from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the ranging NDPs being greater than 160 MHz, receive, from the first device and in accordance with the session negotiation, a fine timing measurement frame that includes an acknowledgement of the bandwidth of the ranging NDPs being greater than 160 MHz, and transmit, to the first device, a first set of one or more ranging NDPs based on the indication of the bandwidth and an indication of a presence of a puncturing pattern that is associated with the bandwidth of the ranging NDPs being greater than 160 MHz.

Another apparatus for wireless communications is described. The apparatus may include means for transmitting, to a first device from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the ranging NDPs being greater than 160 MHz, means for receiving, from the first device and in accordance with the session negotiation, a fine timing measurement frame that includes an acknowledgement of the bandwidth of the ranging NDPs being greater than 160 MHz, and means for transmitting, to the first device, a first set of one or more ranging NDPs based on the indication of the bandwidth and an indication of a presence of a puncturing pattern that is associated with the bandwidth of the ranging NDPs being greater than 160 MHz.

A non-transitory computer-readable medium storing code for wireless communications is described. The code may include instructions executable by a processor to transmit, to a first device from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the ranging NDPs being greater than 160 MHz, receive, from the first device and in accordance with the session negotiation, a fine timing measurement frame that includes an acknowledgement of the bandwidth of the ranging NDPs being greater than 160 MHz, and transmit, to the first device, a first set of one or more ranging NDPs based on the indication of the bandwidth and an indication of a presence of a puncturing pattern that is associated with the bandwidth of the ranging NDPs being greater than 160 MHz.

In some examples of the method, apparatuses, and non-transitory computer-readable medium described herein, receiving the fine timing measurement frame may include operations, features, means, or instructions for receiving one or both of the indication of the bandwidth and an indication of the puncturing pattern via a format and bandwidth field of the fine timing measurement frame.

In some examples of the method, apparatuses, and non-transitory computer-readable medium described herein, each value of a subset of values of the format and bandwidth field of the fine timing measurement frame corresponds to one or more of a unique bandwidth that may be greater than 160 MHz, a quantity of local oscillators associated with the unique bandwidth, and a puncturing pattern associated with the unique bandwidth.

In some examples of the method, apparatuses, and non-transitory computer-readable medium described herein, receiving the fine timing measurement frame may include operations, features, means, or instructions for receiving, in one or more sub-elements of the fine timing measurement frame that may be associated with the ranging measurement procedure, a sub-element that indicates the puncturing pattern.

In some examples of the method, apparatuses, and non-transitory computer-readable medium described herein, the sub-element includes an extremely high throughput (EHT) operation element of a beacon frame of a basic serving set (BSS) to which the first device belongs.

In some examples of the method, apparatuses, and non-transitory computer-readable medium described herein, the sub-element includes a format exclusively associated with indicating the puncturing pattern and the sub-element includes a bitmap to be used for indicating the puncturing pattern.

In some examples of the method, apparatuses, and non-transitory computer-readable medium described herein, receiving the fine timing measurement frame may include operations, features, means, or instructions for receiving, in one or more sub-elements of the fine timing measurement frame that may be associated with the ranging measurement procedure, a sub-element that indicates a transmission power envelope associated with the ranging NDPs, where a transmit power configuration indicated by the transmission power envelope may be associated with the bandwidth of the ranging NDPs being greater than 160 MHz.

Some examples of the method, apparatuses, and non-transitory computer-readable medium described herein may further include operations, features, means, or instructions for receiving, from the first device, one or more session update messages associated with one or both of an updated bandwidth for the ranging NDPs and an updated puncturing pattern for the ranging NDPs, transmitting, to the first device, a second set of one or more ranging NDPs based on the updated bandwidth and the updated puncturing pattern, and determining, based on the second set of one or more ranging NDPs, an updated distance between the first device and the second device.

Some examples of the method, apparatuses, and non-transitory computer-readable medium described herein may further include operations, features, means, or instructions for transmitting, to the first device, a second fine timing measurement request frame that indicates one or both of the updated bandwidth of the ranging NDPs and the updated puncturing pattern for the ranging NDPs based on the one or more session update messages being associated with a session termination and receiving, from the first device, a second fine timing measurement frame that acknowledges one or both of the updated bandwidth of the ranging NDPs and the updated puncturing pattern for the ranging NDPs.

In some examples of the method, apparatuses, and non-transitory computer-readable medium described herein, receiving the fine timing measurement frame may include operations, features, means, or instructions for receiving the acknowledgement of one or both of the bandwidth and the puncturing pattern via a format and bandwidth field of the fine timing measurement frame.

Some examples of the method, apparatuses, and non-transitory computer-readable medium described herein may further include operations, features, means, or instructions for receiving, from the first device, a second set of one or more ranging NDPs based on the bandwidth and the puncturing pattern, where a distance between the first device and the second device may be based on a round-trip time associated with the first set of one or more ranging NDPs and the second set of one or more ranging NDPs.

In some examples of the method, apparatuses, and non-transitory computer-readable medium described herein, the bandwidth of the ranging NDPs may be 320 MHz.

A method for wireless communications is described. The method may include generating, for a ranging measurement procedure between a first device and a second device, a sequence of pseudo-random octets associated with one or more ranging NDPs, a bandwidth of the one or more ranging NDPs being greater than 160 MHz, segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, receiving, from the first device, the one or more ranging NDPs based on segmenting the sequence of pseudo-random octets into the set of multiple sequence segments, and determining, based on measurements of the one or more ranging NDPs, a distance between the first device and the second device.

An apparatus for wireless communications is described. The apparatus may include a processor, memory coupled with the processor, and instructions stored in the memory. The instructions may be executable by the processor to cause the apparatus to generate, for a ranging measurement procedure between a first device and a second device, a sequence of pseudo-random octets associated with one or more ranging NDPs, a bandwidth of the one or more ranging NDPs being greater than 160 MHz, segment the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, receive, from the first device, the one or more ranging NDPs based on segmenting the sequence of pseudo-random octets into the set of multiple sequence segments, and determine, based on measurements of the one or more ranging NDPs, a distance between the first device and the second device.

Another apparatus for wireless communications is described. The apparatus may include means for generating, for a ranging measurement procedure between a first device and a second device, a sequence of pseudo-random octets associated with one or more ranging NDPs, a bandwidth of the one or more ranging NDPs being greater than 160 MHz, means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, means for receiving, from the first device, the one or more ranging NDPs based on segmenting the sequence of pseudo-random octets into the set of multiple sequence segments, and means for determining, based on measurements of the one or more ranging NDPs, a distance between the first device and the second device.

A non-transitory computer-readable medium storing code for wireless communications is described. The code may include instructions executable by a processor to generate, for a ranging measurement procedure between a first device and a second device, a sequence of pseudo-random octets associated with one or more ranging NDPs, a bandwidth of the one or more ranging NDPs being greater than 160 MHz, segment the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz, receive, from the first device, the one or more ranging NDPs based on segmenting the sequence of pseudo-random octets into the set of multiple sequence segments, and determine, based on measurements of the one or more ranging NDPs, a distance between the first device and the second device.

Some examples of the method, apparatuses, and non-transitory computer-readable medium described herein may further include operations, features, means, or instructions for segmenting the sequence of pseudo-random octets into the set of multiple sequence segments includes inputting the sequence of pseudo-random octets into a segment parser to obtain a quantity of pseudo-random outputs equal to a quantity of the set of multiple sequence segments, the segment parser being based on the bandwidth and the puncturing pattern and receiving the one or more ranging NDPs includes receiving, for each of the quantity of pseudo-random outputs, information of an output of the quantity of pseudo-random outputs over frequency domain tones of a respective sequence segment of the set of multiple sequence segments.

In some examples of the method, apparatuses, and non-transitory computer-readable medium described herein, the bandwidth may be of a first value and a sequence segment bandwidth of each of the set of multiple sequence segments may be a second value that may be evenly divisible into the first value.

In some examples of the method, apparatuses, and non-transitory computer-readable medium described herein, segmenting the sequence of pseudo-random octets into the set of multiple sequence segments may include operations, features, means, or instructions for segmenting, using the segment parser, the sequence of pseudo-random octets into four sequence segments based on the puncturing pattern corresponding to a lack of puncturing.

In some examples of the method, apparatuses, and non-transitory computer-readable medium described herein, the bandwidth of the one or more ranging NDPs may be 320 MHz and the four sequence segments may be allocated to frequency domain tones of respective 80 MHz segments of the 320 MHz.

In some examples of the method, apparatuses, and non-transitory computer-readable medium described herein, segmenting the sequence of pseudo-random octets into the set of multiple sequence segments may include operations, features, means, or instructions for segmenting, using the segment parser, the sequence of pseudo-random octets into three sequence segments based on the puncturing pattern corresponding to an 80 MHz puncturing.

In some examples of the method, apparatuses, and non-transitory computer-readable medium described herein, the bandwidth of the one or more ranging NDPs may be 320 MHz, the three sequence segments may be allocated to frequency domain tones of respective 80 MHz segments of the 320 MHz, and one 80 MHz segment of the 320 MHz may be punctured in accordance with the puncturing pattern corresponding to the 80 MHz puncturing.

In some examples of the method, apparatuses, and non-transitory computer-readable medium described herein, the bandwidth may be of a first value, a first sequence segment bandwidth of each of a first subset of the set of multiple sequence segments may be a second value that may be evenly divisible into the first value, and a second sequence segment bandwidth of each of a second subset of the set of multiple sequence segments may be a third value that may be evenly divisible into the second value.

In some examples of the method, apparatuses, and non-transitory computer-readable medium described herein, segmenting the sequence of pseudo-random octets into the set of multiple sequence segments may include operations, features, means, or instructions for segmenting, using the segment parser, the sequence of pseudo-random octets into four sequence segments based on the puncturing pattern corresponding to a 40 MHz puncturing.

In some examples of the method, apparatuses, and non-transitory computer-readable medium described herein, the bandwidth of the one or more ranging NDPs may be 320 MHz, three of the four sequence segments may be allocated to frequency domain tones of respective 80 MHz segments of the 320 MHz, and a first portion of a remaining sequence segment may be allocated to frequency domain tones of a 40 MHz segment of the 320 MHz and a second portion of the remaining sequence segment may be dropped.

Some examples of the method, apparatuses, and non-transitory computer-readable medium described herein may further include operations, features, means, or instructions for transmitting, to the first device, a second set of one or more ranging NDPs based on the bandwidth and the puncturing pattern, where determining the distance between the first device and the second device may be based on a round-trip time associated with the first set of one or more ranging NDPs and the second set of one or more ranging NDPs.

In some examples of the method, apparatuses, and non-transitory computer-readable medium described herein, the one or more ranging NDPs include a packet extension field of eight microseconds based on the bandwidth of the one or more ranging NDPs being greater than 160 MHz.

DETAILED DESCRIPTION

Figure 1:
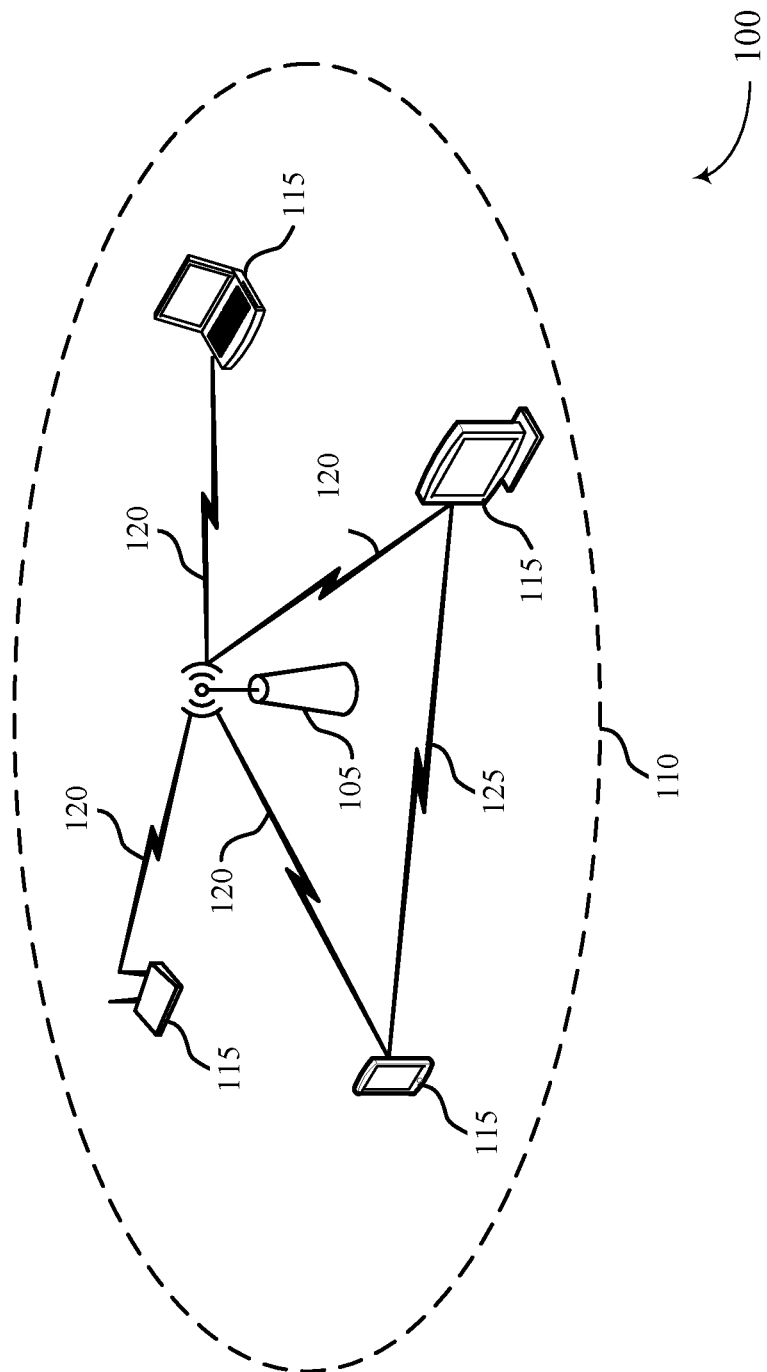
FIG. 1 shows an example of a wireless local area network (WLAN) that supports techniques for wide bandwidth positioning in a WLAN in accordance with aspects of the present disclosure.

In some wireless communications systems, such as a wireless local area networks (WLANs), two devices may attempt to determine a distance or range between each other based on measuring a round-trip time (RTT) of an exchange of one or more ranging null data packets (NDPs). An accuracy of the distance measurement may depend on a frequency range used by the two devices for the ranging NDPs. For example, the two devices may obtain a potentially relatively less accurate distance measurement if the two devices transmit the ranging NDPs using a relatively lower frequency range and may obtain a potentially relatively more accurate distance measurement if the two devices transmit the ranging NDPs using a relatively higher frequency range. In some systems, however, signaling and messaging designs may support up to 160 megahertz (MHz) for ranging NDPs and may be unable to support frequencies greater than 160 MHz due to such signaling and messaging designs, which may limit an achievable accuracy of distance measurements between the two devices.

In some implementations of the present disclosure, the devices may support signaling and messaging designs that support frequencies that are greater than 160 MHz for ranging NDPs. For example, the described techniques support various signaling and messaging designs to support a use of a 320 MHz bandwidth for ranging NDPs as part of a ranging measurement procedure, which may offer greater resolution than 160 MHz. The signaling and messaging designs may include one or more updates for a null data packet announcement (NDPA) frame (which may announce a subsequent transmission of NDPs using a 320 MHz bandwidth), for a trigger frame (which may trigger another device to begin a transmission of NDPs), for session negation messages (such as one or both of an initial fine timing measurement (IFTM) frame and an IFTM request (IFTMR) frame), for segmentation techniques for ranging NDPs, or for any combination thereof. For any one or more of such signaling and messaging designs, the designs may support one or both of an indication of a bandwidth that is greater than 160 MHz (e.g., a 320 MHz bandwidth) and an indication of a presence of a puncturing pattern associated with a bandwidth that is greater than 160 MHz. For example, the devices may support a dedicated set of puncturing patterns for NDPs sent using a bandwidth that is greater than 160 MHz and the signaling and messaging designs may support or indicate such a dedicated set of puncturing patterns.

Various aspects of the described techniques may be implemented to realize one or more advantages. For example, in accordance with supporting a bandwidth for NDPs that is greater than 160 MHz, two devices may more accurately determine a range or distance between each other, which may support greater positioning abilities of the two devices. One or both of the two devices may use such greater positioning abilities for one or more transmissions, which may increase a likelihood for successful communication between the two devices. For example, a transmitting device may set a transmission power or a beamforming configuration, among other transmission settings, in accordance with a measured distance between the two devices. As such, the two devices may experience higher data rates, greater spectral efficiency, and greater system capacity, among other benefits.

Aspects of the disclosure are initially described in the context of a wireless communications system. Aspects of the disclosure are additionally illustrated by and described with reference to message formats, segmentation diagrams, puncturing patterns, and process flows. Aspects of the disclosure are further illustrated by and described with reference to apparatus diagrams, system diagrams, and flowcharts that relate to techniques for wide bandwidth (e.g., and/or high-frequency) positioning in a WLAN.

FIG. 1 illustrates a WLAN 100 (also known as a Wi-Fi network) that supports techniques for wide bandwidth positioning in a WLAN in accordance with aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

In some wireless communications systems, such as the WLAN 100, two devices (e.g., a STA 115 and an AP 105) may attempt to determine a distance or range between each other based on measuring an RTT of an exchange of one or more ranging NDPs. An accuracy of the distance measurement may depend on a frequency range used by the two devices for the ranging NDPs. For example, the two devices may obtain a potentially relatively less accurate distance measurement if the two devices transmit the ranging NDPs using a relatively lower frequency range and may obtain a potentially relatively more accurate distance measurement if the two devices transmit the ranging NDPs using a relatively higher frequency range. In some systems, however, signaling and messaging designs may support up to 160 MHz for ranging NDPs and may be unable to support bandwidths or frequencies greater than 160 MHz due to such signaling and messaging designs, which may limit an achievable accuracy of distance measurements between the two devices. As described herein, "bandwidth" and "frequency" may be used interchangeably. For example, the term "high-frequency" may refer to or be equivalently understood as one or more of a wide bandwidth, a channel with a relatively high center frequency, or relatively frequent ranging measurements.

In some implementations of the present disclosure, the devices (e.g., the STA 115 and the AP 105) may support signaling and messaging designs that support bandwidths or frequencies that are greater than 160 MHz for ranging NDPs. For example, the described techniques support various signaling and messaging designs to support a use of a 320 MHz bandwidth for ranging NDPs as part of a ranging measurement procedure, which may offer greater resolution than 160 MHz. The signaling and messaging designs may include one or more updates for an NDPA frame (which may announce a subsequent transmission of NDPs using a 320 MHz bandwidth), for a trigger frame (which may trigger another device to begin a transmission of NDPs), for session negation messages (such as one or both of an IFTM frame and an IFTMR frame), for segmentation techniques for NDPs, or for any combination thereof. For any one or more of such signaling and messaging designs, the designs may support one or both of an indication of a bandwidth that is greater than 160 MHz (e.g., a 320 MHz bandwidth) and an indication of a presence of a puncturing pattern associated with a bandwidth that is greater than 160 MHz. For example, the devices may support a dedicated set of puncturing patterns for NDPs sent using a bandwidth that is greater than 160 MHz and the signaling and messaging designs may support or indicate such a dedicated set of puncturing patterns.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
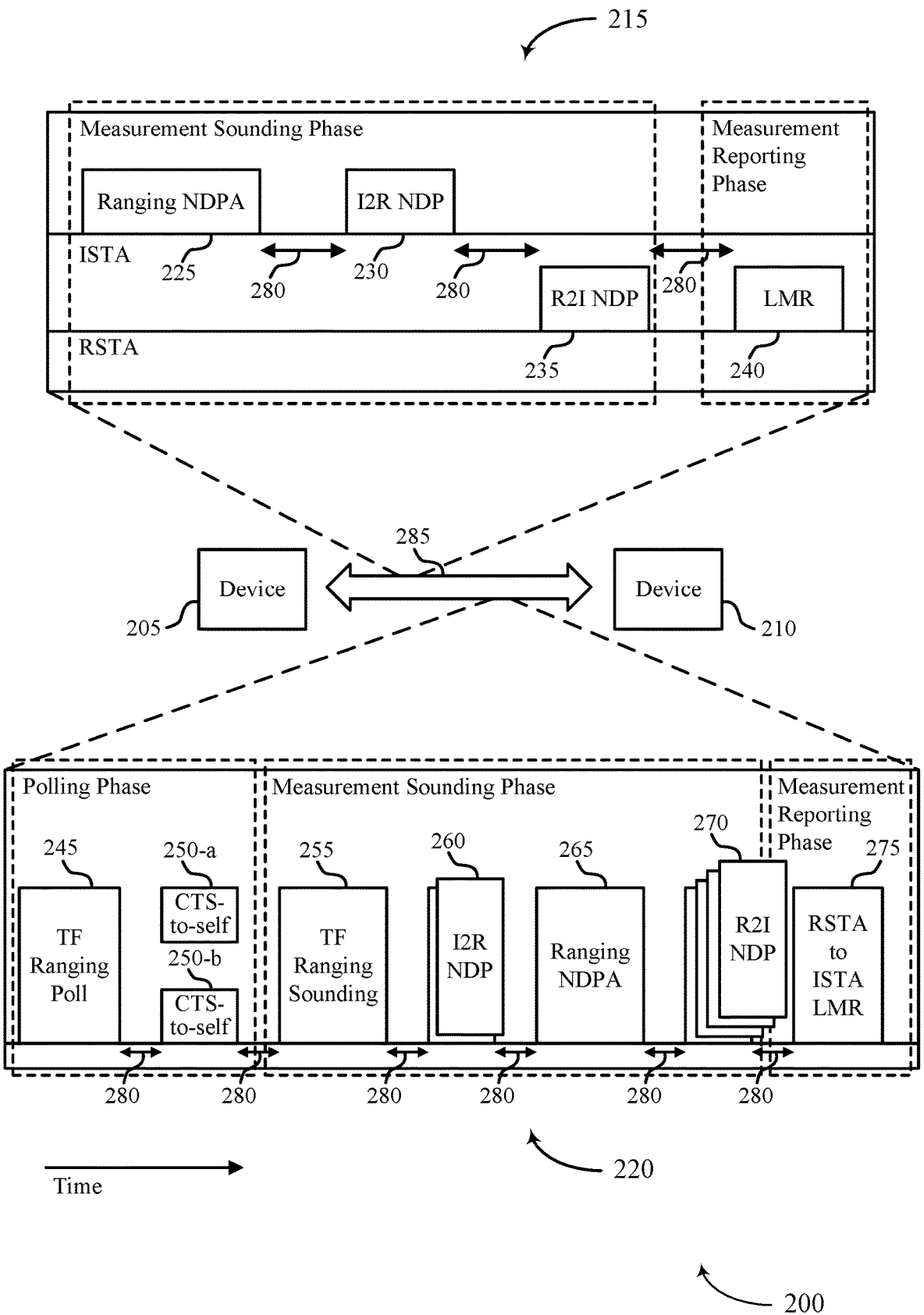
FIG. 2 shows an example of a wireless communications system that supports techniques for wide bandwidth positioning in a WLAN in accordance with aspects of the present disclosure.

FIG. 2 illustrates an example of a wireless communications system 200 that supports techniques for wide bandwidth positioning in a WLAN in accordance with one or more aspects of the present disclosure. The wireless communications system 200 may implement or be implemented to realize aspects of the WLAN 100. For example, the wireless communications system 200 illustrates communication between a device 205 and a device 210 via a communication link 285, and the device 205 and the device 210 may each be an example of a STA 115 or an AP 105 as illustrated by and described with reference to FIG. 1. In some implementations, the device 205 and the device 210 may support one or more signaling or messaging designs to support a ranging measurement procedure involving a transmission of ranging NDPs using a bandwidth that is greater than 160 MHz (e.g., a 320 MHz bandwidth, as a 320 MHz bandwidth may offer a better resolution than a 160 MHz bandwidth). In some aspects, the device 205 may be an initiating STA (ISTA) and the device 210 may be a responding STA (RSTA). Alternatively, the device 210 may be an ISTA and the device 205 may be a RSTA. Further, although referred to as an ISTA or an RSTA, such a role of ISTA or RSTA may be taken by either a STA 115 or an AP 105.

To support a ranging measurement procedure, the device 205 and the device 210 may employ a non-trigger-based (TB) ranging measurement exchange sequence 215 or a trigger-based (TB) ranging measurement exchange sequence 220. In scenarios in which the device 205 and the device 210 employ the non-TB ranging measurement exchange sequence 215, an ISTA (e.g., one of the device 205 and the device 210) may transmit a ranging NDPA frame 225 and may transmit one or more ISTA to RSTA (I2R) NDPs 230. An RSTA (e.g., the other of the device 205 and the device 210) may respond by transmitting one or more RSTA to ISTA (R2I) NDPs 235 and a location measurement report (LMR) 240. For example, the RSTA may measure an RTT associated with the I2R NDPs 230 and the R2I NDPs 235, may determine or estimate a range or distance between the ISTA and the RSTA based on the RTT, and may include an indication of the range or distance in the LMR 240. The ISTA and the RSTA may communicate the ranging NDPA frame, the one or more I2R NDPs 230, and the R2I NDPs 235 during a measurement sounding phase and may communicate the LMR 240 during a measurement reporting phase. In some aspects, the ISTA and the RSTA may wait a gap 280 between successive signaling within the non-TB ranging measurement exchange sequence 215. In some aspects, the gap 280 may be associated with a short interframe space (SIFS).

In scenarios in which the device 205 and the device 210 employ the TB ranging measurement exchange sequence 220, an RSTA may transmit a trigger frame for ranging poll 245 to one or more ISTAs and the one or more ISTAs may accordingly transmit a clear-to-send (CTS)-to-self message 250. For example, a first ISTA may transmit a CTS-to-self message 250-a and a second ISTA may transmit CTS-to-self message 250-b. In some aspects, the RSTA and the one or more ISTAs may communicate the trigger frame for ranging poll 245 and the CTS-to-self messages 250 during a polling phase. The RSTA may transmit a trigger frame for ranging sounding 255 to trigger the ranging measurement procedure between the RSTA and the one or more ISTAs. The one or more ISTAs may transmit one or more I2R NDPs 260 to the RSTA and may further transmit a ranging NDPA frame 265 and associated R2I NDPs 270 to the one or more ISTAs.

In accordance with the TB ranging measurement exchange sequence 220, the RSTA and the one or more ISTAs may support one or more waveform types to improve a reliability of the NDPs and may support scalability by point-to-multipoint measurement such that multiple STAs 115 or APs 105 can measure the distance. In other words, the device 205 and the device 210 may support a trigger-based sequence to support a multi-user (MU) deployment. In some aspects, the RSTA and the one or more ISTAs may communicate the trigger frame for ranging sounding 255, the one or more I2R NDPs 260, the ranging NDPA frame 265, and the one or more R2I NDPs 270 during a measurement sounding phase. The RSTA may transmit an RSTA to ISTA LMR 275 during a measurement reporting phase. In some aspects, each RSTA may measure an RTT associated with the at least one of the one or more I2R NDPs 260 and at least one of the one or more R2I NDPs 270, may determine or estimate a distance based on the RTT measurement. In some aspects, the RSTA and the one or more ISTAs may wait a gap 280 between successive signaling within the TB ranging measurement exchange sequence 220. In some aspects, the gap 280 may be associated with a SIFS.

In some implementations, the device 205 and the device 210 may expand one or more frames and procedures associated with a ranging measurement procedure (using either or both of the non-TB ranging measurement exchange sequence or the TB ranging measurement exchange sequence) to support 320 MHz. In some implementations, for instance, the device 205 and the device 210 may support options to indicate a 320 MHz bandwidth in one or more messages associated with a medium access control (MAC) layer. For example, the device 205 and the device 210 may support options to indicate a 320 MHz bandwidth in one or more of a ranging NDPA or a ranging trigger frame (e.g., including one or more ranging trigger frame variants, such as for polling, sounding, secure sounding, reporting, or passive sounding). Additionally, or alternatively, the device 205 and the device 210 may support options to indicate a 320 MHz bandwidth in one or more messages associated with a physical (PHY) layer. For example, the device 205 and the device 210 may use a 320 MHz bandwidth for one or more of an I2R NDP, an R2I NDP, or secure long training field (LTF).

Further, the device 205 and the device 210 may support one or more select puncturing modes or patterns associated with a bandwidth that is greater than 160 MHz (e.g., 240 MHz with contiguous bandwidth). For example, some regions may have a limited amount of bandwidth (e.g., may have 240 MHz of available bandwidth), but a bandwidth that may still offer greater accuracy than a 160 MHz bandwidth.

Accordingly, in some implementations, the device 205 and the device 210 may select which puncturing modes or patterns to support, determine how to enable ranging NDPA frames with 320 MHz, determine how to enable a trigger frame for ranging poll or sounding with 320 MHz, determine how to expand session negotiation with IFTMR or IFTM frames, determine how to expand ranging NDPs for 320 MHz, or any combination thereof.

In some implementations, the device 205 and the device 210 may support a design for a ranging NDPA frame (e.g., an NDPA enhancement) that facilitates a use of 320 MHz for ranging NDPs for a ranging measurement procedure (e.g., for a ranging measurement exchange or for ranging measurement sounding) between the device 205 and the device 210. Further, in some implementations, the device 205 and the device 210 may support design options for puncturing support associated with the use of 320 MHz for the ranging NDPs. For example, an ISTA may transmit a ranging NDPA frame via a non-high-throughput (HT) duplicate physical layer protocol data unit (PPDU), an extremely high-throughput (EHT) multi-user (MU) PPDU, or another PPDU and the PPDU may indicate 320 MHz in a PHY header of the PPDU. In examples in which the ISTA uses a non-HT duplicate PPDU, the ISTA may include an indication of 320 MHz in a SERVICE field of the PPDU. In examples in which the ISTA uses an EHT MU PPDU or another PPDU, the ISTA may include an indication of 320 MHz in a universal signal (U-SIG) field of the PPDU. Further, in some implementations, the PPDU may carry a ranging NDPA format in a physical layer service data unit (PSDU).

In some implementations, the ISTA or the RSTA may indicate a puncturing pattern (or a presence of a puncturing pattern) associated with a 320 MHz bandwidth for the ranging NDPs (or for the PPDU) via a payload of the PPDU itself (e.g., if sent in a non-HT PPDU, such as from a STA information field with a special association identifier (AID), such as an AID of 2007) or via a separate frame. Such a separate frame that may include an indication of the puncturing pattern (or a presence of the puncturing pattern) may be a beacon frame, an IFTMR frame (e.g., an extended IFTMR frame), or an IFTM frame (e.g., an extended IFTM frame). With the puncturing pattern, a receiver may be able to detect a punctured NDPA frame (or NDPs) with a narrower bandwidth (e.g., a bandwidth of 240 MHz). Further, if puncturing is used, subsequent NDPs and LMR frames may inherit a same puncturing pattern as indicated by the payload of the PPDU or the separate frame.

In an example of implementations in which the device 205 and the device 210 support a design for a ranging NDPA frame that facilitates a use of 320 MHz for ranging NDPs for a ranging measurement procedure between the device 205 and the device 210, the device 205 may receive, from the device 210 and in a PPDU that includes a ranging NDPA frame, an indication of a bandwidth of the ranging NDPA frame or associated ranging NDPs to be used for a ranging measurement procedure between the device 205 and the device 210, the bandwidth of the ranging NDPs being greater than 160 MHz. The device 205 may receive, from the device 210, a first set of one or more ranging NDPs based on the indication of the bandwidth and an indication of a presence of a puncturing pattern that is associated with the bandwidth of the ranging NDPs being greater than 160 MHz. The device 205 may determine, based on measurements of the first set of one or more ranging NDPs, a distance between the device 205 and the device 210. In some aspects, the device 205 may transmit a second set of ranging NDPs to the device 210 and determine the distance based on an RTT associated with the first set and the second set of ranging NDPs. Further, in some aspects, the device 205 may perform a radio frequency (RF) sensing based on one or more ranging NDPs to obtain channel state information (CSI) of a local environment (e.g., the device 205 may perform local RF sensing using ranging NDPs to obtain or generate, for example, any one or more of a CSI report, information associated with a CSI report, or interference measurements). Additional details relating to such a design for a ranging NDPA frame that facilitates a use of 320 MHz for ranging NDPs for a ranging measurement procedure are illustrated by and described with reference to FIGS. 3 through 5.

Additionally, or alternatively, the device 205 and the device 210 may support a design for a trigger frame (e.g., a trigger enhancement) that facilitates a use of 320 MHz for ranging NDPs for a ranging measurement procedure between the device 205 and the device 210. In some aspects, to support signaling for a ranging trigger with 320 MHz, an RSTA may set a trigger type subfield to a specific bit value (e.g., a bit value of eight) to indicate a ranging trigger and the ISTA may re-define a reserved bit in a common information field to indicate 320 MHz for the ranging trigger or the ranging NDPs. In some implementations, a transmitting device may set a specific bit value (e.g., a bit 55 or B55) to a specific value (e.g., a bit value of 0) and may include a special user information field after (e.g., immediately after) the common information field of the ranging trigger.

In some other implementations, a transmitting device may re-define a reserved bit in a common information field or in a trigger-dependent common information subfield to indicate 320 MHz for the trigger frame or the NDPs. If the reserved bit is from an uplink (UL)-RE-signal (SIG)-A2 reserved subfield, the transmitting device may set the bit to a 0 value to indicate 320 MHz. If the reserved bit is from a specific bit (e.g., a bit 63 or B63) in the common information field or from the trigger-dependent common information subfield, the transmitting device may set the bit to a 1 value to indicate 320 MHz.

Further, if the ranging trigger frame is punctured, such a design may indicate that subsequent NDPs and LMR frames are also punctured using a same puncturing pattern. In some implementations, a transmitting device may indicate a puncturing pattern via a resource unit (RU) allocation subfield of a user information field in a ranging trigger frame and, in some aspects, the user information field may use a format of an EHT variant user information field. Additionally, or alternatively, if the ranging trigger frame (or the ranging NDPs) is punctured, a transmitting device may include an indication of the puncturing pattern in a separate frame (e.g., in a beacon frame, an extended IFTMR frame, or an extended IFTM frame). Likewise, a receiving device may obtain the indication of the puncturing pattern via such a separate frame.

In an example of implementations in which the device 205 and the device 210 support a design for a trigger frame that facilitates a use of 320 MHz for ranging NDPs for ranging measurement procedure (which may be equivalently referred to as a ranging measurement exchange) between the device 205 and the device 210, the device 205 may receive, from the device 210, a trigger frame that is of a ranging trigger type and that includes an indication of a bandwidth of the trigger frame or associated ranging NDPs to be used for a ranging measurement procedure between the device 205 and the device 210, the bandwidth of the ranging NDPs being greater than 160 MHz. The device 205 may transmit, to the device 210, a first set of one or more ranging NDPs based on the indication of the bandwidth and an indication of a presence of a puncturing pattern that is associated with the bandwidth of the ranging NDPs being greater than 160 MHz. The device 205 may determine, based on the first set of one or more ranging NDPs, a distance between the device 205 and the device 210. For example, the device 205 may receive a second set of one or more ranging NDPs from the device 210 and may determine the distance based on an RTT associated with the first and second sets of one or more ranging NDPs. Additional details relating to such a design for a trigger frame that facilitates a use of 320 MHz for ranging NDPs for a ranging measurement procedure are illustrated by and described with reference to FIGS. 6 and 7.

Additionally, or alternatively, the device 205 and the device 210 may support a design for one or more session negotiation messages (e.g., a session negotiation enhancement) that facilitates a use of 320 MHz for ranging NDPs for a ranging measurement procedure between the device 205 and the device 210. For example, the device 205 and the device 210 may expand a fine timing measurement procedure negotiation to support a 320 MHz bandwidth and puncturing associated with a 320 MHz bandwidth between an ISTA and an RSTA. In some implementations, the device 205 and the device 210 may support or define entries in a format and bandwidth field of the IFTMR and IFTM frames to support an indication of a 320 MHz bandwidth and an indication of an associated puncturing pattern. Additionally, or alternatively, the device 205 and the device 210 may support one or more ranging sub-elements of the IFTMR or IFTM frames, or both, to support one or both of an indication of a 320 MHz bandwidth and an indication of an associated puncturing pattern.

Further, in some implementations, an ISTA may support a rule according to which the ISTA may learn of a puncturing pattern that is announced by an RSTA in one or more beacon frames (which may be referred to as static puncturing pattern hereafter) if the RSTA is an AP 105 and signal an entry in a format and bandwidth field or include information in a ranging sub-element in accordance with the learned static puncturing pattern. The device 205 and the device 210 may support a rule associated with a bandwidth or puncturing pattern change in a middle of a negotiated session. For example, an ISTA or an RSTA may initiate a session termination or a session modification to indicate a peer (e.g., to force a peer) to learn a new or updated puncturing pattern. The ISTA or the RSTA may exchange ranging NDPs according to the updated puncturing pattern and determine an updated distance accordingly.

In an example of implementations in which the device 205 and the device 210 support a design for one or more session negotiation messages that facilitates a use of 320 MHz for ranging NDPs for a ranging measurement procedure between the device 205 and the device 210, the device 205 may receive, from the device 210 and in accordance with a session negotiation procedure between the device 205 and the device 210, a fine timing measurement (FTM) request frame that includes an indication of a bandwidth of ranging NDPs to be used for a ranging measurement procedure between the device 205 and the device 210, the bandwidth of the ranging NDPs being greater than 160 MHz. The device 205 may transmit, to the device 210 and in accordance with the session negotiation procedure, an FTM frame that includes an acknowledgement of the bandwidth of the ranging NDPs being greater than 160 MHz. Accordingly, the device 205 may receive, from the device 210, a first set of one or more ranging NDPs based on the indication of the bandwidth and an indication of a presence of a puncturing pattern that is associated with the bandwidth of the ranging NDPs being greater than 160 MHz. Additional details relating to such a design for one or more session negotiation messages that facilitates a use of 320 MHz for ranging NDPs for a ranging measurement procedure are illustrated by and described with reference to FIGS. 8 and 9.

Additionally, or alternatively, the device 205 and the device 210 may support a design for one or more ranging NDPs (e.g., ranging NDP enhancements) that facilitates a use of 320 MHz for the ranging NDPs for a ranging measurement procedure between the device 205 and the device 210. For example, the device 205 and the device 210 may support secure ranging (e.g., using secure HE-LTFs) and, to support secure ranging, may use a counter mode in the PHY layer to generate a pseudo random sequence of octets at both a transmitter and a receiver. For secure NDPs, the transmitting device may use a segment parser to parse secure octets between lower and upper segments and, in some implementations, the transmitting device may extend such a segment parser to support 320 MHz secure NDPs.

In some implementations, for example, the device 205 and the device 210 may expand a segment parser to handle a 320 MHz bandwidth with and without puncturing. In some aspects, for instance, the device 205 and the device 210 may employ a four-way segment parser for 320 MHz without puncturing. Additionally, or alternatively, the device 205 and the device 210 may support a three-way segment parser for 320 MHz with one 80 MHz sub-block punctured. The device 205 and the device 210 may employ such four-way and three-way segment parsers for 320 MHz to parse segments in the frequency order (e.g., such that sub-blocks or segments of an NDP are ordered from a relatively highest frequency allocation to a relatively lowest frequency allocation) to maintain simplicity and to support backward compatibility. In some aspects, the device 205 and the device 210 may expand that concept to other puncturing patterns, such as for a 200 MHz or 280 MHz occupied bandwidth after puncturing. For example, the device 205 and the device 210 may employ a modified four-way segment parser to support 40 MHz puncturing for 320 MHz ranging NDPs.

In an example of implementations in which the device 205 and the device 210 support a design for one or more ranging NDPs that facilitates a use of 320 MHz for the ranging NDPs for a ranging measurement procedure between the device 205 and the device 210, the device 205 may generate, for a ranging measurement procedure between the device 205 and the device 210, a sequence of pseudo random octets associated with one or more ranging NDPs, a bandwidth of the one or more ranging NDPs being greater than 160 MHz. The device 205 may segment the sequence of pseudo random octets into multiple sequence segments based on the bandwidth of the one or more ranging NDPs and an indication of a presence of a puncturing pattern that is associated with the bandwidth of the one or more ranging NDPs being greater than 160 MHz. The device 205 may transmit, to the device 210, the one or more ranging NDPs based on segmenting the sequence of pseudo-random octets into the multiple sequence segments and may determine a distance between the device 205 and the device 210 based on the one or more ranging NDPs. For example, the device 205 may transmit, to the device 210, another set of one or more ranging NDPs and may determine the distance based on an RTT associated with the different sets of ranging NDPs. Additional details relating to such a design for one or more ranging NDPs that facilitates a use of 320 MHz for the ranging NDPs for a ranging measurement procedure are illustrated by and described with reference to FIGS. 10 through 14.

Figure 3:
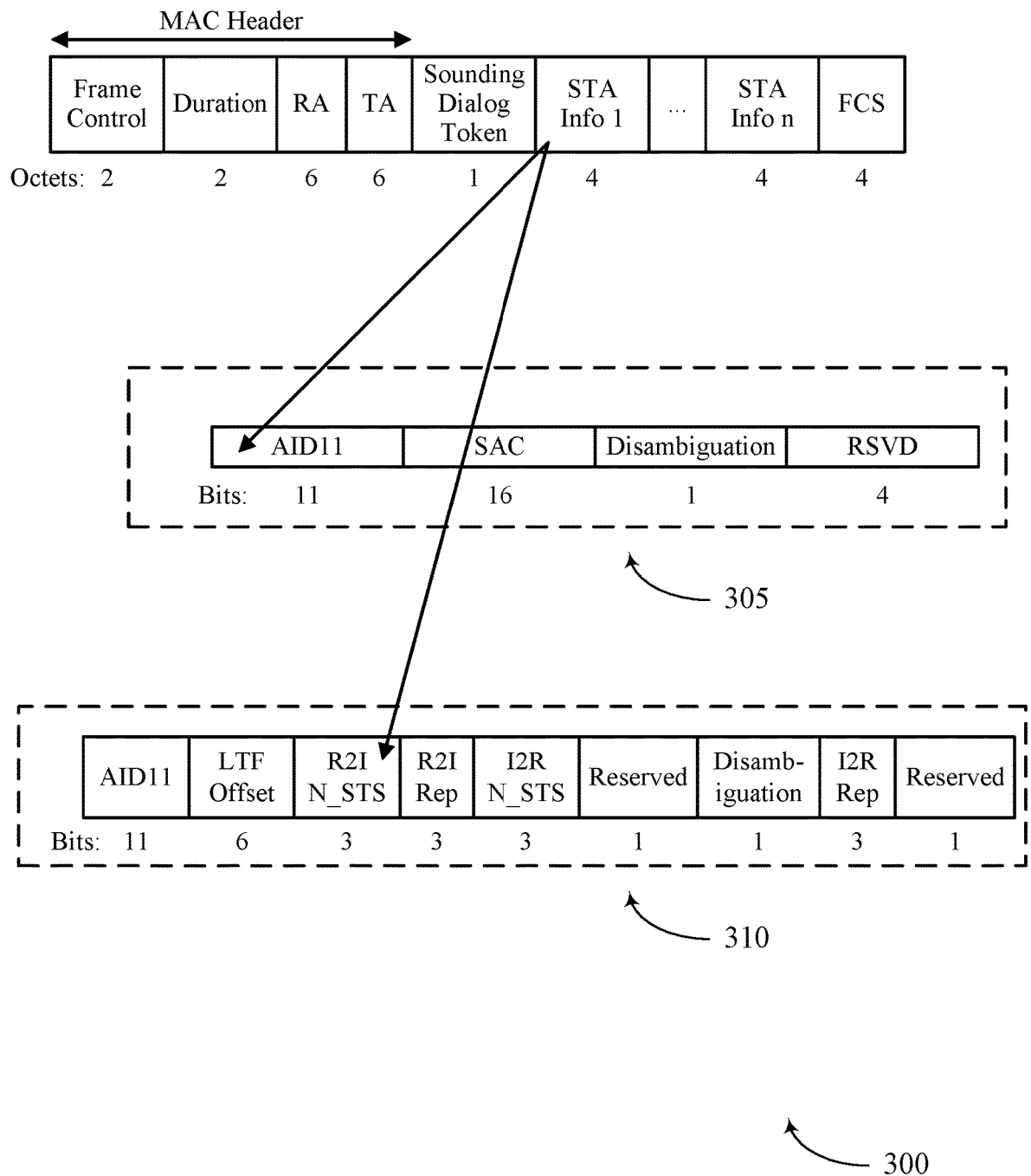
FIG. 3 shows an example of a ranging null data packet announcement (NDPA) frame that supports techniques for wide bandwidth positioning in a WLAN in accordance with aspects of the present disclosure.

FIG. 3 shows an example of a ranging NDPA frame 300 that supports techniques for wide bandwidth positioning in a WLAN in accordance with one or more aspects of the present disclosure. The ranging NDPA frame 300 may be associated with a specific format or design and may include a number of fields. The ranging NDPA frame 300 may include a MAC header portion and each field of the ranging NDPA frame 300 may include a quantity of octets (e.g., a set of eight bits). In some implementations, the device 205 and the device 210 may communicate (e.g., transmit or receive) the ranging NDPA frame 300 (which may be an example of the ranging NDPA frame 225 or the ranging NDPA frame 265 as illustrated by and described with reference to FIG. 2) and may include, in a PPDU that carries the ranging NDPA frame 300, an indication of a bandwidth for ranging NDPs that is greater than 160 MHz (e.g., a 320 MHz bandwidth). In some aspects, the PPDU that carries the ranging NDPA frame may further include an indication of a puncturing pattern associated with a 320 MHz bandwidth or an indication of a presence (such as a presence in other signaling) of a puncturing pattern associated with a 320 MHz bandwidth).

The ranging NDPA frame 300 may include a frame control field, a duration field, a receiver address (RA) field, a transmitter address (TA) field, a sounding dialog token field, a set of one or more STA information fields, and a frame check sequence (FCS) field. In some aspects, the ranging NDPA frame 300 may include or otherwise be associated with a set of subfields 305 or a set of subfields 310, or both. For example, a STA information field (e.g., the STA Info 1 field) may include or otherwise be associated with the set of subfields 305 including an AID11 subfield, a secure authentication code (SAC) subfield, a disambiguation subfield, and a reserved (RSVD) subfield. Additionally, or alternatively, a STA information field (e.g., the STA Info 1 field) may include or otherwise be associated with the set of subfields 310 including an AID subfield, an LTF offset subfield, an R2I N_STS subfield, an R2I Rep subfield, an I2R N_STS subfield, a first reserved subfield, a disambiguation subfield, an I2R Rep subfield, and a second reserved subfield.

In some aspects, a STA information field (e.g., the STA Info 1 field) may be include or be associated with such various additional fields and may indicate or link to (e.g., point to or provide information for) an AID11 field or an R2I N_STS field, or both. In some aspects, a specific format of a STA information field included in the ranging NDPA frame 300 may include the set of subfields 305 if the AID11 subfield is 2043. Additionally, or alternatively, a specific format of a STA information field included in the ranging NDPA frame 300 may include the set of subfields 310 if the AID11 subfield is less than 2008 (e.g., #3222, #3010, or #3882).

Further the sounding dialog token field may include information associated with a variant encoding of the ranging NDPA frame. For example, a first bit (e.g., a B1) and a second bit (e.g., a B0) in the sounding dialog token field may indicate an NDPA announcement frame variant in accordance with Table 1, shown below. As such, ranging NDPA frame 300 may include the first bit as a zero value (e.g., B1=0) and the second bit as a one value (e.g., B0=1) to indicate to a receiving device that the ranging NDPA frame 300 is for a ranging sounding procedure.

TABLE 1

NDPA Frame Variant Encoding

| NDPA Variant Subfield (#5787) | | |
|---|---|---|
| B1 | B0 | NDPA Frame Variant |
| 0 | 0 | VHT NDPA Frame |
| 0 | 1 | Ranging NDPA Frame |
| 1 | 0 | HE NDPA Frame |
| 1 | 1 | EHT NDPA Frame |

Figure 4:
FIG. 4 shows an example of a station (STA) information field that supports techniques for wide bandwidth positioning in a WLAN in accordance with aspects of the present disclosure.

FIG. 4 illustrates an example of a STA information field 400 that supports techniques for wide bandwidth positioning in a WLAN in accordance with one or more aspects of the present disclosure. The STA information field 400 may be associated with a STA information field format in an EHT NDPA frame. In some implementations, the device 205 or the device 210 may include an indication of 320 MHz in a ranging NDPA frame and may include the indication in one or more of various places or fields in the ranging NDPA frame based on whether the ranging NDPA frame is included in an EHT MU PPDU or a non-HT duplicate PPDU. In some aspects, the STA information field 400 may include an AID11 subfield, a PartialBW Info subfield, a first reserved subfield, an Nc index subfield, a feedback type and Ng field, disambiguation field, a codebook size field, and a second reserved field.

In implementations in which the indication is included in an EHT MU PPDU (e.g., an EHT NDPA), a PHY header of the PPDU may indicate 320 MHz. For example, a transmitting device may set one or more bits in the PHY header to a specific value or set of values to indicate 320 MHz for the ranging NDPA frame or for subsequent NDPs, or both. In implementations in which the indication is included in a non-HT duplicate PPDU, a SERVICE field may indicate 320 MHz. For example, the SERVICE field may include a number of bits and a transmitting device may set a bit 7 (e.g., B7) of the SERVICE field to a one value to indicate 320 MHz in EHT NDPA frame. In some aspects, the B7 in the SERVICE field may be set to a one value to indicate 320 MHz in EHT NDPA if a CH_BANDWIDTH_IN_NON_HT parameter in a TXVECTOR primitive is present and is equal to CBW320. In some aspects, a remaining eight bits of the SERVICE field may be reserved for other uses or other indications. Further, the B7 in the SERVICE field may be set to a one value to indicate 320 MHz in EHT NDPA if a bandwidth or puncturing for compressed beamforming (CBF) from each STA can be further indicated in the partial BW information subfield (e.g., the PartialBW Info subfield in the STA information field 400).

Figure 5:
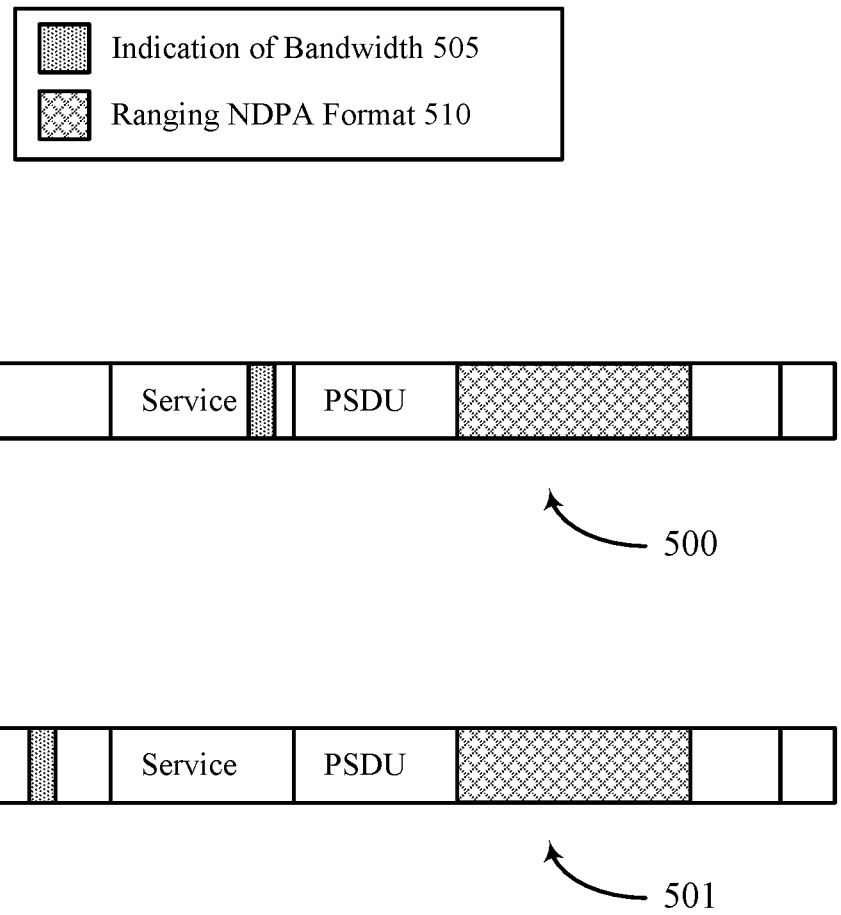
FIG. 5 shows examples of ranging NDPA frames that support techniques for wide bandwidth positioning in a WLAN in accordance with aspects of the present disclosure.

FIG. 5 shows an example of ranging NDPA frames 500 and 501 that supports techniques for wide bandwidth positioning in a WLAN in accordance with one or more aspects of the present disclosure. The ranging NDPA frames 500 and 501 each may include a PHY preamble portion, a service field portion (e.g., a SERVICE field), and a PSDU portion.

In some implementations, the device 205 and the device 210 may use one of the ranging NDPA frames 500 or 501 to indicate 320 MHz for the ranging NDPA frames 500 or 501 or for one or more ranging NDPs (e.g., via an indication of bandwidth 505). In some aspects, the ranging NDPA frames 500 and 501 may leverage a ranging NDPA format 510 (e.g., a ranging NDPA frame as illustrated by and described with reference to FIG. 3) and may maintain a ranging NDPA MAC content as compared to other ranging NDPA frame formats. In some implementations, a transmitting device may include the ranging NDPA frame 500 in a non-HT duplicate PPDU and, in such implementations, may include the indication of the bandwidth 505 in the SERVICE field. For example, the transmitting device may set B7 in the SERVICE field to 1 to indicate 320 MHz. In some other implementations, a transmitting device may include the ranging NDPA frame 501 in an EHT MU PPDU and, in such implementations, may include the indication of the bandwidth 505 in the PHY header (e.g., the PHY preamble). For example, the transmitting device may set the PHY header to indicate 320 MHz. In such examples, the transmitting device may set a BW field in a U-SIG field to indicate 320 MHz.

Further, in some implementations, the device 205 and the device 210 may support a puncturing pattern associated with 320 MHz. The puncturing pattern may be associated with a static puncturing pattern (e.g., a puncturing pattern indicated in a beacon frame) or a dynamic puncturing pattern (e.g., a puncturing pattern that may change in each transmission opportunity (TXOP)). For 320 MHz puncturing with static puncturing, a ranging NDPA frame may indicate 320 MHz via an EHT preamble or via a B7 for non-HT and other signaling (e.g., one or more of a beacon frame, IFTMR frame, or an IFTM frame) may indicate which puncturing pattern (e.g., which puncturing pattern that is associated with a 320 MHz bandwidth) to use. For example, a PPDU that carries a ranging NDPA frame may indicate the 320 MHz bandwidth and a beacon frame, an IFTMR frame, or an IFTM frame may indicate the puncturing pattern (such that a combination of the PPDU and the beacon frame, the IFTMR frame, or the IFTM frame indicates the occupied subchannels for a punctured NDPA).

For 320 MHz with dynamic puncturing (e.g., for a non-HT duplicate PPDU), a transmitting device may use a reserved AID (e.g., 2007) to indicate a puncturing pattern or bandwidth information, or both. In other words, the transmitting device may use a special AID to indicate that format of a given STA information field in a NDPA frame is re-defined to carry one or both of puncturing information and bandwidth information. The special AID may be placed anywhere in a STA information list. In some aspects, the special AID may be placed in a STA Info 1 field to indicate the puncturing information or the bandwidth information, or both, relatively earlier in the PPDU. As such, puncturing information may be self-contained within the PPDU carrying the ranging NDPA frame.

Figure 6:
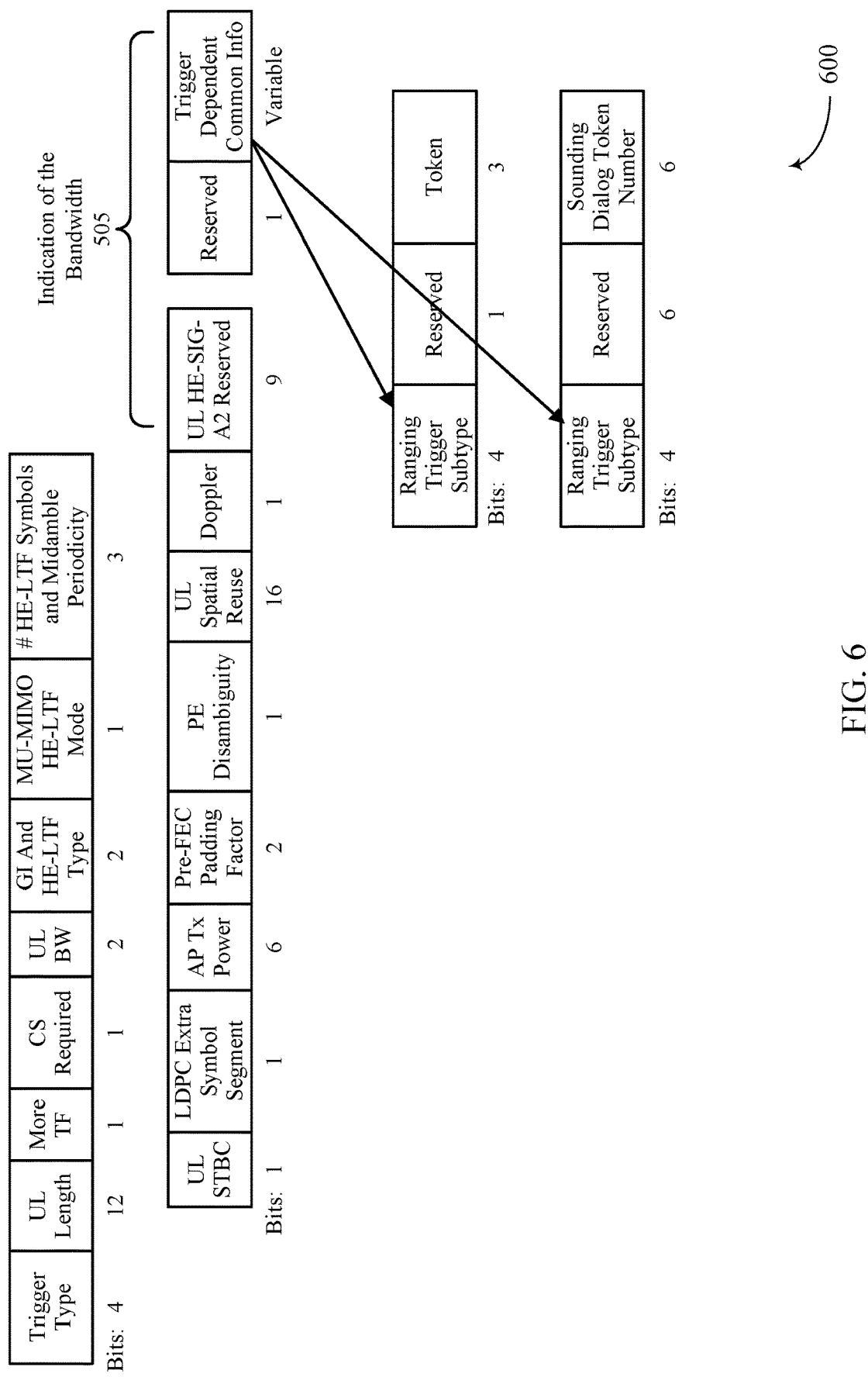
FIGS. 6 and 7 show examples of ranging trigger frames that support techniques for wide bandwidth positioning in a WLAN in accordance with aspects of the present disclosure.

FIG. 6 shows an example of a ranging trigger frame 600 that supports techniques for wide bandwidth positioning in a WLAN in accordance with one or more aspects of the present disclosure. The ranging trigger frame 600 may include a number of different fields and the device 205 and the device 210 may communicate (e.g., transmit or receive) the ranging trigger frame 600 to initiate a ranging sounding procedure. For example, the ranging trigger frame 600 may be an example of a trigger frame for ranging sounding 255 as illustrated by and described with reference to FIG. 2. In some implementations, the device 205 and the device 210 may support a design or format of the ranging trigger frame 600 to support a 320 MHz bandwidth for the ranging trigger frame 600 or for one or more associated NDPs.

In some aspects, the ranging trigger frame 600 may include a trigger subtype field associated with indicating a purpose or variant of the ranging trigger frame 600. For example the trigger type subfield may include four bits and, thus, may be associated with 16 different bit values or permutations of the four bits. In some aspects, different trigger type subfield values may correspond to different trigger frame variants in accordance with Table 2, shown below. In accordance with the mapping shown by Table 2, which may be configured at both the device 205 and the device 210, a trigger type subfield value of eight may indicate that the ranging trigger frame 600 is for ranging.

TABLE 2

Trigger Type Subfield Encoding

| Trigger Type Subfield Value | Trigger Frame Variant |
| --- | --- |
| 8 | Ranging |
| 9-15 | Reserved |

The ranging trigger frame 600 may further include an UL length field, a more TF field, a carrier sense (CS) required field, an UL BW field, a guard interval (GI) and HE-LTF type field, an MU-multiple input multiple output (MU-MIMO) HE-LTF mode field, a number of HE-LTF symbols and midamble periodicity field, an UL space time block coding (STBC) field, a low density parity check (LDPC) extra symbol segment field, an AP transmit (Tx) power field, a pre-FEC padding factor field, a packet extension (PE) disambiguity field, an UL spatial reuse field, a Doppler field, an UL HE-signal (SIG)-A2 reserved field, a reserved field, and a trigger-dependent common information field.

In some aspects, the trigger-dependent common information field may include or otherwise be associated with (e.g., point to or provide information for) a first set of subfields including a ranging trigger subtype field, a reserved field, and a token field (e.g., for a trigger dependent common information subfield format for the ranging trigger variant, such as #1888) or a second set of subfields including a ranging trigger subtype field, a reserved field, and a sounding dialog token number field (e.g., for a trigger dependent common information subfield format of the passive sounding ranging trigger frame, such as #3015 or #5006). In some aspects, a ranging trigger subtype subfield may indicate a bit value that corresponds to a specific ranging trigger frame subvariant. For example, a ranging trigger subtype subfield may indicate different values that correspond to different variants in accordance with Table 3, shown below.

TABLE 3

Ranging Trigger Subtype Subfield Encoding

| Ranging Trigger Subtype Subfield Value | Ranging Trigger Frame Subvariant |
| --- | --- |
| 0 | Poll |
| 1 | Sounding |
| 2 | Secure Sounding |
| 3 | Report |
| 4 | Passive Sounding (#2284, #5006, #5235) |
| 5-15 | Reserved |

In some implementations, the device 205 and the device 210 may re-define a reserved bit in the common information field of the ranging trigger frame 600 to include an indication of the bandwidth 505 that is greater than 160 MHz. For example, the common information field of the ranging trigger frame 600 may indicate 320 MHz. As such, the device 205 and the device 210 may re-define one or more of the reserved bits from any of a set of subfields including the UL-RE-SIG-A2 reserved field, the reserved field, and the trigger-dependent common information field.

Figure 7:
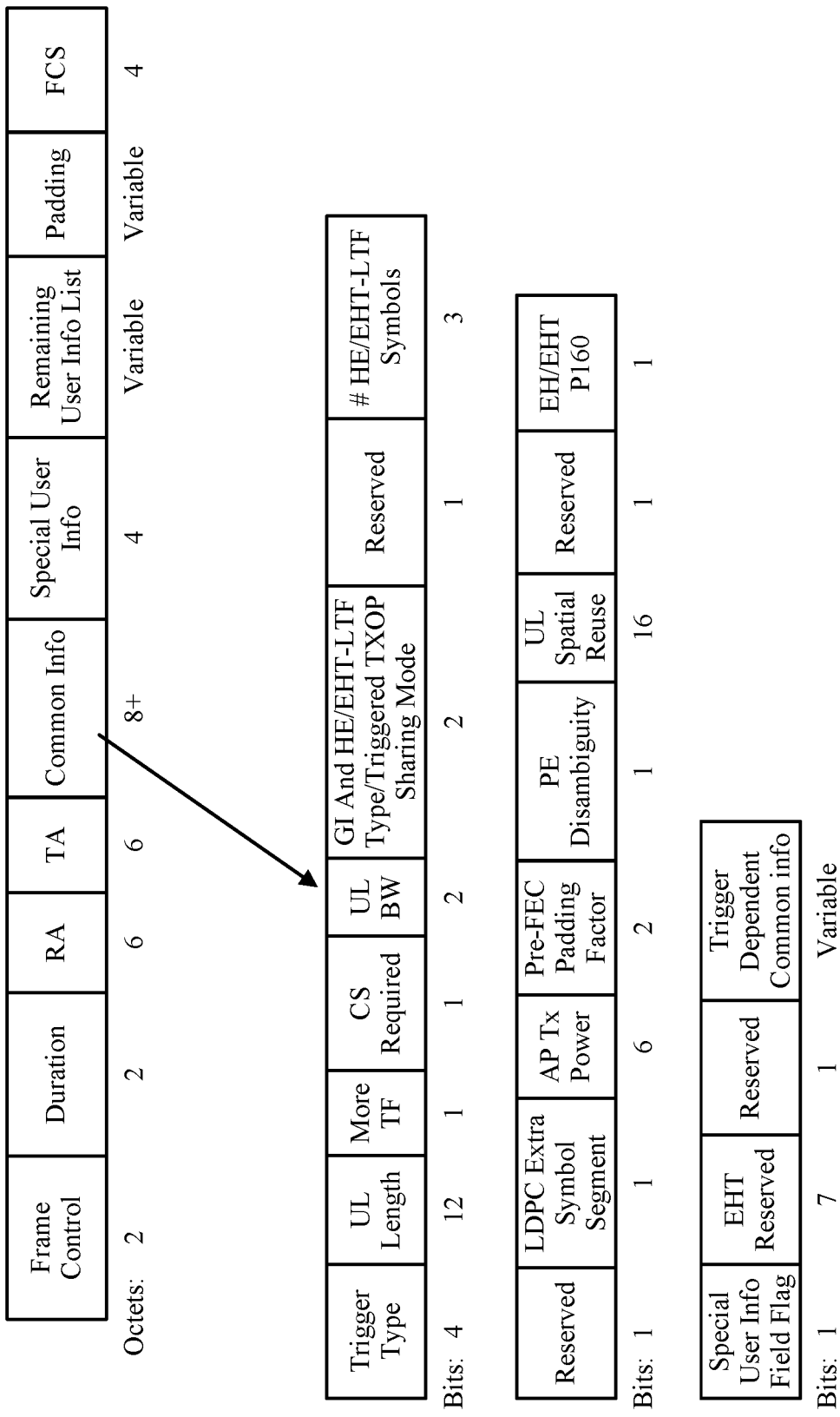

FIG. 7 shows an example of a ranging trigger frame 700 that supports techniques for wide bandwidth positioning in a WLAN in accordance with one or more aspects of the present disclosure. The ranging trigger frame 700 may include a number of different fields and the device 205 and the device 210 may communicate (e.g., transmit or receive) the ranging trigger frame 700 to initiate a ranging sounding procedure. For example, the ranging trigger frame 700 may be an example of a trigger frame for ranging sounding 255 as illustrated by and described with reference to FIG. 2. In some implementations, the ranging trigger frame 700 may support a 320 MHz indication based on 320 MHz indication defined for an EHT trigger and may use one or more fields to support the 320 MHz indication.

The ranging trigger frame 700 may include a frame control field, a duration field, an RA field, a TA field, a command information field, a special user information, AID12 field, a remaining user information list field, a padding field, and an FCS field. The special user information field, if present, may be a same size as an HE user information field.

The common information field may include or otherwise be associated with (e.g., point to or provide information for) a set of one or more subfields. The set of one or more subfields may include (e.g., for an EHT variant common information field format, such as #4104) a trigger type field, an uplink length field, a CS required field, an UL BW field, a GI and HE/EHT-LTF type/triggered transmit opportunity (TXOP) sharing mode field, a first reserved field, a number of HE/EHT-LTF symbols field, a second reserved field, an LDCP extra symbol segment field, an AP Tx power field, a pre-FEC padding factor field, a PE disambiguity field, an UL spatial reuse field, a third reserved field, an EH/EHT P160 field, a special user information field flag, an EHT reserved field, a fourth reserved field, and a trigger-dependent common information field.

In some aspects, the common information field in the ranging trigger frame 700 may indicate or point to the UL BW field and the special user information (e.g. identified by AID12 field equal to 2007) to indicate a bandwidth of greater than 160 MHz, and the device 205 and the device 210 may use such information along with Table 4, shown below, for a mapping associated with an uplink bandwidth extension subfield encoding.

TABLE 4

UL BW Extension Subfield Encoding

| UL BW | Bandwidth for HE TB PPDU (MHz) | UL Bandwidth Extension | Bandwidth for EHT TB PPDU (MHz) |
|---|---|---|---|
| 3 | 160 | 2 | 320-1 |
| 3 | 160 | 3 | 320-2 |

In some implementations, the device 205 and the device 210 may support a special user information field in the ranging trigger frame 700 to indicate 320 MHz for the ranging trigger frame 700 (or for subsequent ranging NDPs). For example, a transmitting device may set a trigger type subfield to 8 to indicate the ranging variant for the ranging trigger frame 700, may set a bit (e.g., bit 55 or B55) of the common information field to a specific value (e.g., a zero value) to indicate a presence of the following special user information field, and may use the special user information field to indicate a 320 MHz bandwidth for one or both of the ranging trigger frame 700 and any associated (e.g., triggered) ranging NDPs.

Figure 8:
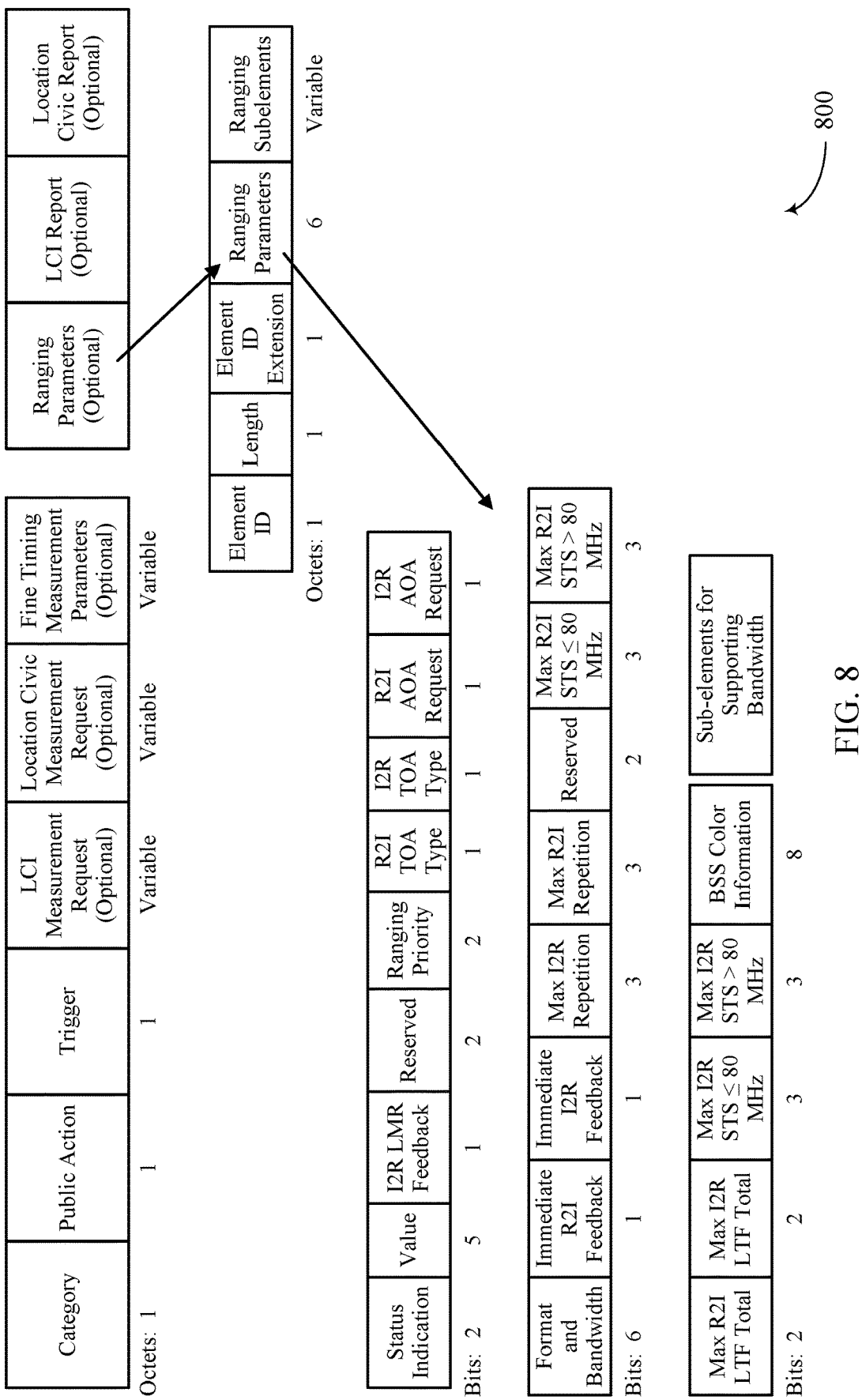
FIG. 8 shows an example of an initial fine timing measurement request (IFTMR) frame that supports techniques for wide bandwidth positioning in a WLAN in accordance with aspects of the present disclosure.

FIG. 8 shows an example of an IFTMR frame 800 that supports techniques for wide bandwidth positioning in a WLAN in accordance with one or more aspects of the present disclosure. The IFTMR frame 800 may include a number of different fields and the device 205 and the device 210 may communicate (e.g., transmit or receive) the IFTMR frame 800 to negotiate a ranging sounding procedure. For example, the device 205 and the device 210 may exchange the IFTMR frame 800 prior to a ranging sounding procedure. In some implementations, the IFTMR frame 800 may support a 320 MHz indication and may use one or more fields to support the 320 MHz indication.

The IFTMR frame 800 may include (e.g., for a fine timing measurement request frame action field) a category field, a public action field, a trigger field, a location configuration information (LCI) measurement request field, a location civic measurement request field, a fine timing measurement parameters field, a ranging parameters field, an LCI report field, and a location civic report field. The IFTMR frame 800 may further include or otherwise be associated with one or more other fields or subfields, as illustrated in FIG. 8 (e.g., for ranging parameters field format). In some aspects, the ranging parameters field may include or point to a set of one or more subfields including a format and bandwidth field and, in some implementations, one or more sub-elements for supporting a bandwidth that is greater than 160 MHz. For example, such one or more sub-elements may be for bandwidth-related information. Table 5 may provide additional information associated with such ranging parameters field format.

TABLE 5

Element IDs

| Element | Element ID | Element ID Extension | Extensible | Fragmentable |
|---|---|---|---|---|
| Fine timing measurement parameters | 206 | N/A | Sub-elements | No |

In some implementations, a transmitting device may indicate one or both of a bandwidth that is greater than 160 MHz and a puncturing pattern associated with a bandwidth that is greater than 160 MHz via the IFTMR frame 800. In some aspects, for example, the transmitting device may provide an indication of 320 MHz, a punctured bandwidth (e.g. 200 MHz, 240 MHz or 280 MHz), or any combination thereof, via the format and bandwidth subfield. For example, a content of the format and bandwidth subfield may be illustrated by Table 6, shown below, and the device 205 and the device 210 may support entries for 320 MHz or for 240 MHz including a corresponding EHT to support combinations for 320-1 (e.g., a first 320 MHz bandwidth), 320-2 (e.g., a second 320 MHz bandwidth), 240-1 (e.g., a first 240 MHz bandwidth), 240-2 (e.g., a second 240 MHz bandwidth), or 240-3 (e.g., a third 240 MHz bandwidth) using one or more field values in the range of 6-63 (which may otherwise be reserved).

TABLE 6

Format and Bandwidth Subfield (#2247)

| Field Value | Format | Bandwidth |
|---|---|---|
| 0 | HE | 20 |
| 1 | HE | 40 |
| 2 | HE | 80 |
| 3 | HE | 80 + 80 |
| 4 | HE (two separate RF LOs) | 160 |
| 5 | HE (single RF LO) | 160 |
| 6-63 | Reserved | Reserved |

For example, within the format and bandwidth subfield, the device 205 and the device 210 may include entries for 320 MHz or for 240 MHz including a corresponding 160 MHz, or both, in any one of the field values 6-63. Such additional entries in the format and bandwidth subfield are illustrated by Table 7, shown below. As illustrated by Table 7, different field values may correspond to different formats (which may be associated with different RF local oscillator (LO) usage) and different bandwidths.

TABLE 7

Format and Bandwidth Subfield (#2247)

| Field Value | Format | Bandwidth |
|---|---|---|
| Pick one reserved value from 6-63 for each row | EHT (single RF LO) | 320-1, also allows for field values 5, 2, 1, and 0 |
| | EHT (single RF LO) | 320-2, also allows for field values 5, 2, 1, and 0 |
| | EHT (two separate RF LOs) | 320-1, also allows for field values 4, 2, 1, and 0 |
| | EHT (two separate RF LOs) | 320-2, also allows for field values 4, 2, 1, and 0 |
| | EHT (two separate RF LOs) | 320-1, also allows for field values 3, 2, 1, and 0 |
| | EHT (two separate RF LOs) | 320-2, also allows for field values 3, 2, 1, and 0 |
| | EHT (single RF LO) | 240-1, also allows for field values 5, 2, 1, and 0 |
| | EHT (single RF LO) | 240-2, also allows for field values 5, 2, 1, and 0 |
| | EHT (single RF LO) | 240-3 (non-contiguous), also allows for field values 5, 2, 1, and 0 |

EHT entries for two separate RF LOs, and each of the 240 MHz cases

Additionally, or alternatively, the device 205 and the device 210 may support one or more sub-elements for a transmission power envelope (TPE) or for puncturing pattern via a content of the sub-element for supporting bandwidth field using one or more sub-element IDs in the range of 3-220 (which may otherwise be reserved). Such a content of the sub-element for supporting bandwidth field is illustrated by Table 8, shown below.

TABLE 8

Ranging Sub-element IDs for Ranging Parameters

| Sub-element ID | Name | Extensible |
|---|---|---|
| 0 | Non-TB specific sub-element | Yes |
| 1 | TB-specific sub-element | Yes |
| 2 | Secure LTF sub-element | Yes |
| 3-220 | Reserved | |

TABLE 8-continued

Ranging Sub-element IDs for Ranging Parameters

| Sub-element ID | Name | Extensible |
|---|---|---|
| 221 | Vendor specific | |
| 222-255 | Reserved | |

For example, the device 205 and the device 210 may support one or more entries for 320 MHz or for a punctured bandwidth (e.g., 200 MHz, 240 MHz, 280 MHz) including a corresponding 160 MHz in one or more of the supported ranging sub-elements with sub-element IDs within the range of 3-220 (which may otherwise be reserved). Such additional entries in the list of sub-elements illustrated by Table 8 are illustrated by Table 9, shown below.

TABLE 9

Ranging Sub-element IDs for Ranging Parameters

| Sub-element ID | Name | Extensible |
|---|---|---|
| Pick one reserved value from 3-4 for each row | Sub-element on TPE (may use a same format of a TPE element) | Yes |
| | Sub-element on puncturing | Yes |

In some aspects, a transmitting device may implicitly indicate a 320 MHz bandwidth, or a puncturing pattern associated with a 320 MHz bandwidth, via a TPE because different transmit powers may be associated with different bandwidths. As such, a receiving device may implicitly determine which bandwidth to use (e.g., may determine to use a 320 MHz bandwidth) based on the specific transmit power indicated via the sub-element on TPE.

Further, a transmitting device may indicate a puncturing pattern via the sub-element on puncturing via a format of an EHT operation element or via a new sub-element format that includes a puncturing bitmap. If the format of the EHT operation element is used, the transmitting device may refrain from providing information to be used for differentiating between, for example, 320-1 and 320-2 in the format and bandwidth subfield (as this information can instead be included in the sub-element on puncturing).

Figure 9:
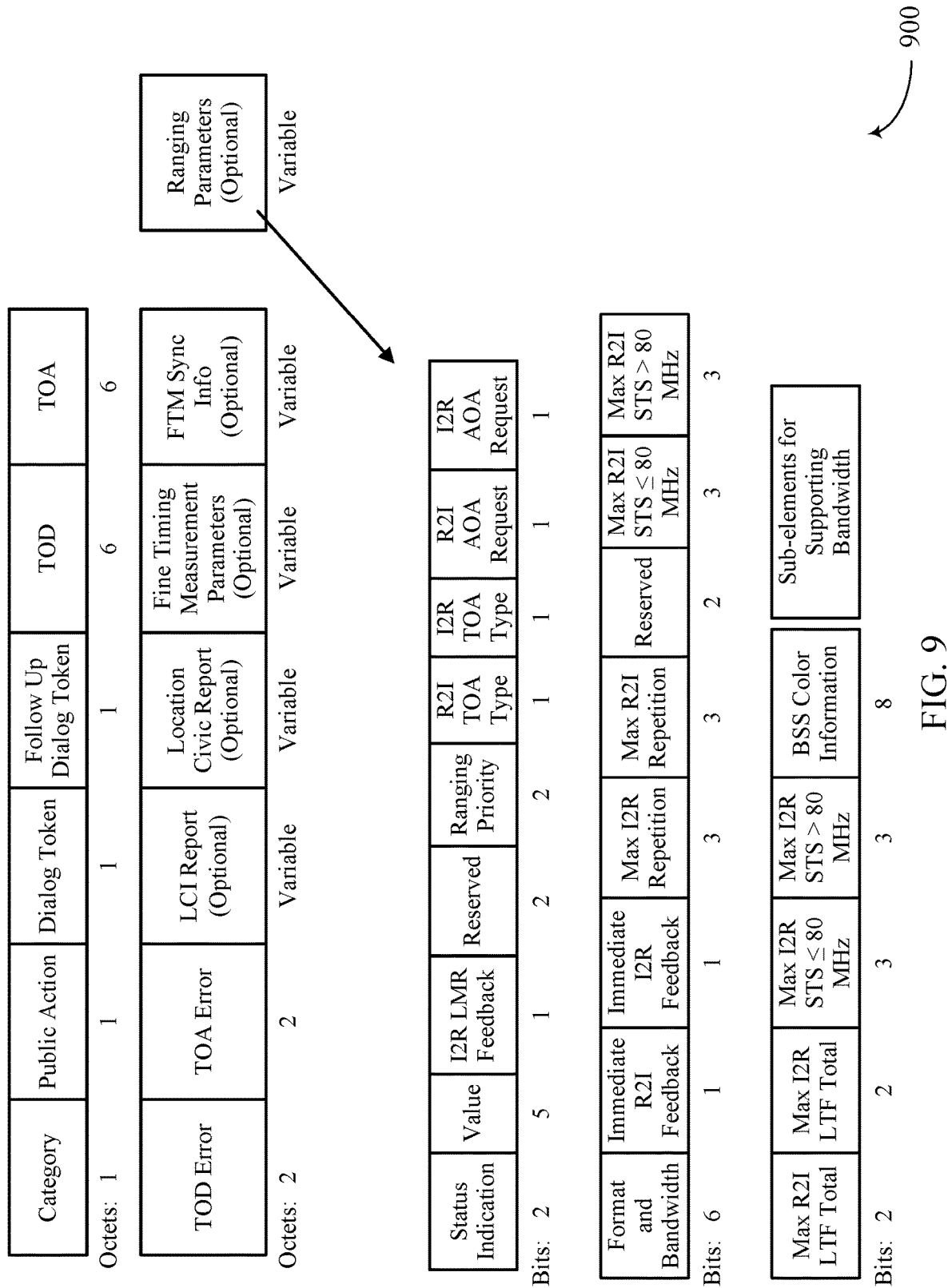
FIG. 9 shows an example of an initial fine timing measurement (IFTM) frame that supports techniques for wide bandwidth positioning in a WLAN in accordance with aspects of the present disclosure.

FIG. 9 shows an example of an IFTM frame 900 that supports techniques for wide bandwidth positioning in a WLAN in accordance with one or more aspects of the present disclosure. The IFTM frame 900 may include a number of different fields and the device 205 and the device 210 may communicate (e.g., transmit or receive) the IFTM frame 900 to negotiate a ranging sounding procedure. For example, the device 205 and the device 210 may exchange the IFTM frame 900 prior to a ranging sounding procedure and, in some aspects, a device may transmit the IFTM frame 900 responsive to (e.g., to acknowledge an) IFTMR frame 800. In some implementations, the IFTM frame 900 may support a 320 MHz indication and may use one or more fields to support the 320 MHz indication.

The IFTM frame 900 may include a category field, a public access field, a dialog token field, a follow up dialog token field, a time of departure (TOD) field, a time of arrival (TOA) field, a TOD error field, a TOA error field, an LCI report field, a location civic report field, a fine timing measurement parameters field, an FTM synchronization information field, and a ranging parameters field. The IFTM frame 900 may further include or otherwise be associated with one or more other fields or subfields, as illustrated in FIG. 9 (e.g., for ranging parameters field format). In some aspects, the ranging parameters field may include or point to a ranging parameters element, which may in turn include or point to a set of one or more subfields including a format and bandwidth field and, in some implementations, one or more sub-elements for supporting a bandwidth that is greater than 160 MHz.

In some implementations, a transmitting device may indicate one or both of a bandwidth that is greater than 160 MHz and a puncturing pattern associated with a bandwidth that is greater than 160 MHz via the IFTM frame 900. In some aspects, for example, the transmitting device may provide an indication of 320 MHz, a punctured bandwidth (e.g. 200 MHz, 240 MHz, 280 MHz), or any combination thereof, via the format and bandwidth subfield. For example, a content of the format and bandwidth subfield may be illustrated by Table 6, shown herein, and the device 205 and the device 210 may support entries for 320 MHz or for 240 MHz including a corresponding EHT to support combinations for 320-1 (e.g., a first 320 MHz bandwidth), 320-2 (e.g., a second 320 MHz bandwidth), 240-1 (e.g., a first 240 MHz bandwidth), 240-2 (e.g., a second 240 MHz bandwidth), or 240-3 (e.g., a third 240 MHz bandwidth) using one or more field values in the range of 6-63 (which may otherwise be reserved).

For example, within the format and bandwidth subfield, the device 205 and the device 210 may include entries for 320 MHz or for 240 MHz including a corresponding 160 MHz, or both, in any one of the field values 6-63. Such additional entries in the format and bandwidth subfield are illustrated by Table 7, shown herein. Additionally, or alternatively, the device 205 and the device 210 may support one or more sub-elements for TPE or for puncturing pattern via a content of the sub-element for supporting bandwidth field using one or more sub-element IDs in the range of 3-220 (which may otherwise be reserved). Such a content of the sub-element for supporting bandwidth field is illustrated by Table 8, shown herein. As such, the device 205 and the device 210 may support one or more entries for 320 MHz or for 240 MHz including a corresponding 160 MHz in one or more of the supported ranging sub-elements with sub-element IDs within the range of 3-220 (which may otherwise be reserved). Such additional entries in the list of sub-elements illustrated by Table 8 are illustrated by Table 9, shown herein.

In some aspects, a transmitting device may implicitly indicate a 320 MHz bandwidth, or a puncturing pattern associated with a 320 MHz bandwidth, via a TPE because different transmit powers may be associated with different bandwidths. As such, a receiving device may implicitly determine which bandwidth to use (e.g., may determine to use a 320 MHz bandwidth) based on the specific transmit power indicated via the sub-element on TPE.

Further, a transmitting device may indicate a puncturing pattern via the sub-element on puncturing via a format of an EHT operation element or via a new sub-element format that includes a puncturing bitmap. If the format of the EHT operation element is used, the transmitting device may refrain from providing information to be used for differentiating between, for example, 320-1 and 320-2 in the format and bandwidth subfield (as this information can instead be included in the sub-element on puncturing).

Figure 10:
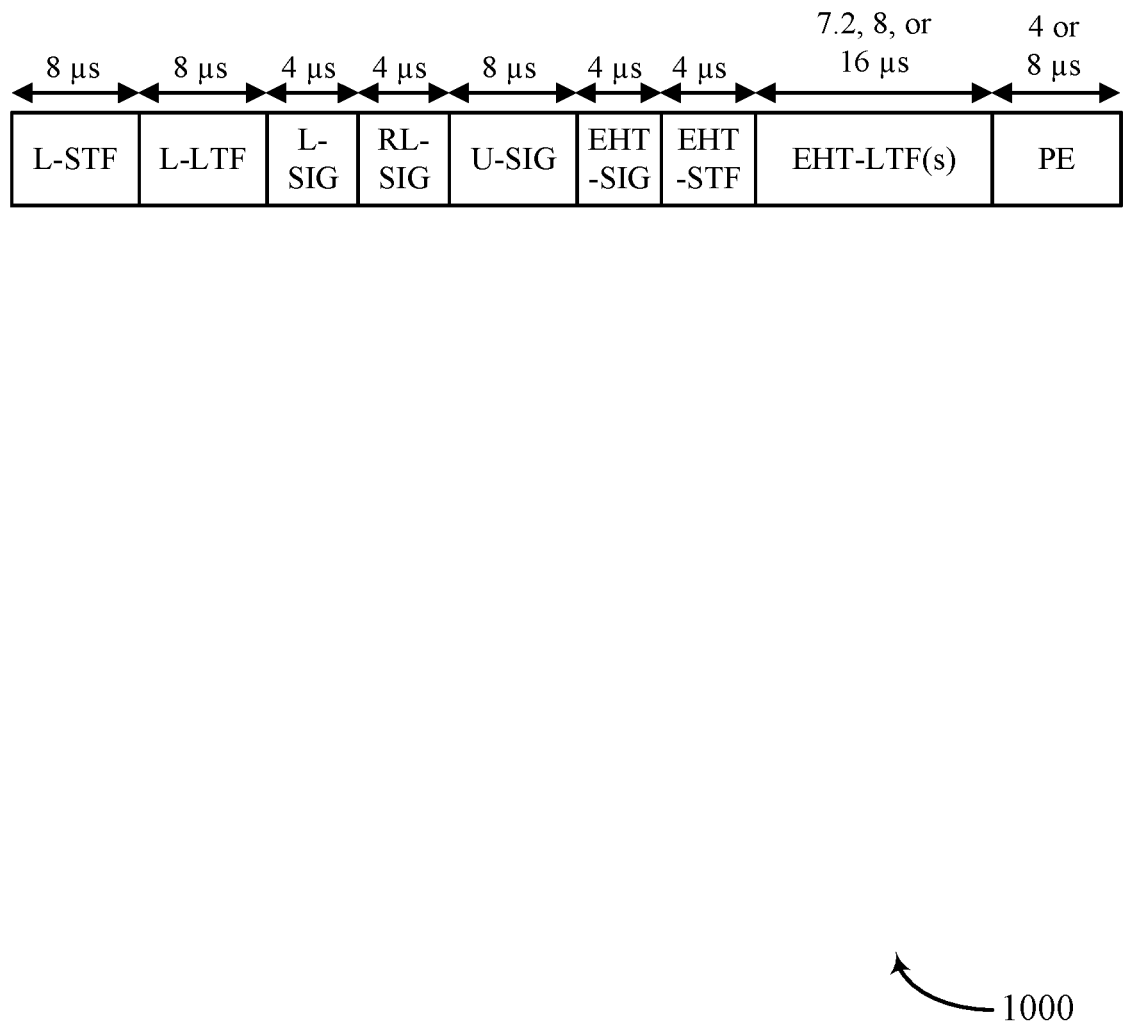
FIGS. 10 and 11 show examples of ranging null data packet (NDP) formats that support techniques for wide bandwidth positioning in a WLAN in accordance with aspects of the present disclosure.

FIG. 10 shows an example of a ranging NDP format 1000 that supports techniques for wide bandwidth positioning in a WLAN in accordance with one or more aspects of the present disclosure. The ranging NDP format 1000 may include a number of different fields and the device 205 and the device 210 may communicate (e.g., transmit or receive) ranging NDPs in accordance with the ranging NDP format 1000 to facilitate an RTT measurement (and a corresponding distance determination) between the device 205 and the device 210 as part of a ranging sounding procedure. In some implementations, the device 205 and the device 210 may transmit the ranging NDPs using a bandwidth that is greater than 160 MHz (e.g., a 320 MHz bandwidth) with or without a puncturing pattern associated with the bandwidth that is greater than 160 MHz.

The ranging NDP format 1000, which may be associated with an EHT ranging NDP format (#4014), may include a non-HT short training field (L-STF), a non-HT LTF (L-LTF), a non-HT signal (L-SIG) field, a repeated non-HT signal (RL-SIG) field, a U-SIG field, an EHT-SIG field, an EHT-STF, one or more EHT-LTFs, and a PE field. For the one or more EHT-LTFs, repetition may be allowed or supported and may be similar to the repetition of the EHT-LTFs illustrated by and described with reference to FIG. 11. An EHT-LTF field may be 7.2 or 8 μs per symbol when using 2×EHT-LTF and may be 16 μs per symbol when using 4×EHT-LTF.

In some implementations, a relatively longer PE field may be useful for relatively higher bandwidths (e.g., for a 320 MHz bandwidth). For example, the ranging NDP format 1000 may have a PE field spanning 8 μs (as opposed to the 4 μs that may be present in other ranging NDP formats). In some aspects, the ranging NDP format may have a PE field spanning 4 μs if the PPDU bandwidth is less than or equal to 160 MHz or if a number of spatial streams is less than or equal to 8, or if both, and the ranging NDP format 1000 may have a PE field spanning 8 μs for other cases (e.g., for all other cases in which the bandwidth is greater than 160 MHz or if a different number of spatial streams are used). Additionally, or alternatively, the PE field may be 8 μs exclusively when the bandwidth is greater than 160 MHz.

Further, in some implementations, the device 205 and the device 210 may use the ranging NDP format 1000 (e.g., an EHT NDP) for bandwidths that are less than or equal to 160 MHz with or without secure LTF. In some deployment scenarios, for example, the device 205 and the device 210 may use or support both HE NDPs (e.g., for bandwidths less than or equal to 160 MHz) and EHT NDPs (e.g. for bandwidths greater than 160 MHz, such as 320 MHz, or for any bandwidths with and without puncturing). As such, one or both of the device 205 and the device 210 may select to use an HE NDP if the occupied or used bandwidth is less than or equal to 160 MHz or an EHT NDP if the occupied or used bandwidth is greater than 160 MHz (e.g., 320 MHz) or if the device 205 or the device 210 otherwise determines to use an EHT NDP (e.g., if an EHT NDP will likely provide more suitable communication metrics for a given communication timeline).

In some implementations, the device 205 and the device 210 may further support one or more punctured cases for a ranging NDP that occupies a bandwidth that is less than or equal to 160 MHz. For example, the device 205 and the device 210 may support a contiguous bandwidth of 120 MHz as a result of a punctured 160 MHz bandwidth with 40 MHz puncturing or 80 MHz as a result of a punctured 160 MHz bandwidth with 80 MHz puncturing. As such, the device 205 and the device 210 may support unpunctured ranging NDPs (e.g., HE ranging NDPs) and punctured ranging NDPs (e.g., EHT ranging NDPs) for up to 160 MHz. In accordance with having two ways of sending 160 MHz and smaller NDPs, the device 205 and the device 210 may select one way or the other via a signaling exchange, based on a preconfigured rule, or based on device capability.

Accordingly, implementations of the present disclosure may further support one or more signaling and messaging designs and rules to support a use any bandwidth for ranging NDPs with or without puncturing (e.g., to indicate a use of a bandwidth of 160 MHz or less or a bandwidth of 320 MHz or greater and to indicate information associated with a puncturing pattern associated with the bandwidth of 160 MHz or less or associated with the bandwidth of 320 MHz or greater, respectively). As such, the signaling and messaging designs may include one or more updates for an NDPA frame (which may announce a subsequent transmission of NDPs using a 160 MHz or less bandwidth), for a trigger frame (which may trigger another device to begin a transmission of NDPs), for session negation messages (such as one or both of an IFTM frame and an IFTMR frame), for segmentation techniques for ranging NDPs, or for any combination thereof. For any one or more of such signaling and messaging designs, the designs may support one or both of an indication of a bandwidth that is less than or equal to 160 MHz (e.g., a 160 MHz bandwidth) and an indication of a presence of a puncturing pattern associated with a bandwidth that is less than or equal to 160 MHz. In some implementations, for example, the device 205 and the device 210 may support a first set of puncturing patterns for NDPs sent using a bandwidth that is less than or equal 160 MHz and may support a second set of puncturing patterns for NDPs sent using a bandwidth that is greater than 160 MHz and the signaling and messaging designs may support, indicate, or otherwise differentiate between such sets of puncturing patterns.

Further, the ranging NDP format 1000 may provide or support non-secure 320 MHz ranging NDPs or secure 320 MHz ranging NDPs. In implementations in which the ranging NDP format 1000 is associated with non-secure 320 MHz ranging NDP, the LTFs of the ranging NDP format 1000 may be referred to as "EHT LTFs." In implementations in which the ranging NDP format 1000 is associated with secure 320 MHz ranging NDP, the LTFs of the ranging NDP format 1000 may be referred to as "secure EHT LTFs" (such that the device 205 and the device 210 may support mutual understanding and consistency with "secure HE LTF" terminology).

Figure 11:
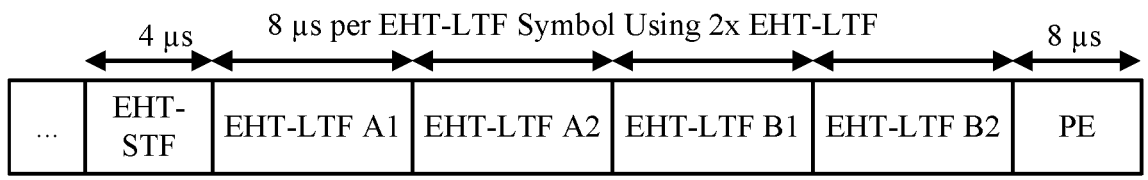

FIG. 11 shows an example of a ranging NDP format 1100 that supports techniques for wide bandwidth positioning in a WLAN in accordance with one or more aspects of the present disclosure. The ranging NDP format 1100 may include a number of different fields and the device 205 and the device 210 may communicate (e.g., transmit or receive) ranging NDPs in accordance with the ranging NDP format 1100 to facilitate an RTT measurement (and a corresponding distance determination) between the device 205 and the device 210 as part of a ranging sounding procedure. In some implementations, the device 205 and the device 210 may transmit the ranging NDPs using a bandwidth that is greater than 160 MHz (e.g., a 320 MHz bandwidth) with or without a puncturing pattern associated with the bandwidth that is greater than 160 MHz.

The ranging NDP format 1100, which may be associated with an EHT ranging NDP associated with an example of EHT-LTFs in an EHT-ranging NDP with N_STS=2 and N_LTF_REP=2, may include an EHT-STF, an EHT-LTF A1, an EHT-LTF A2, an EHT LTF B1, an EHT-LTF B2, and a PE field. For example, some ranging NDPs may support one or more repetitions of EHT-LTFs. In such examples, a number of repetitions may be specified by a ranging NDPA frame and, in some aspects, secure ranging may use the repetitions in detection of attacks. In some systems, the ranging NDP format 1100 may support two repetitions (2×) of LTFs with a 1.6 µs GI. A ranging NDP may use EHT-LTF for non-secure ranging and may use secure HE-LTFs for secure ranging, where secure EHT-LTFs may have a zero second GI.

Figure 12:
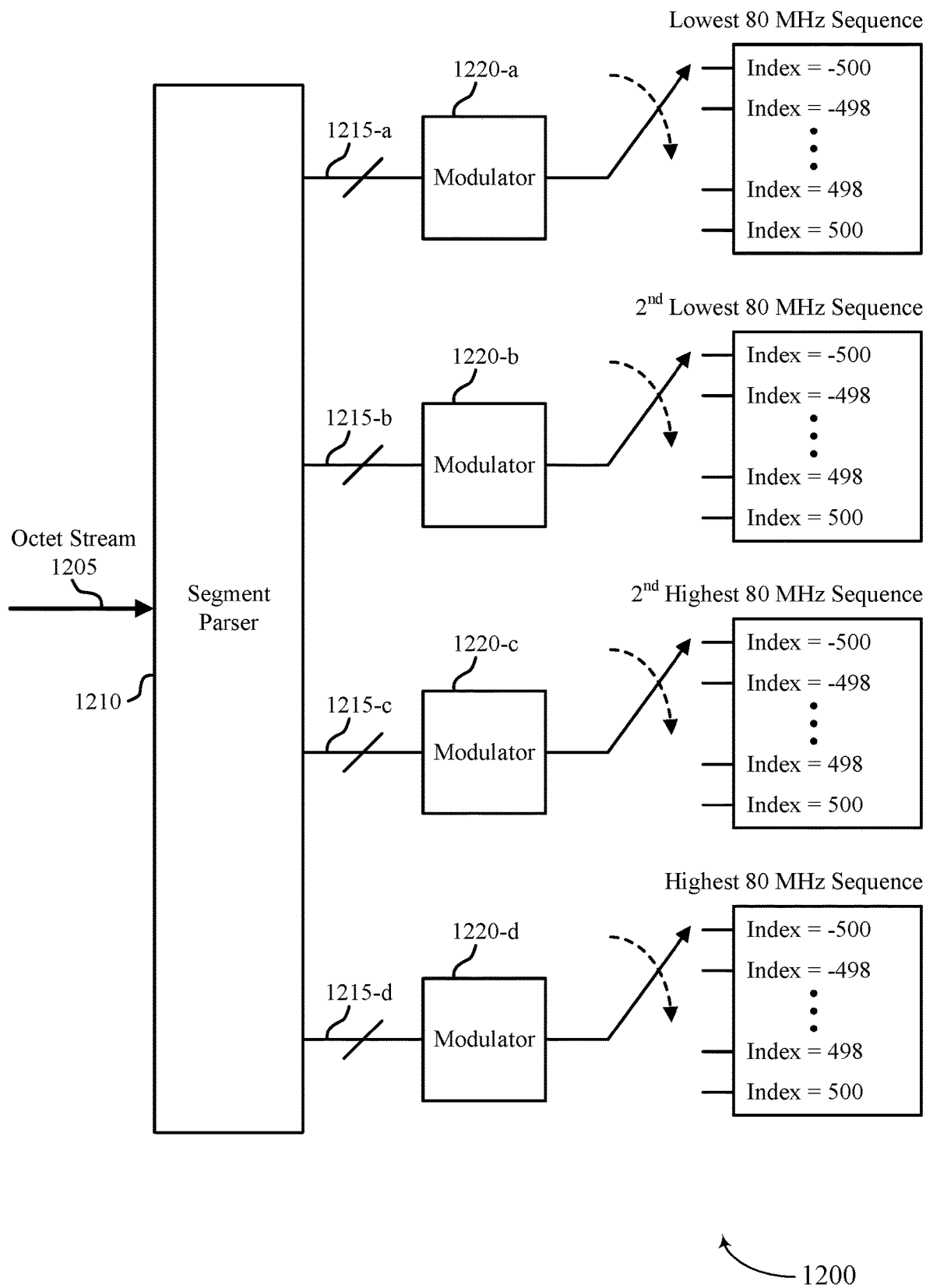
FIGS. 12 through 14 show examples of segmentation diagrams that support techniques for wide bandwidth positioning in a WLAN in accordance with one or more aspects of the present disclosure.

FIG. 12 shows an example of a segmentation diagram 1200 that supports techniques for wide bandwidth positioning in a WLAN in accordance with one or more aspects of the present disclosure. The segmentation diagram 1200 may support a transmission or reception technique for ranging NDPs that use a 320 MHz bandwidth and may support a use of EHT ranging NDPs with secure EHT-LTFs. For example, the device 205 and the device 210 may use a counter mode (e.g., an AES-128 counter mode) in the PHY layer to generate a pseudo random sequence of octets at both the transmitter and the receiver and may use the pseudo random sequence of octets for one or more ranging NDPs.

In some aspects, an AES-128 counter mode may be reset at a beginning of each secure EHT NDP using a new key provided over a secure link. At the beginning of the secure NDP, a first set of pseudo random octets may be used to apply a per-stream pseudo random phase rotation. Further, for 20 MHz, 40 MHz, and 80 MHz secure NDPs, the remaining pseudo random octets may be used to construct a pseudo random 64-quadrature amplitude modulation (QAM) for each of the 2×LTF tones, from a relatively lowest frequency tone within a frequency allocation to a relatively highest frequency tone within the frequency allocation.

Further, in some aspects and for 160 MHz secure NDPs, a segment parser may be used to parse the secure octets between lower and upper segments. For example, for an octet stream associated with 160 MHz, a transmitting device may use a segment parser to obtain two segments including a first segment and a second segment. The transmitting device may pass each segment through a 64QAM modulator and allocate an output of the modulation of each segment to frequency tones of different 80 MHz sequences or segments. For example, the transmitting device may modulate the first segment to obtain a modulated first segment and may allocate the modulated first segment to frequency tones (which may be associated index values ranging from 500 to −500) of a lower 80 MHz sequence. The transmitting device may modulate the second segment to obtain a modulated second segment and may allocate the modulated second segment to frequency tones (which may be associated with index values ranging from 500 to −500) of an upper 80 MHz sequence. In other words, the transmitting device may employ a segment parser for distributing pseudo random octets to the sequences for the lower and upper 80 MHz segments in the 160 MHz secure LTF.

In some implementations, and as illustrated by the segmentation diagram 1200, a transmitting device may support a different segment parsing technique for handling secure LTFs in scenarios in which the transmitting device transmits one or more ranging NDPs using a bandwidth greater than 160 MHz (e.g., a 320 MHz bandwidth). For example, the transmitting device may generate an octet stream 1205 of pseudo random octets (e.g., a sequence of pseudo random octets) and may pass the octet stream 1205 into a segment parser 1210. The transmitting device may obtain a quantity of outputs 1215 from the segment parser 1210 and may modulate each output 1215 using a modulator 1220 (e.g., a 64QAM modulator). For example, the transmitting device may modulate an output 1215-a using a modulator 1220-a, modulate an output 1215-b using a modulator 1220-b, modulate an output 1215-c using a modulator 1220-c, and may modulate an output 1215-d using a modulator 1220-d.

The transmitting device may allocate each of the modulated outputs 1215 to different frequency ranges (e.g., different sequence segments) within the bandwidth (e.g., within the allocated 320 MHz bandwidth). For example, the transmitting device may allocate information of the modulated output 1215-a to frequency domain tones of a relatively lowest 80 MHz sequence segment, allocate information of the modulated output 1215-b to frequency domain tones of a second lowest 80 MHz sequence segment, allocate information of the modulated output 1215-c to frequency domain tones of a second highest 80 MHz sequence segment, and allocate information of the modulated output 1215-d to frequency domain tones of a relatively highest 80 MHz sequence segment. In other words, the transmitting device may allocate, for each of the quantity of outputs, information of an output to frequency domain tones of a respective sequence segment.

Accordingly, in implementations associated with the segmentation diagram 1200, the device 205 and the device 210 may exchange ranging NDPs using a 320 MHz bandwidth without puncturing (e.g., the device 205 and the device 210 may use the full 320 MHz bandwidth). As such, the segmentation diagram 1200 may be referred to as a four-way segment parser for 320 MHz which may support a 320 MHz operating bandwidth.

Figure 13:
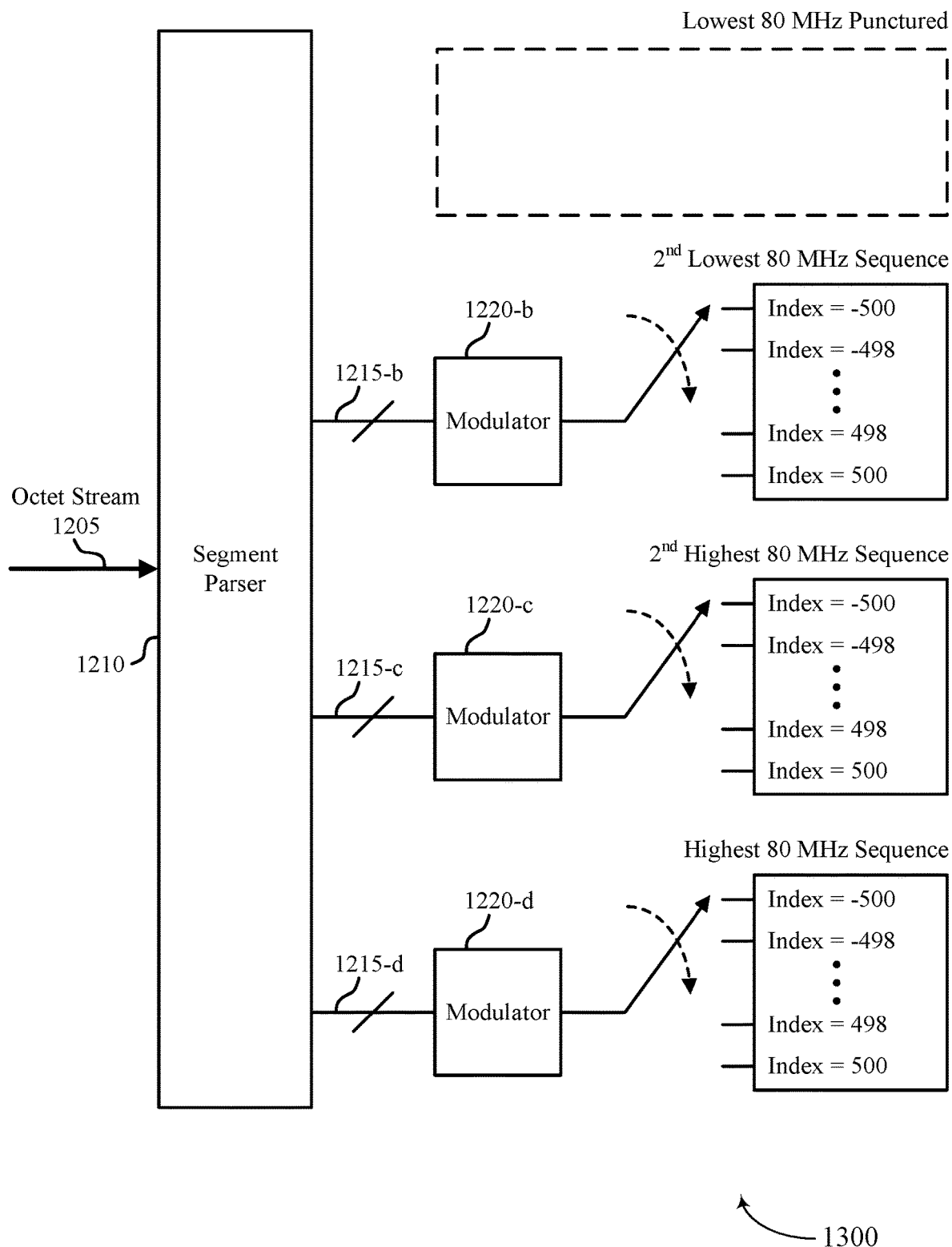

FIG. 13 shows an example of a segmentation diagram 1300 that supports techniques for wide bandwidth positioning in a WLAN in accordance with one or more aspects of the present disclosure. The segmentation diagram 1300 may support a transmission or reception technique for ranging NDPs that use a 320 MHz bandwidth and may support a use of EHT ranging NDPs with secure EHT-LTFs. For example, the device 205 and the device 210 may use a counter mode (e.g., an AES-128 counter mode) in the PHY layer to generate a pseudo random sequence of octets at both the transmitter and the receiver and may use the pseudo random sequence of octets for one or more ranging NDPs.

In some implementations, such as implementations in which the device 205 and the device 210 use a puncturing pattern for ranging NDPs that is associated with a 320 MHz bandwidth, the device 205 and the device 210 may support a three-way segment parser for 240 MHz. For example, instead of allocating four outputs from the segment parser 1210 and allocating the four outputs to different 80 MHz sequence segments (such that a 320 MHz bandwidth is fully utilized), a transmitting device may obtain three outputs from the segment parser 1210 and may allocate each of the three outputs to different 80 MHz segments (such that a 240 MHz portion of a 320 MHz bandwidth is utilized).

Accordingly, and as illustrated by the segmentation diagram 1300, a transmitting device may obtain the output 1215-b, the output 1215-c, and the output 1215-d from the segment parser 1210, may modulate each of the three obtained outputs 1215 via respective modulators 1220, and may allocate information of each modulated output 1215 to frequency domain tones of respective 80 MHz sequence segments. As illustrated by the segmentation diagram 1300, the device 205 and the device 210 may puncture the relatively lowest 80 MHz sequence segment. Further, although illustrated in the context of the segmentation diagram 1300 as puncturing the relatively lowest 80 MHz sequence segment, the device 205 and the device 210 may support any puncturing pattern such that any one or more of second lowest 80 MHz sequence segment, the second highest 80 MHz sequence segment, or the highest 80 MHz sequence segment may additionally, or alternately, be punctured.

Figure 14:
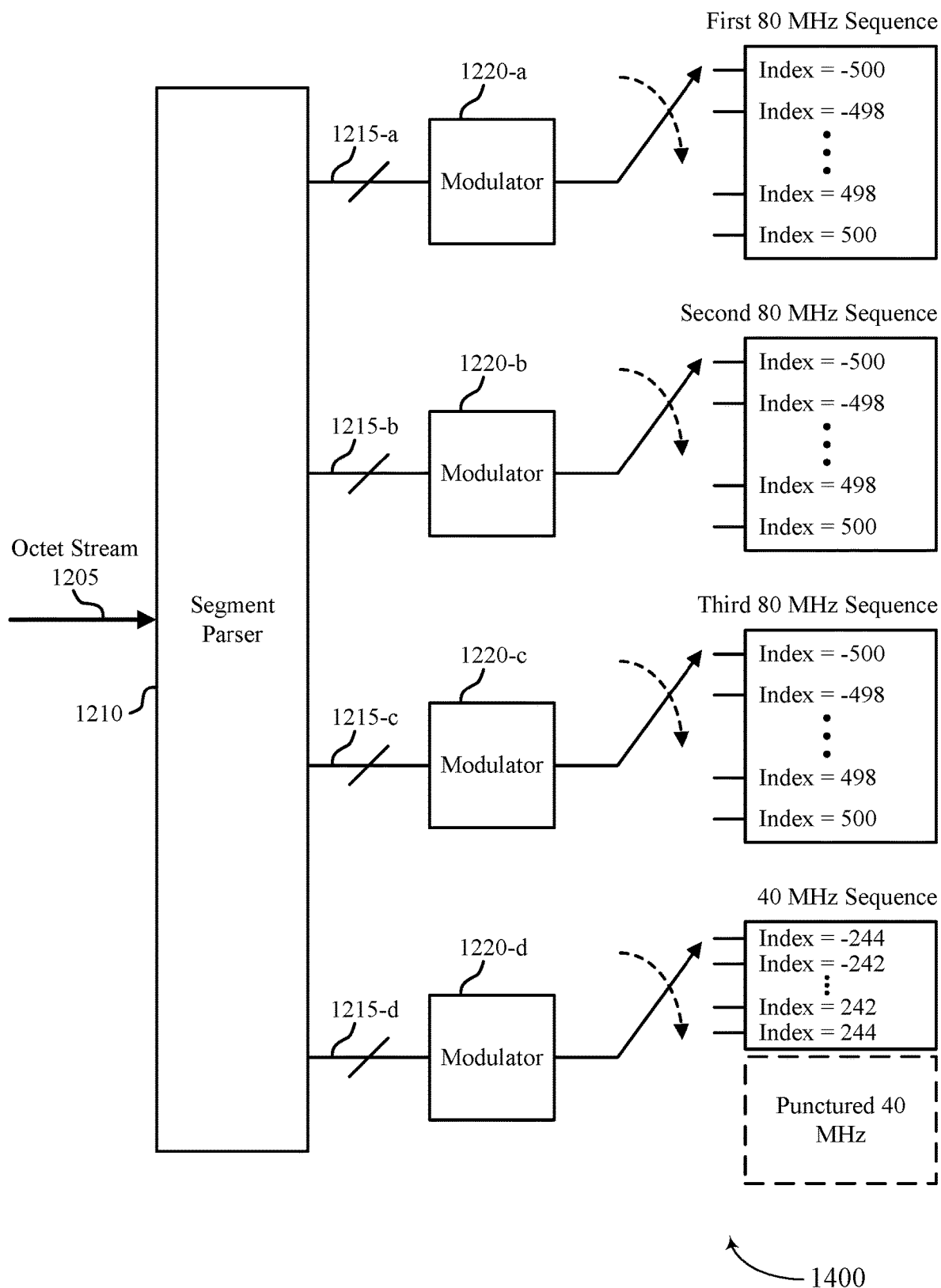

FIG. 14 shows an example of a segmentation diagram 1400 that supports techniques for wide bandwidth positioning in a WLAN in accordance with one or more aspects of the present disclosure. The segmentation diagram 1400 may support a transmission or reception technique for ranging NDPs that use a 320 MHz bandwidth and may support a use of EHT ranging NDPs with secure EHT-LTFs. For example, the device 205 and the device 210 may use a counter mode (e.g., an AES-128 counter mode) in the PHY layer to generate a pseudo random sequence of octets at both the transmitter and the receiver and may use the pseudo random sequence of octets for one or more ranging NDPs.

In some aspects, the device 205 and the device 210 may employ the segmentation in accordance with the segmentation diagram 1300 if parsing a pseudo random octet stream when a single 80 MHz segment is punctured, and the device 205 and the device 210 may use a different segmentation technique (as illustrated by the segmentation diagram 1400) to handle a case in which one or more (e.g., a single) 40 MHz segment with one 80 MHz segment is punctured. Thus, the device 205 and the device 210 may support a design of the segmentation diagram 1400 to send pseudo random octets to three 80 MHz segments and a 40 MHz segment.

In some implementations, for example, a transmitting device may parse the pseudo random octet stream 1205 using a 1:4 segment parser 1210 to obtain four outputs 1215 (e.g., as similarly illustrated by the segmentation diagram 1200, showing an unpunctured case) and, to obtain a 40 MHz puncturing, the transmitting device may drop any remaining octets of an output 1215 once a set of (e.g., all) frequency domain tones of a 40 MHz portion of an 80 MHz segment have been populated with information from the output 1215. This process may work and ensure compatibility between a transmitter and a receiver because the transmitter and the receiver use the pseudo random octet stream 1205 having the same octets (e.g., same information may be allocated or expected at the 40 MHz portion at both the transmitter and the receiver due to the transmitter and the receiver using the same octet stream 1205 and the same segment parser 1210).

For example, and as illustrated by the segmentation diagram 1400, a transmitting device may allocate information of the modulated output 1215-a to a first 80 MHz sequence segment, may allocate information of the modulated output 1215-b to a second 80 MHz sequence segment, may allocate information of the modulated output 1215-c to a third 80 MHz sequence segment, and may allocate partial information of the modulated output 1215-d to a 40 MHz sequence segment of a fourth 80 MHz sequence segment to obtain the 40 MHz puncturing. In some aspects, the transmitting device may allocate the partial information of the modulated output 1215-d (and drop remaining information of the modulated output 1215-d) to frequency domain tones associated with index values ranging from 244 to −244 in the 40 MHz sequence. Further, although the segmentation diagram 1400 illustrates the punctured 40 MHz in the fourth 80 MHz sequence segment, the device 205 and the device 210 may additionally, or alternatively, support a 40 MHz puncturing in any one or more of the first 80 MHz sequence segment, the second 80 MHz sequence segment, or the third 80 MHz sequence segment. Further, within any 80 MHz sequence segment, the punctured 40 MHz may occupy a relatively highest frequency range of the 80 MHz sequence segment, a relatively lowest frequency range of the 80 MHz sequence segment, or a frequency range approximately in the middle of the 80 MHz sequence segment.

Figure 15:
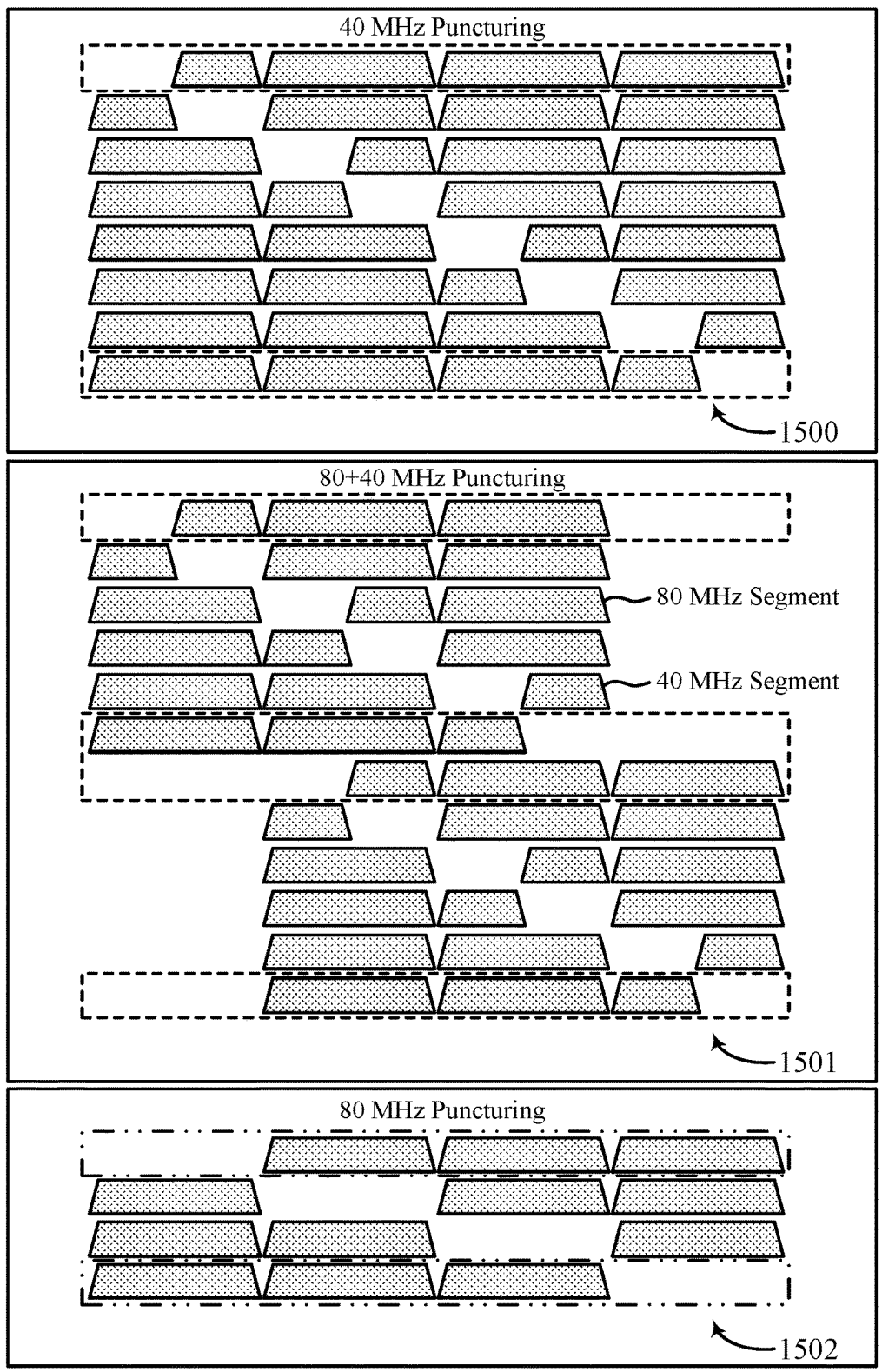
FIGS. 15 and 16 show examples of puncturing patterns that support techniques for wide bandwidth positioning in a WLAN in accordance with one or more aspects of the present disclosure.

FIG. 15 shows examples of puncturing patterns 1500, 1501, and 1502 that support techniques for wide bandwidth positioning in a WLAN in accordance with one or more aspects of the present disclosure. The device 205 and the device 210 may use any one or more of the puncturing patterns 1500, 1501, and 1502 to support a 320 MHz bandwidth for ranging NDPs as part of a ranging sounding procedure.

The puncturing patterns 1500, 1501, and 1502 may be static or dynamic puncturing patterns (e.g., static puncturing patterns indicated by a beacon frame or dynamic puncturing patterns indicated by a ranging NDPA frame). In some aspects, one or more of the puncturing patterns 1500, 1501, and 1502 may be associated with non-orthogonal frequency division multiplexing access (OFDMA) patterns. For example, some 240 MHz or 280 MHz modes (e.g., with non-orthogonal frequency division multiple access (OFDMA) puncturing) may provide better accuracy than 160 MHz based on a wider bandwidth. Accordingly, implementations of the present disclosure support one or more signaling and messaging designs and rules to support a use of such wider bandwidths for ranging NDPs (e.g., to indicate a use of a 320 MHz bandwidth and to indicate information associated with a puncturing pattern associated with the 320 MHz bandwidth). Further, the device 205 and the device 210 may use similar puncturing patterns for ranging NDPs having bandwidths of 160 MHz or less. For example, the device 205 and the device 210 may support a 40 MHz puncturing in a 160 MHz bandwidth ranging NDP to achieve a contiguous 120 MHz ranging NDP. For further example, the device 205 and the device 210 may support an 80 MHz puncturing in a 160 MHz bandwidth ranging NDP to achieve a contiguous 80 MHz ranging NDP.

In some aspects, there may be various patterns (e.g., 24 different patterns) for a 320 MHz bandwidth. The puncturing patterns 1500 may be associated with a 40 MHz puncture and may include two options in which there is 280 MHz of contiguous bandwidth. The puncturing patterns 1501 may be associated with an 80+40 MHz puncturing and may include four options in which there is 200 MHz of contiguous bandwidth. The puncturing patterns 1502 may be associated with an 80 MHz puncturing and may include two options in which there is 240 MHz of contiguous bandwidth.

Figure 16:
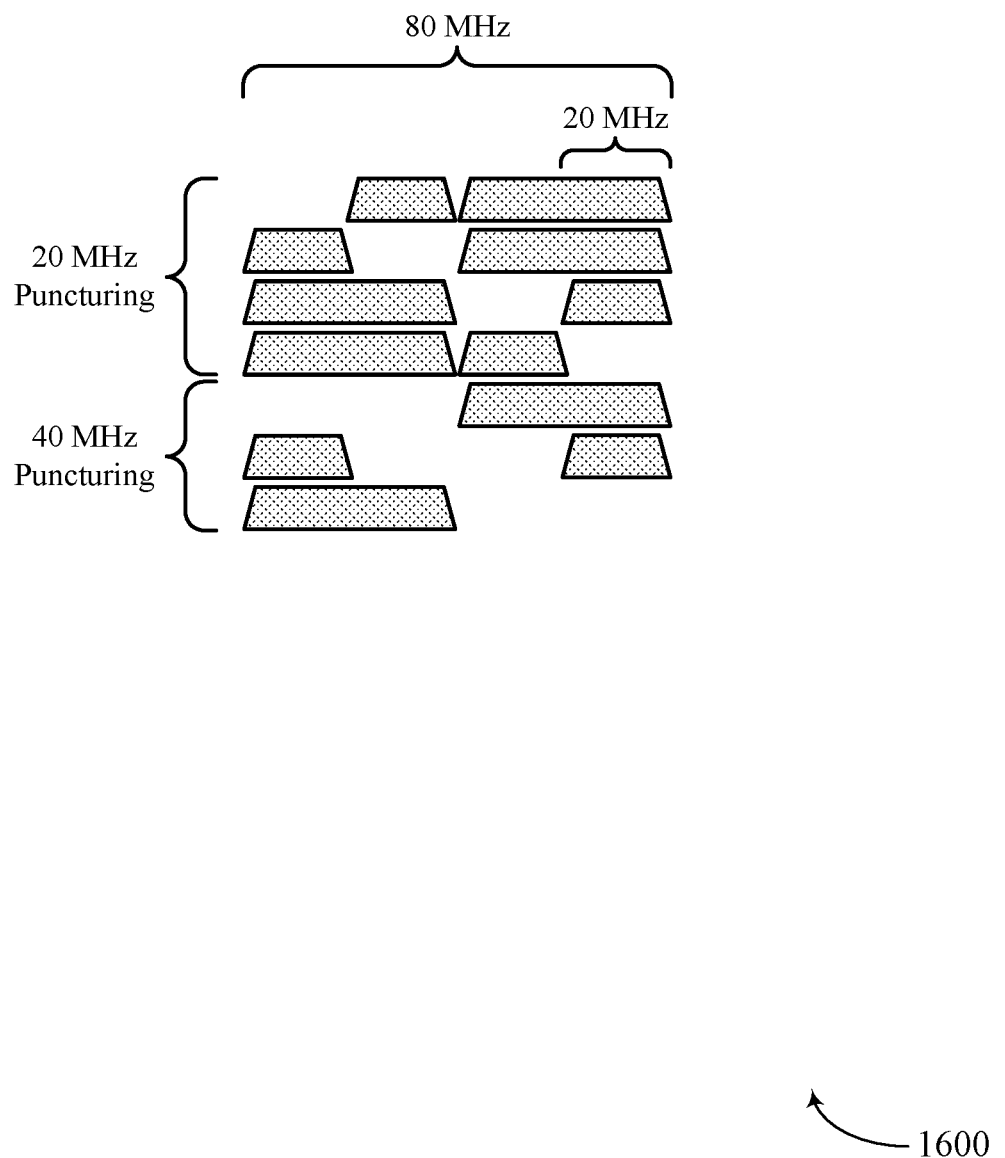

FIG. 16 shows examples of puncturing patterns 1600 that support techniques for wide bandwidth positioning in a WLAN in accordance with one or more aspects of the present disclosure. The device 205 and the device 210 may use the puncturing pattern 1600 within any 80 MHz sub-block of a 320 MHz bandwidth for ranging NDPs as part of a ranging sounding procedure. As illustrated by FIG. 16, some puncturing patterns 1600 may include 20 MHz puncturing while some other puncturing patterns 1600 may include 40 MHz puncturing.

In some aspects, the puncturing patterns 1600 may be an example of an OFDMA puncturing patterns. In some aspects, the device 205 and the device 210 may have more puncturing flexibility for OFDMA transmissions. In some aspects, a receiver may not know an OFDMA pattern for response, so the device 205 and the device 210 may use one of the puncturing patterns 1600 if a TB response is used. In OFDMA, each 80 MHz may have a different puncturing mode.

Figure 17:
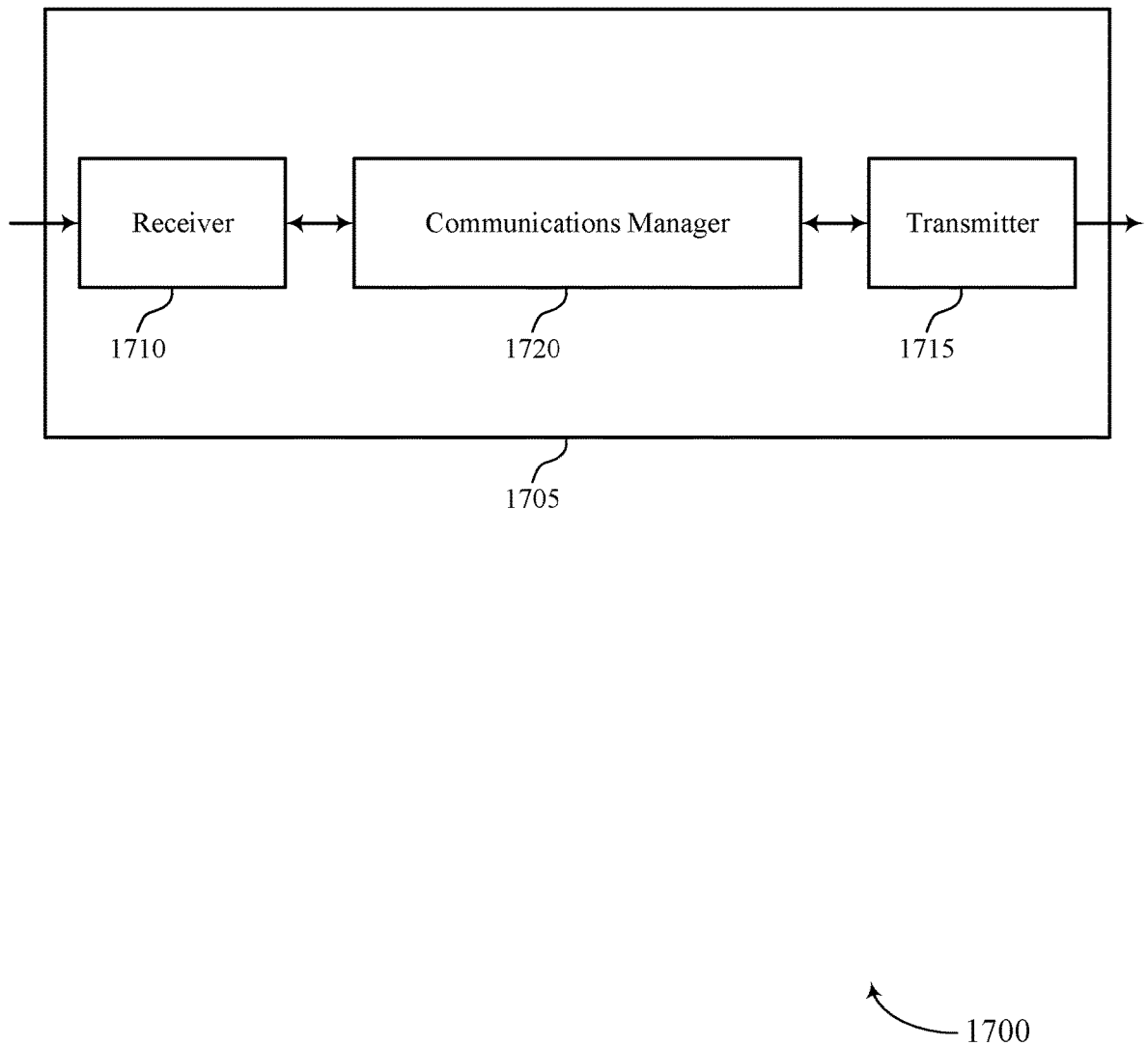
FIGS. 17 and 18 show block diagrams of devices that support techniques for wide bandwidth positioning in a WLAN in accordance with one or more aspects of the present disclosure.

FIG. 17 shows a block diagram 1700 of a device 1705 that supports techniques for wide bandwidth positioning in a wireless local area network in accordance with one or more aspects of the present disclosure. The device 1705 may be an example of aspects of an AP or an STA as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to techniques for wide bandwidth (e.g., and high-frequency) positioning in a wireless local area network). Information may be passed on to other components of the device 1705. The receiver 1710 may utilize a single antenna or a set of multiple antennas.

The transmitter 1715 may provide a means for transmitting signals generated by other components of the device 1705. The transmitter 1715 may utilize a single antenna or a set of multiple antennas.

The communications manager 1720, the receiver 1710, the transmitter 1715, or various combinations thereof or various components thereof may be examples of means for performing various aspects of techniques for wide bandwidth (e.g., and high-frequency) positioning in a wireless local area network as described herein. For example, the communications manager 1720, the receiver 1710, the transmitter 1715, or various combinations or components thereof may support a method for performing one or more of the functions described herein.

In some examples, the communications manager 1720, the receiver 1710, the transmitter 1715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1720, the receiver 1710, the transmitter 1715, or various combinations or components thereof may be implemented in code (e.g., as communications management software or firmware) executed by a processor. If implemented in code executed by a processor, the functions of the communications manager 1720, the receiver 1710, the transmitter 1715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1720 may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communication at a first device in accordance with examples as disclosed herein. For example, the communications manager 1720 may be configured as or otherwise support a means for receiving, from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The communications manager 1720 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz. The communications manager 1720 may be configured as or otherwise support a means for determining, based on measurements made of the first set of one or more ranging NDPs, a distance between the first device and the second device.

Additionally, or alternatively, the communications manager 1720 may support wireless communication at a first device in accordance with examples as disclosed herein. For example, the communications manager 1720 may be configured as or otherwise support a means for receiving, from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The communications manager 1720 may be configured as or otherwise support a means for transmitting, to the second device, a first set of one or more ranging NDPs based on the indication of the bandwidth and an indication of a presence of a puncturing pattern that is associated with the bandwidth of the ranging NDPs being greater than 160 MHz. The communications manager 1720 may be configured as or otherwise support a means for determining, based on the first set of one or more ranging NDPs, a distance between the first device and the second device.

Additionally, or alternatively, the communications manager 1720 may support wireless communication at a first device in accordance with examples as disclosed herein. For example, the communications manager 1720 may be configured as or otherwise support a means for receiving, from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the NDPs being greater than 160 megahertz (MHz). The communications manager 1720 may be configured as or otherwise support a means for transmitting, to the second device and in accordance with the session negotiation procedure, a fine timing measurement frame that includes an acknowledgement of the bandwidth of the NDPs being greater than 160 MHz. The communications manager 1720 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 1720 may support wireless communication at a first device in accordance with examples as disclosed herein. For example, the communications manager 1720 may be configured as or otherwise support a means for generating, for a ranging measurement procedure between the first device and a second device, a sequence of pseudo-random octets associated with one or more ranging null data packets (NDPs), a bandwidth of the one or more ranging NDPs being greater than 160 megahertz (MHz). The communications manager 1720 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The communications manager 1720 may be configured as or otherwise support a means for transmitting, to the second device, the one or more ranging NDPs based on segmenting the sequence of pseudo-random octets into the set of multiple sequence segments. The communications manager 1720 may be configured as or otherwise support a means for determining, based on the one or more ranging NDPs, a distance between the first device and the second device.

Additionally, or alternatively, the communications manager 1720 may support wireless communications in accordance with examples as disclosed herein. For example, the communications manager 1720 may be configured as or otherwise support a means for transmitting, to a first device from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The communications manager 1720 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz. The communications manager 1720 may be configured as or otherwise support a means for determining, based on the first set of one or more ranging NDPs, a distance between the first device and the second device.

Additionally, or alternatively, the communications manager 1720 may support wireless communications in accordance with examples as disclosed herein. For example, the communications manager 1720 may be configured as or otherwise support a means for transmitting, to a first device from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The communications manager 1720 may be configured as or otherwise support a means for receiving, from the first device, a first set of one or more ranging NDPs based on the indication of the bandwidth and an indication of a presence of a puncturing pattern that is associated with the bandwidth of the ranging NDPs being greater than 160 MHz. The communications manager 1720 may be configured as or otherwise support a means for determining, based on measurements of the first set of one or more ranging NDPs, a distance between the first device and the second device.

Additionally, or alternatively, the communications manager 1720 may support wireless communications in accordance with examples as disclosed herein. For example, the communications manager 1720 may be configured as or otherwise support a means for transmitting, to a first device from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the ranging NDPs being greater than 160 megahertz (MHz). The communications manager 1720 may be configured as or otherwise support a means for receiving, from the first device and in accordance with the session negotiation, a fine timing measurement frame that includes an acknowledgement of the bandwidth of the ranging NDPs being greater than 160 MHz. The communications manager 1720 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 1720 may support wireless communications in accordance with examples as disclosed herein. For example, the communications manager 1720 may be configured as or otherwise support a means for generating, for a ranging measurement procedure between a first device and a second device, a sequence of pseudo-random octets associated with one or more ranging null data packets (NDPs), a bandwidth of the one or more ranging NDPs being greater than 160 megahertz (MHz). The communications manager 1720 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The communications manager 1720 may be configured as or otherwise support a means for receiving, from the first device, the one or more ranging NDPs based on segmenting the sequence of pseudo-random octets into the set of multiple sequence segments. The communications manager 1720 may be configured as or otherwise support a means for determining, based on measurements of the one or more ranging NDPs, a distance between the first device and the second device.

By including or configuring the communications manager 1720 in accordance with examples as described herein, the device 1705 (e.g., a processor controlling or otherwise coupled with the receiver 1710, the transmitter 1715, the communications manager 1720, or a combination thereof) may support techniques for reduced processing, reduced power consumption, and more efficient utilization of communication resources.

Figure 18:
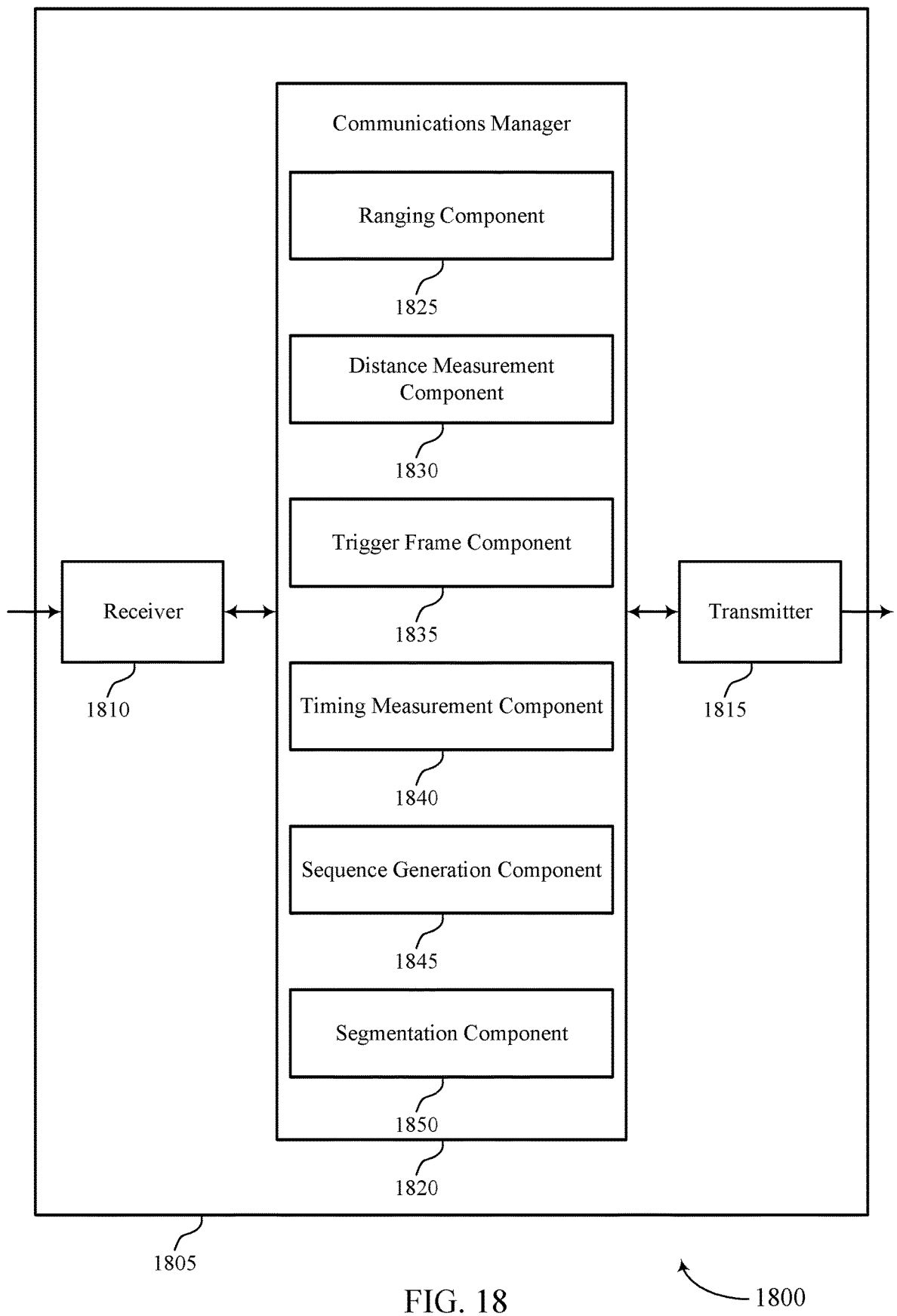

FIG. 18 shows a block diagram 1800 of a device 1805 that supports techniques for wide bandwidth positioning in a wireless local area network in accordance with one or more aspects of the present disclosure. The device 1805 may be an example of aspects of a device 1705, an AP 105, or an STA 115 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to techniques for wide bandwidth (e.g., and high-frequency) positioning in a wireless local area network). Information may be passed on to other components of the device 1805. The receiver 1810 may utilize a single antenna or a set of multiple antennas.

The transmitter 1815 may provide a means for transmitting signals generated by other components of the device 1805. The transmitter 1815 may utilize a single antenna or a set of multiple antennas.

The device 1805, or various components thereof, may be an example of means for performing various aspects of techniques for wide bandwidth (e.g., and high-frequency) positioning in a wireless local area network as described herein. For example, the communications manager 1820 may include a ranging component 1825, a distance measurement component 1830, a trigger frame component 1835, a timing measurement component 1840, a sequence generation component 1845, a segmentation component 1850, or any combination thereof. The communications manager 1820 may be an example of aspects of a communications manager 1720 as described herein. In some examples, the communications manager 1820, or various components thereof, may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communication at a first device in accordance with examples as disclosed herein. The ranging component 1825 may be configured as or otherwise support a means for receiving, from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The ranging component 1825 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz. The distance measurement component 1830 may be configured as or otherwise support a means for determining, based on measurements made of the first set of one or more ranging NDPs, a distance between the first device and the second device.

Additionally, or alternatively, the communications manager 1820 may support wireless communication at a first device in accordance with examples as disclosed herein. The trigger frame component 1835 may be configured as or otherwise support a means for receiving, from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The ranging component 1825 may be configured as or otherwise support a means for transmitting, to the second device, a first set of one or more ranging NDPs based on the indication of the bandwidth and an indication of a presence of a puncturing pattern that is associated with the bandwidth of the ranging NDPs being greater than 160 MHz. The distance measurement component 1830 may be configured as or otherwise support a means for determining, based on the first set of one or more ranging NDPs, a distance between the first device and the second device.

Additionally, or alternatively, the communications manager 1820 may support wireless communication at a first device in accordance with examples as disclosed herein. The timing measurement component 1840 may be configured as or otherwise support a means for receiving, from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the NDPs being greater than 160 megahertz (MHz). The timing measurement component 1840 may be configured as or otherwise support a means for transmitting, to the second device and in accordance with the session negotiation procedure, a fine timing measurement frame that includes an acknowledgement of the bandwidth of the NDPs being greater than 160 MHz. The ranging component 1825 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 1820 may support wireless communication at a first device in accordance with examples as disclosed herein. The sequence generation component 1845 may be configured as or otherwise support a means for generating, for a ranging measurement procedure between the first device and a second device, a sequence of pseudo-random octets associated with one or more ranging null data packets (NDPs), a bandwidth of the one or more ranging NDPs being greater than 160 megahertz (MHz). The segmentation component 1850 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The ranging component 1825 may be configured as or otherwise support a means for transmitting, to the second device, the one or more ranging NDPs based on segmenting the sequence of pseudo-random octets into the set of multiple sequence segments. The distance measurement component 1830 may be configured as or otherwise support a means for determining, based on the one or more ranging NDPs, a distance between the first device and the second device.

Additionally, or alternatively, the communications manager 1820 may support wireless communications in accordance with examples as disclosed herein. The ranging component 1825 may be configured as or otherwise support a means for transmitting, to a first device from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The ranging component 1825 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz. The distance measurement component 1830 may be configured as or otherwise support a means for determining, based on the first set of one or more ranging NDPs, a distance between the first device and the second device.

Additionally, or alternatively, the communications manager 1820 may support wireless communications in accordance with examples as disclosed herein. The trigger frame component 1835 may be configured as or otherwise support a means for transmitting, to a first device from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The ranging component 1825 may be configured as or otherwise support a means for receiving, from the first device, a first set of one or more ranging NDPs based on the indication of the bandwidth and an indication of a presence of a puncturing pattern that is associated with the bandwidth of the ranging NDPs being greater than 160 MHz. The distance measurement component 1830 may be configured as or otherwise support a means for determining, based on measurements of the first set of one or more ranging NDPs, a distance between the first device and the second device.

Additionally, or alternatively, the communications manager 1820 may support wireless communications in accordance with examples as disclosed herein. The timing measurement component 1840 may be configured as or otherwise support a means for transmitting, to a first device from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the ranging NDPs being greater than 160 megahertz (MHz). The timing measurement component 1840 may be configured as or otherwise support a means for receiving, from the first device and in accordance with the session negotiation, a fine timing measurement frame that includes an acknowledgement of the bandwidth of the ranging NDPs being greater than 160 MHz. The ranging component 1825 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 1820 may support wireless communications in accordance with examples as disclosed herein. The sequence generation component 1845 may be configured as or otherwise support a means for generating, for a ranging measurement procedure between a first device and a second device, a sequence of pseudo-random octets associated with one or more ranging null data packets (NDPs), a bandwidth of the one or more ranging NDPs being greater than 160 megahertz (MHz). The segmentation component 1850 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The ranging component 1825 may be configured as or otherwise support a means for receiving, from the first device, the one or more ranging NDPs based on segmenting the sequence of pseudo-random octets into the set of multiple sequence segments. The distance measurement component 1830 may be configured as or otherwise support a means for determining, based on measurements of the one or more ranging NDPs, a distance between the first device and the second device.

Figure 19:
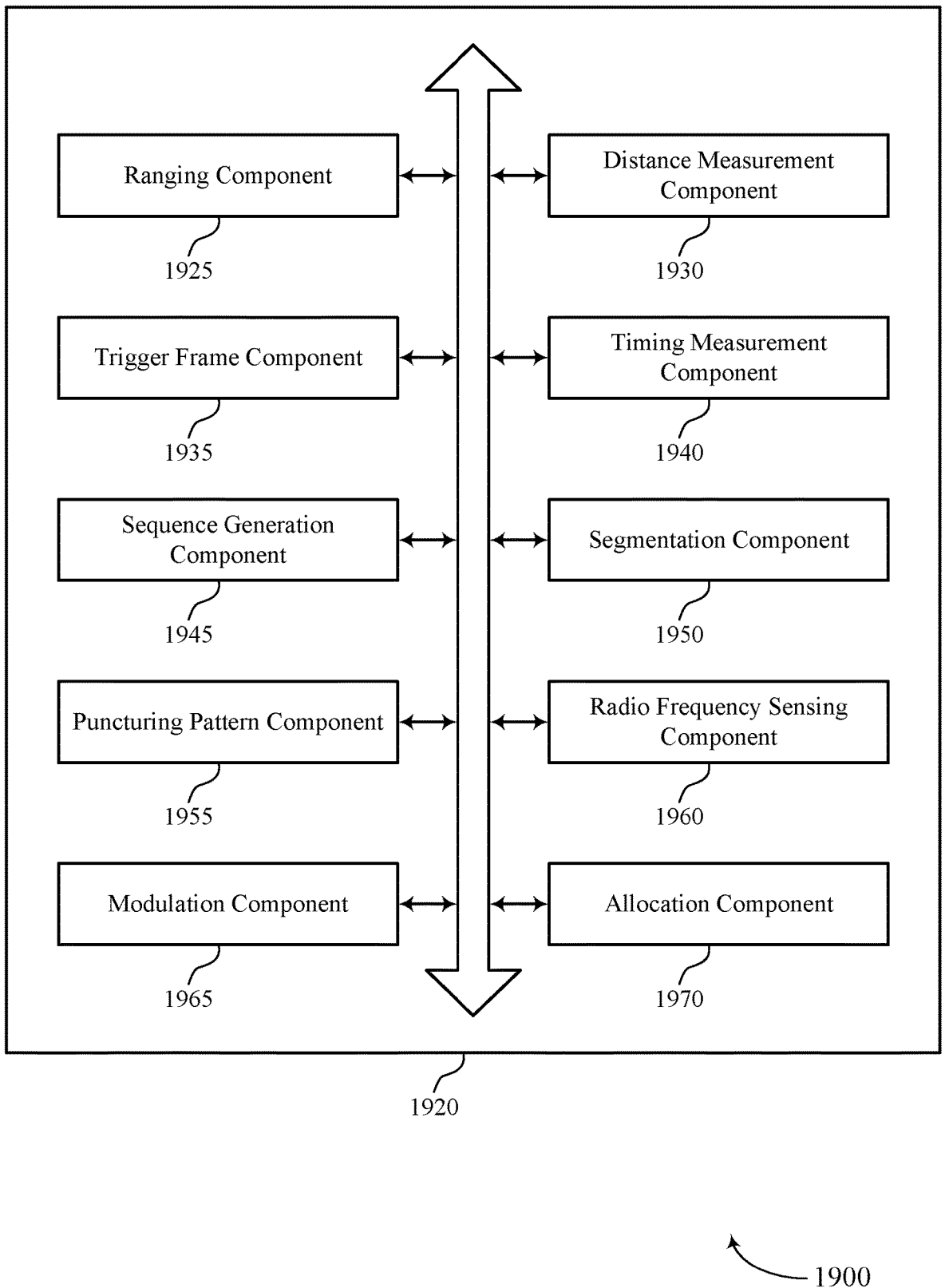
FIG. 19 shows a block diagram of a communications manager that supports techniques for wide bandwidth positioning in a WLAN in accordance with one or more aspects of the present disclosure.

FIG. 19 shows a block diagram 1900 of a communications manager 1920 that supports techniques for wide bandwidth positioning in a wireless local area network in accordance with one or more aspects of the present disclosure. The communications manager 1920 may be an example of aspects of a communications manager 1720, a communications manager 1820, or both, as described herein. The communications manager 1920, or various components thereof, may be an example of means for performing various aspects of techniques for wide bandwidth (e.g., and high-frequency) positioning in a wireless local area network as described herein. For example, the communications manager 1920 may include a ranging component 1925, a distance measurement component 1930, a trigger frame component 1935, a timing measurement component 1940, a sequence generation component 1945, a segmentation component 1950, a puncturing pattern component 1955, a radio frequency sensing component 1960, a modulation component 1965, an allocation component 1970, or any combination thereof. Each of these components may communicate, directly or indirectly, with one another (e.g., via one or more buses).

The communications manager 1920 may support wireless communication at a first device in accordance with examples as disclosed herein. The ranging component 1925 may be configured as or otherwise support a means for receiving, from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). In some examples, the ranging component 1925 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz. The distance measurement component 1930 may be configured as or otherwise support a means for determining, based on measurements made of the first set of one or more ranging NDPs, a distance between the first device and the second device.

In some examples, to support receiving the indication of the bandwidth of the ranging NDPs, the ranging component 1925 may be configured as or otherwise support a means for receiving the indication of the bandwidth via a bandwidth (BW) field in a universal signal (U-SIG) field of the PPDU.

In some examples, the PPDU is an extremely high throughput multi-user PPDU (EHT MU PPDU). In some examples, the U-SIG field is located in a physical preamble portion of the EHT MU PPDU.

In some examples, to support receiving the indication of the bandwidth of the ranging NDPs, the ranging component 1925 may be configured as or otherwise support a means for receiving the indication of the bandwidth via a bit in a SERVICE field of the PPDU.

In some examples, the PPDU is a non-high throughput duplicate PPDU (non-HT duplicate PPDU). In some examples, the bit is a seventh bit in the SERVICE field and is set to a one value to indicate the bandwidth of the ranging NDPs.

In some examples, the puncturing pattern component 1955 may be configured as or otherwise support a means for receiving, in one or more of a beacon frame, a fine timing measurement request frame, or a fine timing measurement frame, a message that indicates a configuration of the puncturing pattern for the ranging NDPs.

In some examples, the puncturing pattern component 1955 may be configured as or otherwise support a means for receiving, in the ranging NDPA frame including the indication of the bandwidth of the ranging NDPs, a message that indicates a dynamic configuration of the puncturing pattern for the ranging NDPs.

In some examples, the puncturing pattern component 1955 may be configured as or otherwise support a means for applying the puncturing pattern that is associated with the bandwidth of the ranging NDPs to the first set of one or more ranging NDPs. In some examples, the puncturing pattern component 1955 may be configured as or otherwise support a means for applying a different puncturing pattern to other ranging NDPs outside of the first set of one or more ranging NDPs.

In some examples, the indication of the puncturing pattern that is associated with the bandwidth is received in an association identifier subfield of an STA information field of the ranging NDPA frame. In some examples, the ranging NDPA frame is transmitted in a non-high throughput duplicate PPDU (non-HT duplicate PPDU).

In some examples, the ranging component 1925 may be configured as or otherwise support a means for transmitting, to the second device, a second set of one or more ranging NDPs based on the bandwidth and the indication of the presence of the puncturing pattern, where determining the distance between the first device and the second device is based on a round-trip time associated with the first set of one or more ranging NDPs and the second set of one or more ranging NDPs.

In some examples, the PPDU includes, in a physical layer service data unit (PSDU) portion of the PPDU, the ranging NDPA frame including an NDP announcement variant subfield, the NDP announcement variant subfield including a first bit set to a zero value and a second bit set to a one value.

In some examples, the radio frequency sensing component 1960 may be configured as or otherwise support a means for performing a radio frequency sensing based on the first set of one or more ranging NDPs to obtain CSI of a local environment.

In some examples, the bandwidth of the ranging NDPs is 320 MHz.

Additionally, or alternatively, the communications manager 1920 may support wireless communication at a first device in accordance with examples as disclosed herein. The trigger frame component 1935 may be configured as or otherwise support a means for receiving, from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). In some examples, the ranging component 1925 may be configured as or otherwise support a means for transmitting, to the second device, a first set of one or more ranging NDPs based on the indication of the bandwidth and an indication of a presence of a puncturing pattern that is associated with the bandwidth of the ranging NDPs being greater than 160 MHz. In some examples, the distance measurement component 1930 may be configured as or otherwise support a means for determining, based on the first set of one or more ranging NDPs, a distance between the first device and the second device.

In some examples, to support receiving the trigger frame, the trigger frame component 1935 may be configured as or otherwise support a means for receiving the indication of the bandwidth based on an association identifier subfield and a bandwidth (BW) subfield of a user information field in the trigger frame.

In some examples, to support receiving the trigger frame, the trigger frame component 1935 may be configured as or otherwise support a means for receiving a bit in a common information field of the trigger frame that indicates a presence of the user information field in the trigger frame, where the user information field immediately follows the common information field, and where receiving the indication of the bandwidth via the association identifier subfield of the user information field in the trigger frame is based on the bit of the common information field indicating the presence of the user information field in the trigger frame.

In some examples, to support receiving the trigger frame, the trigger frame component 1935 may be configured as or otherwise support a means for receiving the indication of the bandwidth via one or more common information fields in the trigger frame.

In some examples, the indication of the bandwidth is included in an uplink high-efficiency signal A2 reserved (UL-RE-SIG-A2 reserved) subfield. In some examples, a bit of the UL-HE-SIG-A2 reserved subfield is set to a zero value to indicate the bandwidth of the ranging NDPs.

In some examples, the indication of the bandwidth is included in a common information field or in a trigger-dependent common information field. In some examples, at least a bit in the common information field or in the trigger-dependent common information field is set to a one value to indicate the bandwidth of the ranging NDPs.

In some examples, to support receiving the trigger frame, the trigger frame component 1935 may be configured as or otherwise support a means for receiving a resource unit allocation subfield of a user information field in the trigger frame that indicates the puncturing pattern.

In some examples, to support receiving the trigger frame, the trigger frame component 1935 may be configured as or otherwise support a means for receiving a user information field in the trigger frame that indicates the puncturing pattern via a field format exclusively associated with indicating the puncturing pattern.

In some examples, the puncturing pattern component 1955 may be configured as or otherwise support a means for receiving, in one or more of a beacon frame, a fine timing measurement request frame, or a fine timing measurement frame, a message that indicates the puncturing pattern for the ranging NDPs.

In some examples, the ranging component 1925 may be configured as or otherwise support a means for receiving, from the second device, a second set of one or more ranging NDPs based on the bandwidth and the indication of the presence of the puncturing pattern, where determining the distance between the first device and the second device is based on a round-trip time associated with the first set of one or more ranging NDPs and the second set of one or more ranging NDPs.

In some examples, the bandwidth of the ranging NDPs is 320 MHz.

Additionally, or alternatively, the communications manager 1920 may support wireless communication at a first device in accordance with examples as disclosed herein. The timing measurement component 1940 may be configured as or otherwise support a means for receiving, from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the NDPs being greater than 160 megahertz (MHz). In some examples, the timing measurement component 1940 may be configured as or otherwise support a means for transmitting, to the second device and in accordance with the session negotiation procedure, a fine timing measurement frame that includes an acknowledgement of the bandwidth of the NDPs being greater than 160 MHz. In some examples, the ranging component 1925 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz.

In some examples, to support transmitting the fine timing measurement frame, the timing measurement component 1940 may be configured as or otherwise support a means for transmitting one or both of the indication of the bandwidth and an indication of the puncturing pattern via a format and bandwidth field of the fine timing measurement frame.

In some examples, each value of a subset of values of the format and bandwidth field of the fine timing measurement frame corresponds to one or more of a unique bandwidth that is greater than 160 MHz, a quantity of local oscillators associated with the unique bandwidth, and a puncturing pattern associated with the unique bandwidth.

In some examples, to support transmitting the fine timing measurement frame, the timing measurement component 1940 may be configured as or otherwise support a means for transmitting, in one or more sub-elements of the fine timing measurement frame that are associated with the ranging measurement procedure, a sub-element that indicates the puncturing pattern.

In some examples, the sub-element includes an extremely high throughput (EHT) operation element of a beacon frame of a basic serving set (BSS) to which the first device belongs.

In some examples, the sub-element includes a format exclusively associated with indicating the puncturing pattern. In some examples, the sub-element includes a bitmap to be used for indicating the puncturing pattern.

In some examples, to support transmitting the fine timing measurement frame, the timing measurement component 1940 may be configured as or otherwise support a means for transmitting, in one or more sub-elements of the fine timing measurement frame that are associated with the ranging measurement procedure, a sub-element that indicates a transmission power envelope associated with the ranging NDPs, where a transmit power configuration indicated by the transmission power envelope is associated with the bandwidth of the ranging NDPs being greater than 160 MHz.

In some examples, the ranging component 1925 may be configured as or otherwise support a means for transmitting, to the second device, one or more session update messages associated with one or both of an updated bandwidth for the ranging NDPs and an updated puncturing pattern for the ranging NDPs. In some examples, the ranging component 1925 may be configured as or otherwise support a means for receiving, from the second device, a second set of one or more ranging NDPs based on the updated bandwidth and the updated puncturing pattern. In some examples, the distance measurement component 1930 may be configured as or otherwise support a means for determining, based on measurements made of the second set of one or more ranging NDPs, an updated distance between the first device and the second device.

In some examples, the timing measurement component 1940 may be configured as or otherwise support a means for receiving, from the second device, a second fine timing measurement request frame that indicates one or both of the updated bandwidth of the ranging NDPs and the updated puncturing pattern for the ranging NDPs based on the one or more session update messages being associated with a session termination. In some examples, the timing measurement component 1940 may be configured as or otherwise support a means for transmitting, to the second device, a second fine timing measurement frame that acknowledges one or both of the updated bandwidth of the ranging NDPs and the updated puncturing pattern for the ranging NDPs.

In some examples, to support transmitting the fine timing measurement frame, the timing measurement component 1940 may be configured as or otherwise support a means for transmitting the acknowledgement of one or both of the bandwidth and the puncturing pattern via a format and bandwidth field of the fine timing measurement frame.

In some examples, to support transmitting the fine timing measurement frame, the timing measurement component 1940 may be configured as or otherwise support a means for transmitting an acknowledgement of the puncturing pattern via a sub-element of one or more sub-elements of the fine timing measurement frame that are associated with the ranging measurement procedure.

In some examples, the ranging component 1925 may be configured as or otherwise support a means for transmitting, to the second device, a second set of one or more ranging NDPs based on the bandwidth and the puncturing pattern, where a distance between the first device and the second device is based on a round-trip time associated with the first set of one or more ranging NDPs and the second set of one or more ranging NDPs.

In some examples, the bandwidth of the ranging NDPs is 320 MHz.

In some examples, to support receiving the fine timing measurement frame, the puncturing pattern component 1955 may be configured as or otherwise support a means for receiving an acknowledgement of the puncturing pattern via a sub-element of one or more sub-elements of the fine timing measurement frame that are associated with the ranging measurement procedure.

Additionally, or alternatively, the communications manager 1920 may support wireless communication at a first device in accordance with examples as disclosed herein. The sequence generation component 1945 may be configured as or otherwise support a means for generating, for a ranging measurement procedure between the first device and a second device, a sequence of pseudo-random octets associated with one or more ranging null data packets (NDPs), a bandwidth of the one or more ranging NDPs being greater than 160 megahertz (MHz). The segmentation component 1950 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. In some examples, the ranging component 1925 may be configured as or otherwise support a means for transmitting, to the second device, the one or more ranging NDPs based on segmenting the sequence of pseudo-random octets into the set of multiple sequence segments. In some examples, the distance measurement component 1930 may be configured as or otherwise support a means for determining, based on the one or more ranging NDPs, a distance between the first device and the second device.

In some examples, to support segmenting the sequence of pseudo-random octets into the set of multiple sequence segments, the segmentation component 1950 may be configured as or otherwise support a means for inputting the sequence of pseudo-random octets into a segment parser to obtain a quantity of outputs equal to a quantity of the set of multiple sequence segments, where the segment parser is based on the bandwidth and the puncturing pattern. In some examples, to support segmenting the sequence of pseudo-random octets into the set of multiple sequence segments, the modulation component 1965 may be configured as or otherwise support a means for modulating the quantity of outputs. In some examples, to support segmenting the sequence of pseudo-random octets into the set of multiple sequence segments, the allocation component 1970 may be configured as or otherwise support a means for allocating, for each of the quantity of outputs, information of an output of the quantity of outputs to frequency domain tones of a respective sequence segment of the set of multiple sequence segments.

In some examples, the bandwidth is of a first value. In some examples, a sequence segment bandwidth of each of the set of multiple sequence segments is a second value that is evenly divisible into the first value.

In some examples, to support segmenting the sequence of pseudo-random octets into the set of multiple sequence segments, the segmentation component 1950 may be configured as or otherwise support a means for segmenting, using the segment parser, the sequence of pseudo-random octets into four sequence segments based on the puncturing pattern corresponding to a lack of puncturing.

In some examples, the bandwidth of the one or more ranging NDPs is 320 MHz. In some examples, the four sequence segments are allocated to frequency domain tones of respective 80 MHz segments of the 320 MHz.

In some examples, to support segmenting the sequence of pseudo-random octets into the set of multiple sequence segments, the segmentation component 1950 may be configured as or otherwise support a means for segmenting, using the segment parser, the sequence of pseudo-random octets into three sequence segments based on the puncturing pattern corresponding to an 80 MHz puncturing.

In some examples, the bandwidth of the one or more ranging NDPs is 320 MHz. In some examples, the three sequence segments are allocated to frequency domain tones of respective 80 MHz segments of the 320 MHz. In some examples, one 80 MHz segment of the 320 MHz is punctured in accordance with the puncturing pattern corresponding to the 80 MHz puncturing.

In some examples, the bandwidth is of a first value. In some examples, a first sequence segment bandwidth of each of a first subset of the set of multiple sequence segments is a second value that is evenly divisible into the first value. In some examples, a second sequence segment bandwidth of each of a second subset of the set of multiple sequence segments is a third value that is evenly divisible into the second value.

In some examples, to support segmenting the sequence of pseudo-random octets into the set of multiple sequence segments, the segmentation component 1950 may be configured as or otherwise support a means for segmenting, using the segment parser, the sequence of pseudo-random octets into four sequence segments based on the puncturing pattern corresponding to a 40 MHz puncturing.

In some examples, the bandwidth of the one or more ranging NDPs is 320 MHz. In some examples, three of the four sequence segments are allocated to frequency domain tones of respective 80 MHz segments of the 320 MHz. In some examples, a first portion of a remaining sequence segment is allocated to frequency domain tones of a 40 MHz segment of the 320 MHz and a second portion of the remaining sequence segment is dropped.

In some examples, the ranging component 1925 may be configured as or otherwise support a means for receiving, from the second device, a second set of one or more ranging NDPs based on the bandwidth and the puncturing pattern, where determining the distance between the first device and the second device is based on a round-trip time associated with the first set of one or more ranging NDPs and the second set of one or more ranging NDPs.

In some examples, the one or more ranging NDPs include a packet extension field of eight microseconds based on the bandwidth of the one or more ranging NDPs being greater than 160 MHz.

Additionally, or alternatively, the communications manager 1920 may support wireless communications in accordance with examples as disclosed herein. In some examples, the ranging component 1925 may be configured as or otherwise support a means for transmitting, to a first device from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). In some examples, the ranging component 1925 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz. In some examples, the distance measurement component 1930 may be configured as or otherwise support a means for determining, based on the first set of one or more ranging NDPs, a distance between the first device and the second device.

In some examples, to support transmitting the indication of the bandwidth of the ranging NDPs, the ranging component 1925 may be configured as or otherwise support a means for transmitting the indication of the bandwidth via a bandwidth (BW) field in a universal signal (U-SIG) subfield of the PPDU.

In some examples, the PPDU is an extremely high throughput multi-user PPDU (EHT MU PPDU). In some examples, the U-SIG subfield is located in a physical preamble portion of the EHT MU PPDU.

In some examples, to support transmitting the indication of the bandwidth of the ranging NDPs, the ranging component 1925 may be configured as or otherwise support a means for transmitting the indication of the bandwidth via a bit in a SERVICE field of the PPDU.

In some examples, the PPDU is a non-high throughput duplicate PPDU (non-HT duplicate PPDU). In some examples, the bit is a seventh bit in the SERVICE field and is set to a one value to indicate the bandwidth of the ranging NDPs.

In some examples, the puncturing pattern component 1955 may be configured as or otherwise support a means for transmitting, in one or more of a beacon frame, a fine timing measurement request frame, or a fine timing measurement frame, a message that indicates a configuration of the puncturing pattern for the ranging NDPs.

In some examples, the puncturing pattern component 1955 may be configured as or otherwise support a means for transmitting, in the ranging NDPA frame including the indication of the bandwidth of the ranging NDPs, a message that indicates a dynamic configuration of the puncturing pattern for the ranging NDPs.

In some examples, the puncturing pattern component 1955 may be configured as or otherwise support a means for applying the puncturing pattern that is associated with the bandwidth of the ranging NDPs to the first set of one or more ranging NDPs. In some examples, the puncturing pattern component 1955 may be configured as or otherwise support a means for applying a different puncturing pattern to other ranging NDPs outside of the first set of one or more ranging NDPs.

In some examples, the indication of the puncturing pattern that is associated with the bandwidth is transmitted in an association identifier subfield of an STA information field of the ranging NDPA frame. In some examples, the ranging NDPA frame is transmitted in a non-high throughput duplicate PPDU (non-HT duplicate PPDU).

In some examples, the ranging component 1925 may be configured as or otherwise support a means for receiving, from the first device, a second set of one or more ranging NDPs based on the bandwidth and the indication of the presence of the puncturing pattern, where determining the distance between the first device and the second device is based on a round-trip time associated with the first set of one or more ranging NDPs and the second set of one or more ranging NDPs.

In some examples, the PPDU includes, in a physical layer service data unit (PSDU) portion of the PPDU, the ranging NDPA frame including an NDP announcement variant subfield, the NDP announcement variant subfield including a first bit set to a zero value and a second bit set to a one value.

In some examples, the radio frequency sensing component 1960 may be configured as or otherwise support a means for performing a radio frequency sensing based on the first set of one or more ranging NDPs to obtain CSI of a local environment.

In some examples, the bandwidth of the ranging NDPs is 320 MHz.

Additionally, or alternatively, the communications manager 1920 may support wireless communications in accordance with examples as disclosed herein. In some examples, the trigger frame component 1935 may be configured as or otherwise support a means for transmitting, to a first device from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). In some examples, the ranging component 1925 may be configured as or otherwise support a means for receiving, from the first device, a first set of one or more ranging NDPs based on the indication of the bandwidth and an indication of a presence of a puncturing pattern that is associated with the bandwidth of the ranging NDPs being greater than 160 MHz. In some examples, the distance measurement component 1930 may be configured as or otherwise support a means for determining, based on measurements of the first set of one or more ranging NDPs, a distance between the first device and the second device.

In some examples, to support transmitting the trigger frame, the trigger frame component 1935 may be configured as or otherwise support a means for transmitting the indication of the bandwidth based on an association identifier subfield and a bandwidth (BW) subfield of a user information field in the trigger frame.

In some examples, to support transmitting the trigger frame, the trigger frame component 1935 may be configured as or otherwise support a means for transmitting a bit in a common information field of the trigger frame that indicates a presence of the user information field in the trigger frame, where the user information field immediately follows the common information field, and where transmitting the indication of the bandwidth via the association identifier subfield of the user information field in the trigger frame is based on the bit of the common information field indicating the presence of the user information field in the trigger frame.

In some examples, to support transmitting the trigger frame, the trigger frame component 1935 may be configured as or otherwise support a means for transmitting the indication of the bandwidth via one or more common information fields in the trigger frame.

In some examples, the indication of the bandwidth is included in an uplink high-efficiency signal A2 reserved (UL-RE-SIG-A2 reserved) subfield. In some examples, a bit of the UL-HE-SIG-A2 reserved subfield is set to a zero value to indicate the bandwidth of the ranging NDPs.

In some examples, the indication of the bandwidth is included in a common information field or in a trigger-dependent common information field. In some examples, at least a bit in the common information field or in the trigger-dependent common information field is set to a one value to indicate the bandwidth of the ranging NDPs.

In some examples, to support transmitting the trigger frame, the trigger frame component 1935 may be configured as or otherwise support a means for transmitting a resource unit allocation subfield of a user information field in the trigger frame that indicates the puncturing pattern.

In some examples, to support transmitting the trigger frame, the trigger frame component 1935 may be configured as or otherwise support a means for transmitting a user information field in the trigger frame that indicates the puncturing pattern via a field format exclusively associated with indicating the puncturing pattern.

In some examples, the puncturing pattern component 1955 may be configured as or otherwise support a means for transmitting, in one or more of a beacon frame, a fine timing measurement request frame, or a fine timing measurement frame, a message that indicates the puncturing pattern for the ranging NDPs.

In some examples, the ranging component 1925 may be configured as or otherwise support a means for transmitting, to the first device, a second set of one or more ranging NDPs based on the bandwidth and the indication of the presence of the puncturing pattern, where determining the distance between the first device and the second device is based on a round-trip time associated with the first set of one or more ranging NDPs and the second set of one or more ranging NDPs.

In some examples, the bandwidth of the ranging NDPs is 320 MHz.

Additionally, or alternatively, the communications manager 1920 may support wireless communications in accordance with examples as disclosed herein. In some examples, the timing measurement component 1940 may be configured as or otherwise support a means for transmitting, to a first device from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the ranging NDPs being greater than 160 megahertz (MHz). In some examples, the timing measurement component 1940 may be configured as or otherwise support a means for receiving, from the first device and in accordance with the session negotiation, a fine timing measurement frame that includes an acknowledgement of the bandwidth of the ranging NDPs being greater than 160 MHz. In some examples, the ranging component 1925 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz.

In some examples, to support receiving the fine timing measurement frame, the timing measurement component 1940 may be configured as or otherwise support a means for receiving one or both of the indication of the bandwidth and an indication of the puncturing pattern via a format and bandwidth field of the fine timing measurement frame.

In some examples, each value of a subset of values of the format and bandwidth field of the fine timing measurement frame corresponds to one or more of a unique bandwidth that is greater than 160 MHz, a quantity of local oscillators associated with the unique bandwidth, and a puncturing pattern associated with the unique bandwidth.

In some examples, to support receiving the fine timing measurement frame, the timing measurement component 1940 may be configured as or otherwise support a means for receiving, in one or more sub-elements of the fine timing measurement frame that are associated with the ranging measurement procedure, a sub-element that indicates the puncturing pattern.

In some examples, the sub-element includes an extremely high throughput (EHT) operation element of a beacon frame of a basic serving set (BSS) to which the first device belongs.

In some examples, the sub-element includes a format exclusively associated with indicating the puncturing pattern. In some examples, the sub-element includes a bitmap to be used for indicating the puncturing pattern.

In some examples, to support receiving the fine timing measurement frame, the timing measurement component 1940 may be configured as or otherwise support a means for receiving, in one or more sub-elements of the fine timing measurement frame that are associated with the ranging measurement procedure, a sub-element that indicates a transmission power envelope associated with the ranging NDPs, where a transmit power configuration indicated by the transmission power envelope is associated with the bandwidth of the ranging NDPs being greater than 160 MHz.

In some examples, the ranging component 1925 may be configured as or otherwise support a means for receiving, from the first device, one or more session update messages associated with one or both of an updated bandwidth for the ranging NDPs and an updated puncturing pattern for the ranging NDPs. In some examples, the ranging component 1925 may be configured as or otherwise support a means for transmitting, to the first device, a second set of one or more ranging NDPs based on the updated bandwidth and the updated puncturing pattern. In some examples, the distance measurement component 1930 may be configured as or otherwise support a means for determining, based on the second set of one or more ranging NDPs, an updated distance between the first device and the second device.

In some examples, the timing measurement component 1940 may be configured as or otherwise support a means for transmitting, to the first device, a second fine timing measurement request frame that indicates one or both of the updated bandwidth of the ranging NDPs and the updated puncturing pattern for the ranging NDPs based on the one or more session update messages being associated with a session termination. In some examples, the timing measurement component 1940 may be configured as or otherwise support a means for receiving, from the first device, a second fine timing measurement frame that acknowledges one or both of the updated bandwidth of the ranging NDPs and the updated puncturing pattern for the ranging NDPs.

In some examples, to support receiving the fine timing measurement frame, the puncturing pattern component 1955 may be configured as or otherwise support a means for receiving the acknowledgement of one or both of the bandwidth and the puncturing pattern via a format and bandwidth field of the fine timing measurement frame.

In some examples, the ranging component 1925 may be configured as or otherwise support a means for receiving, from the first device, a second set of one or more ranging NDPs based on the bandwidth and the puncturing pattern, where a distance between the first device and the second device is based on a round-trip time associated with the first set of one or more ranging NDPs and the second set of one or more ranging NDPs.

In some examples, the bandwidth of the ranging NDPs is 320 MHz.

Additionally, or alternatively, the communications manager 1920 may support wireless communications in accordance with examples as disclosed herein. In some examples, the sequence generation component 1945 may be configured as or otherwise support a means for generating, for a ranging measurement procedure between a first device and a second device, a sequence of pseudo-random octets associated with one or more ranging null data packets (NDPs), a bandwidth of the one or more ranging NDPs being greater than 160 megahertz (MHz). In some examples, the segmentation component 1950 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. In some examples, the ranging component 1925 may be configured as or otherwise support a means for receiving, from the first device, the one or more ranging NDPs based on segmenting the sequence of pseudo-random octets into the set of multiple sequence segments. In some examples, the distance measurement component 1930 may be configured as or otherwise support a means for determining, based on measurements of the one or more ranging NDPs, a distance between the first device and the second device.

In some examples, segmenting the sequence of pseudo-random octets into the set of multiple sequence segments includes inputting the sequence of pseudo-random octets into a segment parser to obtain a quantity of pseudo-random outputs equal to a quantity of the set of multiple sequence segments, the segment parser being based on the bandwidth and the puncturing pattern. In some examples, receiving the one or more ranging NDPs includes receiving, for each of the quantity of pseudo-random outputs, information of an output of the quantity of pseudo-random outputs over frequency domain tones of a respective sequence segment of the set of multiple sequence segments.

In some examples, the bandwidth is of a first value. In some examples, a sequence segment bandwidth of each of the set of multiple sequence segments is a second value that is evenly divisible into the first value.

In some examples, to support segmenting the sequence of pseudo-random octets into the set of multiple sequence segments, the segmentation component 1950 may be configured as or otherwise support a means for segmenting, using the segment parser, the sequence of pseudo-random octets into four sequence segments based on the puncturing pattern corresponding to a lack of puncturing.

In some examples, the bandwidth of the one or more ranging NDPs is 320 MHz. In some examples, the four sequence segments are allocated to frequency domain tones of respective 80 MHz segments of the 320 MHz.

In some examples, to support segmenting the sequence of pseudo-random octets into the set of multiple sequence segments, the segmentation component 1950 may be configured as or otherwise support a means for segmenting, using the segment parser, the sequence of pseudo-random octets into three sequence segments based on the puncturing pattern corresponding to an 80 MHz puncturing.

In some examples, the bandwidth of the one or more ranging NDPs is 320 MHz. In some examples, the three sequence segments are allocated to frequency domain tones of respective 80 MHz segments of the 320 MHz. In some examples, one 80 MHz segment of the 320 MHz is punctured in accordance with the puncturing pattern corresponding to the 80 MHz puncturing.

In some examples, the bandwidth is of a first value. In some examples, a first sequence segment bandwidth of each of a first subset of the set of multiple sequence segments is a second value that is evenly divisible into the first value. In some examples, a second sequence segment bandwidth of each of a second subset of the set of multiple sequence segments is a third value that is evenly divisible into the second value.

In some examples, to support segmenting the sequence of pseudo-random octets into the set of multiple sequence segments, the segmentation component 1950 may be configured as or otherwise support a means for segmenting, using the segment parser, the sequence of pseudo-random octets into four sequence segments based on the puncturing pattern corresponding to a 40 MHz puncturing.

In some examples, the bandwidth of the one or more ranging NDPs is 320 MHz. In some examples, three of the four sequence segments are allocated to frequency domain tones of respective 80 MHz segments of the 320 MHz. In some examples, a first portion of a remaining sequence segment is allocated to frequency domain tones of a 40 MHz segment of the 320 MHz and a second portion of the remaining sequence segment is dropped.

In some examples, the ranging component 1925 may be configured as or otherwise support a means for transmitting, to the first device, a second set of one or more ranging NDPs based on the bandwidth and the puncturing pattern, where determining the distance between the first device and the second device is based on a round-trip time associated with the first set of one or more ranging NDPs and the second set of one or more ranging NDPs.

In some examples, the one or more ranging NDPs include a packet extension field of eight microseconds based on the bandwidth of the one or more ranging NDPs being greater than 160 MHz.

Figure 20:
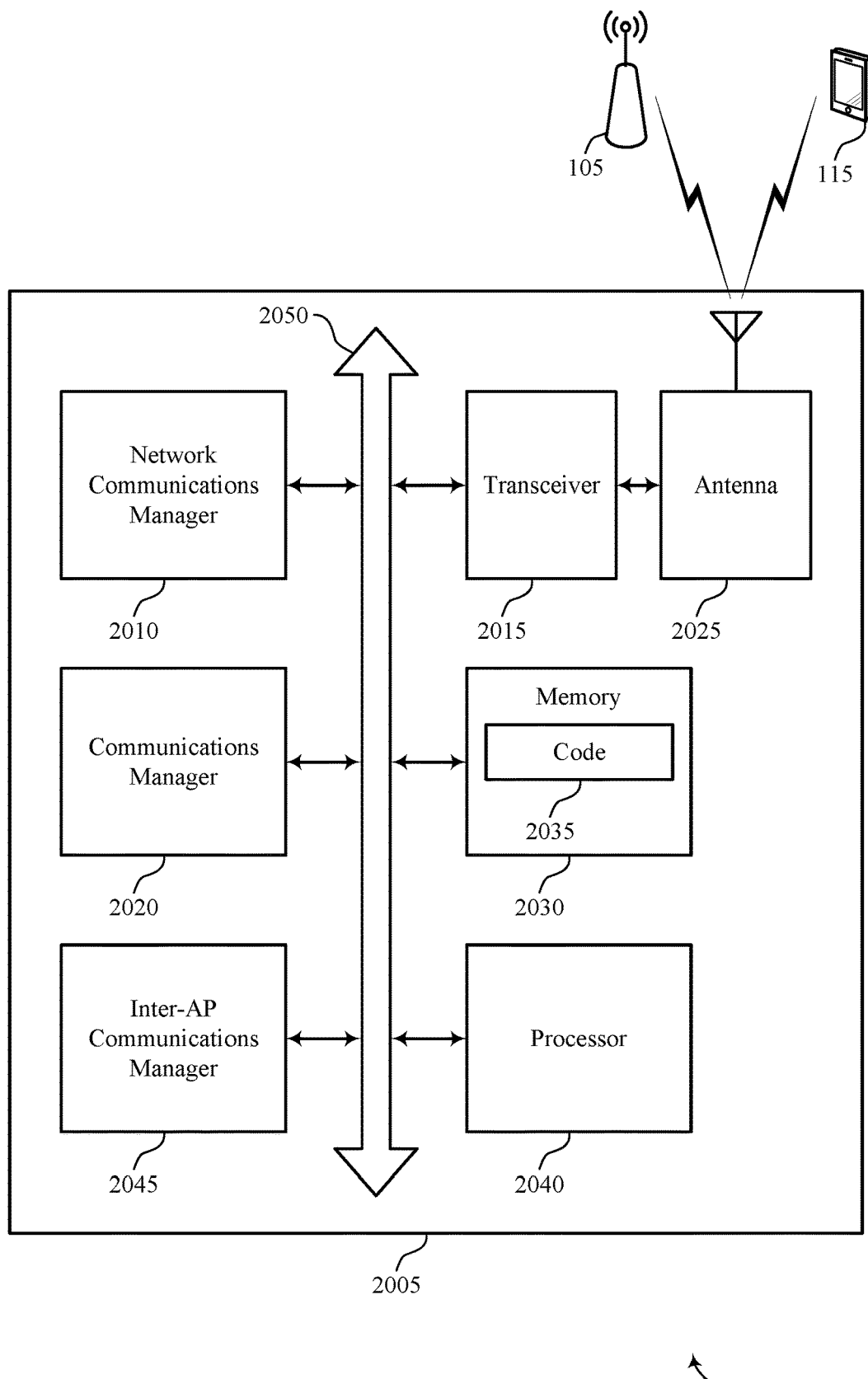
FIG. 20 shows a diagram of a system including an access point (AP) that supports techniques for wide bandwidth positioning in a WLAN in accordance with one or more aspects of the present disclosure.

FIG. 20 shows a diagram of a system 2000 including a device 2005 that supports techniques for wide bandwidth positioning in a wireless local area network in accordance with one or more aspects of the present disclosure. The device 2005 may be an example of or include the components of a device 1705, a device 1805, or an AP as described herein. The device 2005 may include components for bi-directional voice and data communications including components for transmitting and receiving communications, such as a communications manager 2020, a network communications manager 2010, a transceiver 2015, an antenna 2025, a memory 2030, code 2035, a processor 2040, and an inter-AP communications manager 2045. These components may be in electronic communication or otherwise coupled (e.g., operatively, communicatively, functionally, electronically, electrically) via one or more buses (e.g., a bus 2050).

The network communications manager 2010 may manage communications with a core network (e.g., via one or more wired backhaul links). For example, the network communications manager 2010 may manage the transfer of data communications for client devices, such as one or more STAs 115.

In some cases, the device 2005 may include a single antenna 2025. However, in some other cases the device 2005 may have more than one antenna 2025, which may be capable of concurrently transmitting or receiving multiple wireless transmissions. The transceiver 2015 may communicate bi-directionally, via the one or more antennas 2025, wired, or wireless links as described herein. For example, the transceiver 2015 may represent a wireless transceiver and may communicate bi-directionally with another wireless transceiver. The transceiver 2015 may also include a modem to modulate the packets and provide the modulated packets to one or more antennas 2025 for transmission, and to demodulate packets received from the one or more antennas 2025. The transceiver 2015, or the transceiver 2015 and one or more antennas 2025, may be an example of a transmitter 1715, a transmitter 1815, a receiver 1710, a receiver 1810, or any combination thereof or component thereof, as described herein.

The memory 2030 may include RAM and ROM. The memory 2030 may store computer-readable, computer-executable code 2035 including instructions that, when executed by the processor 2040, cause the device 2005 to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting techniques for wide bandwidth (e.g., and high-frequency) positioning in a wireless local area network). For example, the device 2005 or a component of the device 2005 may include a processor 2040 and memory 2030 coupled with or to the processor 2040, the processor 2040 and memory 2030 configured to perform various functions described herein.

The inter-station communications manager 2045 may manage communications with other APs 105, and may include a controller or scheduler for controlling communications with STAs 115 in cooperation with other APs 105. For example, the inter-station communications manager 2045 may coordinate scheduling for transmissions to APs 105 for various interference mitigation techniques such as beamforming or joint transmission. In some examples, the inter-station communications manager 2045 may provide an X2 interface within an LTE/LTE-A wireless communication network technology to provide communication between APs 105.

The communications manager 2020 may support wireless communication at a first device in accordance with examples as disclosed herein. For example, the communications manager 2020 may be configured as or otherwise support a means for receiving, from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The communications manager 2020 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz. The communications manager 2020 may be configured as or otherwise support a means for determining, based on measurements made of the first set of one or more ranging NDPs, a distance between the first device and the second device.

Additionally, or alternatively, the communications manager 2020 may support wireless communication at a first device in accordance with examples as disclosed herein. For example, the communications manager 2020 may be configured as or otherwise support a means for receiving, from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The communications manager 2020 may be configured as or otherwise support a means for transmitting, to the second device, a first set of one or more ranging NDPs based on the indication of the bandwidth and an indication of a presence of a puncturing pattern that is associated with the bandwidth of the ranging NDPs being greater than 160 MHz. The communications manager 2020 may be configured as or otherwise support a means for determining, based on the first set of one or more ranging NDPs, a distance between the first device and the second device.

Additionally, or alternatively, the communications manager 2020 may support wireless communication at a first device in accordance with examples as disclosed herein. For example, the communications manager 2020 may be configured as or otherwise support a means for receiving, from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the NDPs being greater than 160 megahertz (MHz). The communications manager 2020 may be configured as or otherwise support a means for transmitting, to the second device and in accordance with the session negotiation procedure, a fine timing measurement frame that includes an acknowledgement of the bandwidth of the NDPs being greater than 160 MHz. The communications manager 2020 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 2020 may support wireless communication at a first device in accordance with examples as disclosed herein. For example, the communications manager 2020 may be configured as or otherwise support a means for generating, for a ranging measurement procedure between the first device and a second device, a sequence of pseudo-random octets associated with one or more ranging null data packets (NDPs), a bandwidth of the one or more ranging NDPs being greater than 160 megahertz (MHz). The communications manager 2020 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The communications manager 2020 may be configured as or otherwise support a means for transmitting, to the second device, the one or more ranging NDPs based on segmenting the sequence of pseudo-random octets into the set of multiple sequence segments. The communications manager 2020 may be configured as or otherwise support a means for determining, based on the one or more ranging NDPs, a distance between the first device and the second device.

Additionally, or alternatively, the communications manager 2020 may support wireless communications in accordance with examples as disclosed herein. For example, the communications manager 2020 may be configured as or otherwise support a means for transmitting, to a first device from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The communications manager 2020 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz. The communications manager 2020 may be configured as or otherwise support a means for determining, based on the first set of one or more ranging NDPs, a distance between the first device and the second device.

Additionally, or alternatively, the communications manager 2020 may support wireless communications in accordance with examples as disclosed herein. For example, the communications manager 2020 may be configured as or otherwise support a means for transmitting, to a first device from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The communications manager 2020 may be configured as or otherwise support a means for receiving, from the first device, a first set of one or more ranging NDPs based on the indication of the bandwidth and an indication of a presence of a puncturing pattern that is associated with the bandwidth of the ranging NDPs being greater than 160 MHz. The communications manager 2020 may be configured as or otherwise support a means for determining, based on measurements of the first set of one or more ranging NDPs, a distance between the first device and the second device.

Additionally, or alternatively, the communications manager 2020 may support wireless communications in accordance with examples as disclosed herein. For example, the communications manager 2020 may be configured as or otherwise support a means for transmitting, to a first device from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the ranging NDPs being greater than 160 megahertz (MHz). The communications manager 2020 may be configured as or otherwise support a means for receiving, from the first device and in accordance with the session negotiation, a fine timing measurement frame that includes an acknowledgement of the bandwidth of the ranging NDPs being greater than 160 MHz. The communications manager 2020 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 2020 may support wireless communications in accordance with examples as disclosed herein. For example, the communications manager 2020 may be configured as or otherwise support a means for generating, for a ranging measurement procedure between a first device and a second device, a sequence of pseudo-random octets associated with one or more ranging null data packets (NDPs), a bandwidth of the one or more ranging NDPs being greater than 160 megahertz (MHz). The communications manager 2020 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The communications manager 2020 may be configured as or otherwise support a means for receiving, from the first device, the one or more ranging NDPs based on segmenting the sequence of pseudo-random octets into the set of multiple sequence segments. The communications manager 2020 may be configured as or otherwise support a means for determining, based on measurements of the one or more ranging NDPs, a distance between the first device and the second device.

By including or configuring the communications manager 2020 in accordance with examples as described herein, the device 2005 may support techniques for improved communication reliability, reduced latency, improved user experience related to reduced processing, reduced power consumption, more efficient utilization of communication resources, improved coordination between devices, longer battery life, and improved utilization of processing capability.

Figure 21:
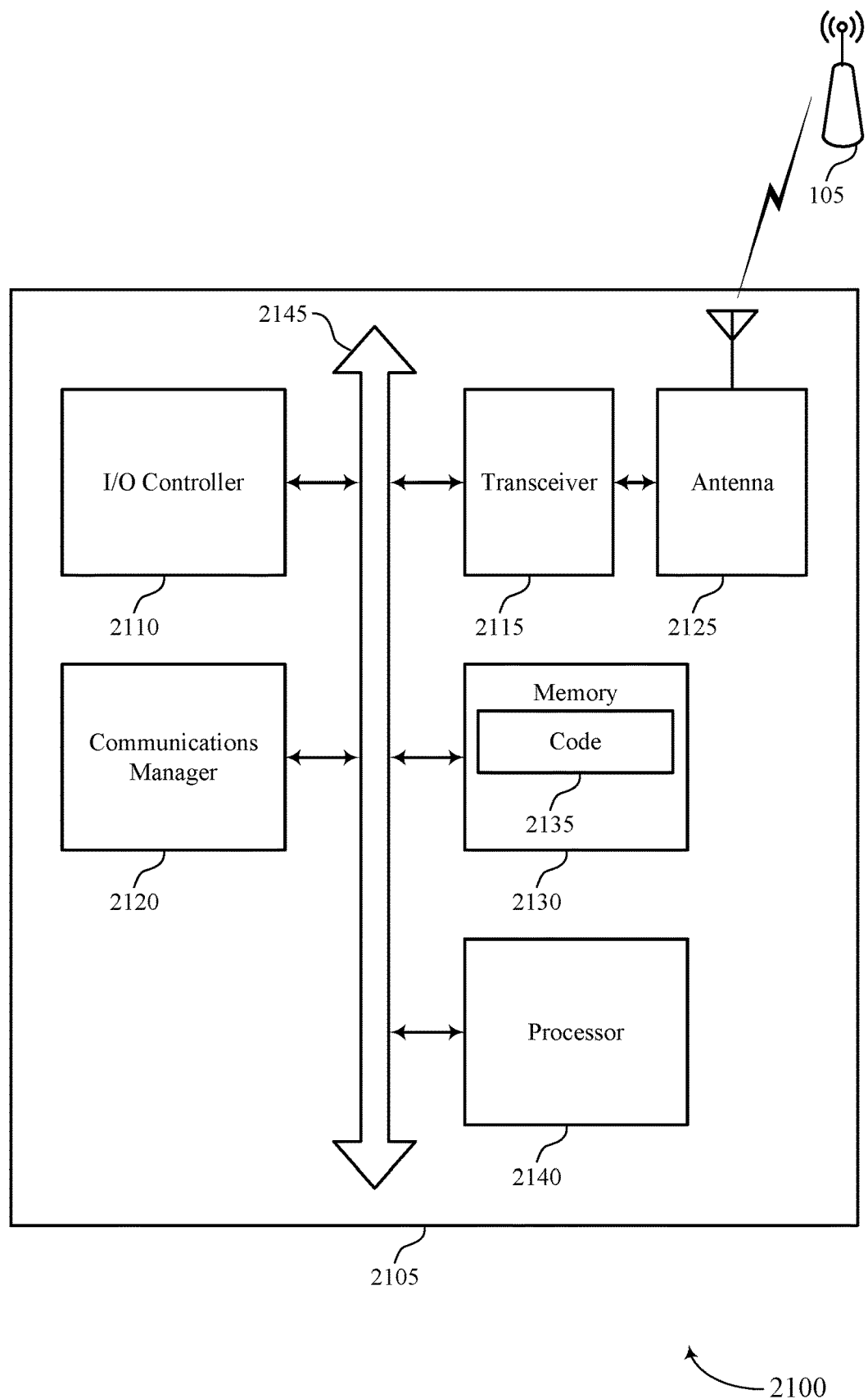
FIG. 21 shows a diagram of a system including an STA that supports techniques for wide bandwidth positioning in a WLAN in accordance with one or more aspects of the present disclosure.

FIG. 21 shows a diagram of a system 2100 including a device 2105 that supports techniques for wide bandwidth positioning in a wireless local area network in accordance with one or more aspects of the present disclosure. The device 2105 may be an example of or include the components of a device 1705, a device 1805, or an STA as described herein. The device 2105 may include components for bi-directional voice and data communications including components for transmitting and receiving communications, such as a communications manager 2120, an I/O controller 2110, a transceiver 2115, an antenna 2125, a memory 2130, code 2135, and a processor 2140. These components may be in electronic communication or otherwise coupled (e.g., operatively, communicatively, functionally, electronically, electrically) via one or more buses (e.g., a bus 2145).

The I/O controller 2110 may manage input and output signals for the device 2105. The I/O controller 2110 may also manage peripherals not integrated into the device 2105. In some cases, the I/O controller 2110 may represent a physical connection or port to an external peripheral. In some cases, the I/O controller 2110 may utilize an operating system such as iOS®, ANDROID®, MS-DOS®, MS-WINDOWS®, OS/2®, UNIX®, LINUX®, or another known operating system. In some other cases, the I/O controller 2110 may represent or interact with a modem, a keyboard, a mouse, a touchscreen, or a similar device. In some cases, the I/O controller 2110 may be implemented as part of a processor, such as the processor 2140. In some cases, a user may interact with the device 2105 via the I/O controller 2110 or via hardware components controlled by the I/O controller 2110.

In some cases, the device 2105 may include a single antenna 2125. However, in some other cases the device 2105 may have more than one antenna 2125, which may be capable of concurrently transmitting or receiving multiple wireless transmissions. The transceiver 2115 may communicate bi-directionally, via the one or more antennas 2125, wired, or wireless links as described herein. For example, the transceiver 2115 may represent a wireless transceiver and may communicate bi-directionally with another wireless transceiver. The transceiver 2115 may also include a modem to modulate the packets and provide the modulated packets to one or more antennas 2125 for transmission, and to demodulate packets received from the one or more antennas 2125. The transceiver 2115, or the transceiver 2115 and one or more antennas 2125, may be an example of a transmitter 1715, a transmitter 1815, a receiver 1710, a receiver 1810, or any combination thereof or component thereof, as described herein.

The memory 2130 may include RAM and ROM. The memory 2130 may store computer-readable, computer-executable code 2135 including instructions that, when executed by the processor 2140, cause the device 2105 to perform various functions described herein. In some cases, the memory 2130 may contain, among other things, a BIOS which may control basic hardware or software operation such as the interaction with peripheral components or devices.

The processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some other cases, a memory controller may be integrated into the processor 2140. The processor 2140 may be configured to execute computer-readable instructions stored in a memory (e.g., the memory 2130) to cause the device 2105 to perform various functions (e.g., functions or tasks supporting techniques for wide bandwidth (e.g., and high-frequency) positioning in a wireless local area network). For example, the device 2105 or a component of the device 2105 may include a processor 2140 and memory 2130 coupled with or to the processor 2140, the processor 2140 and memory 2130 configured to perform various functions described herein.

The communications manager 2120 may support wireless communication at a first device in accordance with examples as disclosed herein. For example, the communications manager 2120 may be configured as or otherwise support a means for receiving, from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The communications manager 2120 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz. The communications manager 2120 may be configured as or otherwise support a means for determining, based on measurements made of the first set of one or more ranging NDPs, a distance between the first device and the second device.

Additionally, or alternatively, the communications manager 2120 may support wireless communication at a first device in accordance with examples as disclosed herein. For example, the communications manager 2120 may be configured as or otherwise support a means for receiving, from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The communications manager 2120 may be configured as or otherwise support a means for transmitting, to the second device, a first set of one or more ranging NDPs based on the indication of the bandwidth and an indication of a presence of a puncturing pattern that is associated with the bandwidth of the ranging NDPs being greater than 160 MHz. The communications manager 2120 may be configured as or otherwise support a means for determining, based on the first set of one or more ranging NDPs, a distance between the first device and the second device.

Additionally, or alternatively, the communications manager 2120 may support wireless communication at a first device in accordance with examples as disclosed herein. For example, the communications manager 2120 may be configured as or otherwise support a means for receiving, from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the NDPs being greater than 160 megahertz (MHz). The communications manager 2120 may be configured as or otherwise support a means for transmitting, to the second device and in accordance with the session negotiation procedure, a fine timing measurement frame that includes an acknowledgement of the bandwidth of the NDPs being greater than 160 MHz. The communications manager 2120 may be configured as or otherwise support a means for receiving, from the second device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 2120 may support wireless communication at a first device in accordance with examples as disclosed herein. For example, the communications manager 2120 may be configured as or otherwise support a means for generating, for a ranging measurement procedure between the first device and a second device, a sequence of pseudo-random octets associated with one or more ranging null data packets (NDPs), a bandwidth of the one or more ranging NDPs being greater than 160 megahertz (MHz). The communications manager 2120 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The communications manager 2120 may be configured as or otherwise support a means for transmitting, to the second device, the one or more ranging NDPs based on segmenting the sequence of pseudo-random octets into the set of multiple sequence segments. The communications manager 2120 may be configured as or otherwise support a means for determining, based on the one or more ranging NDPs, a distance between the first device and the second device.

Additionally, or alternatively, the communications manager 2120 may support wireless communications in accordance with examples as disclosed herein. For example, the communications manager 2120 may be configured as or otherwise support a means for transmitting, to a first device from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The communications manager 2120 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz. The communications manager 2120 may be configured as or otherwise support a means for determining, based on the first set of one or more ranging NDPs, a distance between the first device and the second device.

Additionally, or alternatively, the communications manager 2120 may support wireless communications in accordance with examples as disclosed herein. For example, the communications manager 2120 may be configured as or otherwise support a means for transmitting, to a first device from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The communications manager 2120 may be configured as or otherwise support a means for receiving, from the first device, a first set of one or more ranging NDPs based on the indication of the bandwidth and an indication of a presence of a puncturing pattern that is associated with the bandwidth of the ranging NDPs being greater than 160 MHz. The communications manager 2120 may be configured as or otherwise support a means for determining, based on measurements of the first set of one or more ranging NDPs, a distance between the first device and the second device.

Additionally, or alternatively, the communications manager 2120 may support wireless communications in accordance with examples as disclosed herein. For example, the communications manager 2120 may be configured as or otherwise support a means for transmitting, to a first device from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the ranging NDPs being greater than 160 megahertz (MHz). The communications manager 2120 may be configured as or otherwise support a means for receiving, from the first device and in accordance with the session negotiation, a fine timing measurement frame that includes an acknowledgement of the bandwidth of the ranging NDPs being greater than 160 MHz. The communications manager 2120 may be configured as or otherwise support a means for transmitting, to the first device, a first set of one or more ranging NDPs based on the indication of the bandwidth and an indication of a presence of a puncturing pattern that is associated with the bandwidth of the ranging NDPs being greater than 160 MHz.

Additionally, or alternatively, the communications manager 2120 may support wireless communications in accordance with examples as disclosed herein. For example, the communications manager 2120 may be configured as or otherwise support a means for generating, for a ranging measurement procedure between a first device and a second device, a sequence of pseudo-random octets associated with one or more ranging null data packets (NDPs), a bandwidth of the one or more ranging NDPs being greater than 160 megahertz (MHz). The communications manager 2120 may be configured as or otherwise support a means for segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The communications manager 2120 may be configured as or otherwise support a means for receiving, from the first device, the one or more ranging NDPs based on segmenting the sequence of pseudo-random octets into the set of multiple sequence segments. The communications manager 2120 may be configured as or otherwise support a means for determining, based on measurements of the one or more ranging NDPs, a distance between the first device and the second device.

By including or configuring the communications manager 2120 in accordance with examples as described herein, the device 2105 may support techniques for improved communication reliability, reduced latency, improved user experience related to reduced processing, reduced power consumption, more efficient utilization of communication resources, improved coordination between devices, longer battery life, and improved utilization of processing capability).

Figure 22:
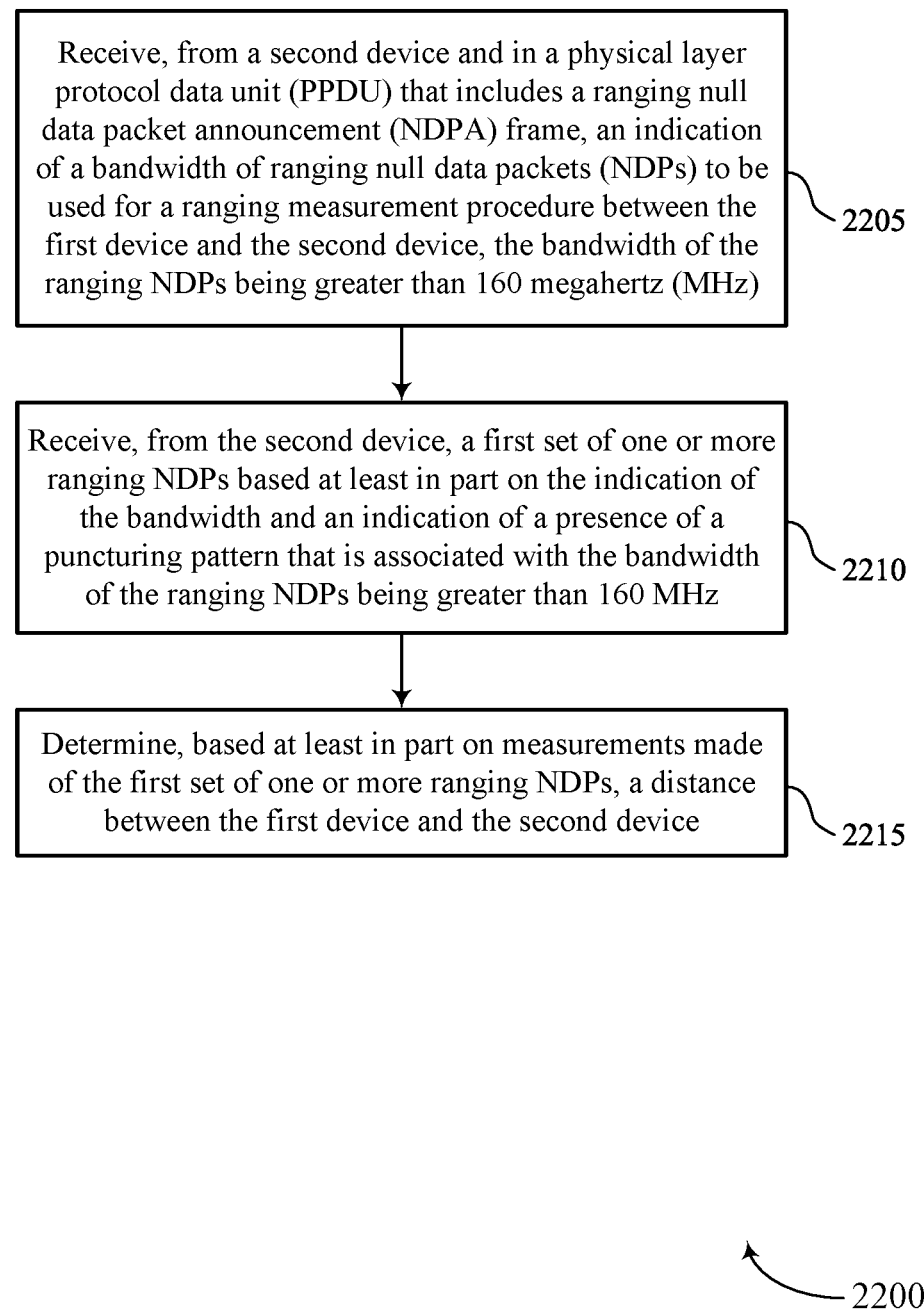
FIGS. 22 through 29 show flowcharts illustrating methods that support techniques for wide bandwidth positioning in a WLAN in accordance with one or more aspects of the present disclosure.

FIG. 22 shows a flowchart illustrating a method 2200 that supports techniques for wide bandwidth positioning in a wireless local area network in accordance with one or more aspects of the present disclosure. The operations of the method 2200 may be implemented by an AP or an STA or its components as described herein. For example, the operations of the method 2200 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2205, the method may include receiving, from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The operations of 2205 may be performed in accordance with examples as disclosed herein. In some examples, aspects of the operations of 2205 may be performed by a ranging component 1925 as described with reference to FIG. 19.

At 2210, the method may include receiving, from the second device, a first set of one or more ranging NDPs based on the indication of the bandwidth and an indication of a presence of a puncturing pattern that is associated with the bandwidth of the ranging NDPs being greater than 160 MHz. The operations of 2210 may be performed in accordance with examples as disclosed herein. In some examples, aspects of the operations of 2210 may be performed by a ranging component 1925 as described with reference to FIG. 19.

At 2215, the method may include determining, based on measurements made of the first set of one or more ranging NDPs, a distance between the first device and the second device. The operations of 2215 may be performed in accordance with examples as disclosed herein. In some examples, aspects of the operations of 2215 may be performed by a distance measurement component 1930 as described with reference to FIG. 19.

Figure 23:
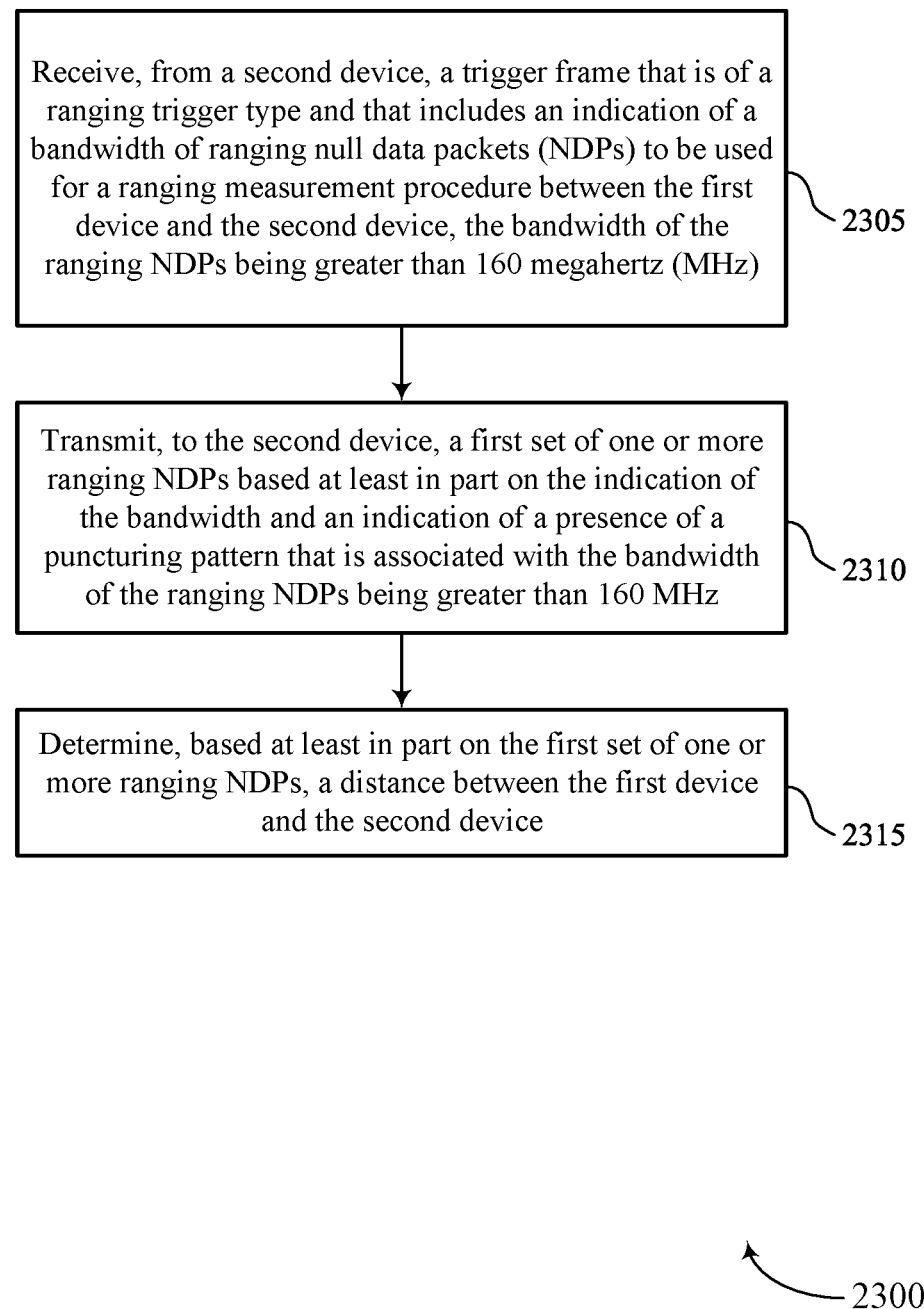

FIG. 23 shows a flowchart illustrating a method 2300 that supports techniques for wide bandwidth positioning in a wireless local area network in accordance with one or more aspects of the present disclosure. The operations of the method 2300 may be implemented by an AP or an STA or its components as described herein. For example, the operations of the method 2300 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2305, the method may include receiving, from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The operations of 2305 may be performed in accordance with examples as disclosed herein. In some examples, aspects of the operations of 2305 may be performed by a trigger frame component 1935 as described with reference to FIG. 19.

At 2310, the method may include transmitting, to the second device, a first set of one or more ranging NDPs based on the indication of the bandwidth and an indication of a presence of a puncturing pattern that is associated with the bandwidth of the ranging NDPs being greater than 160 MHz. The operations of 2310 may be performed in accordance with examples as disclosed herein. In some examples, aspects of the operations of 2310 may be performed by a ranging component 1925 as described with reference to FIG. 19.

At 2315, the method may include determining, based on the first set of one or more ranging NDPs, a distance between the first device and the second device. The operations of 2315 may be performed in accordance with examples as disclosed herein. In some examples, aspects of the operations of 2315 may be performed by a distance measurement component 1930 as described with reference to FIG. 19.

Figure 24:
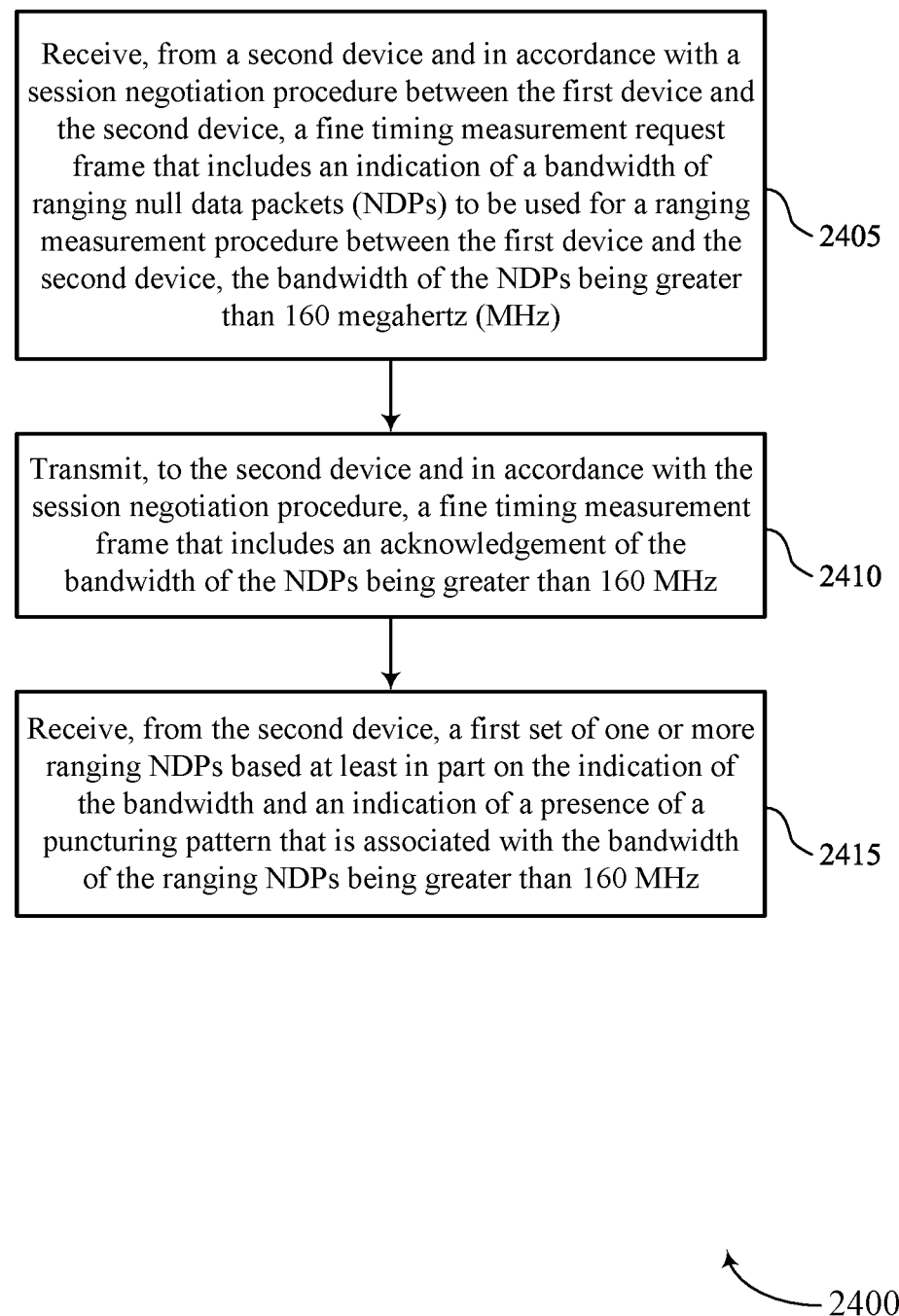

FIG. 24 shows a flowchart illustrating a method 2400 that supports techniques for wide bandwidth positioning in a wireless local area network in accordance with one or more aspects of the present disclosure. The operations of the method 2400 may be implemented by an AP or an STA or its components as described herein. For example, the operations of the method 2400 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2405, the method may include receiving, from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the NDPs being greater than 160 megahertz (MHz). The operations of 2405 may be performed in accordance with examples as disclosed herein. In some examples, aspects of the operations of 2405 may be performed by a timing measurement component 1940 as described with reference to FIG. 19.

At 2410, the method may include transmitting, to the second device and in accordance with the session negotiation procedure, a fine timing measurement frame that includes an acknowledgement of the bandwidth of the NDPs being greater than 160 MHz. The operations of 2410 may be performed in accordance with examples as disclosed herein. In some examples, aspects of the operations of 2410 may be performed by a timing measurement component 1940 as described with reference to FIG. 19.

At 2415, the method may include receiving, from the second device, a first set of one or more ranging NDPs based on the indication of the bandwidth and an indication of a presence of a puncturing pattern that is associated with the bandwidth of the ranging NDPs being greater than 160 MHz. The operations of 2415 may be performed in accordance with examples as disclosed herein. In some examples, aspects of the operations of 2415 may be performed by a ranging component 1925 as described with reference to FIG. 19.

Figure 25:
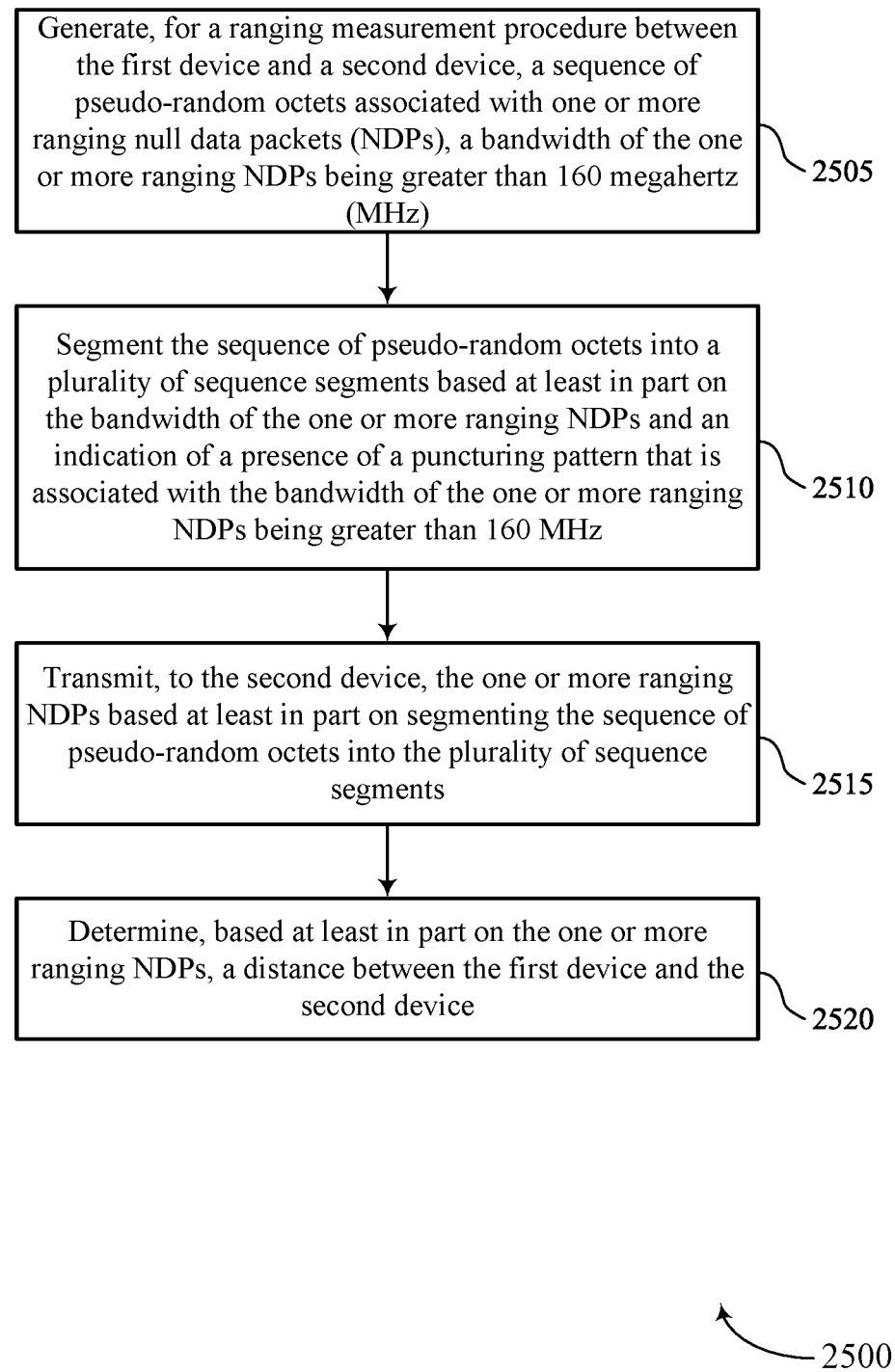

FIG. 25 shows a flowchart illustrating a method 2500 that supports techniques for wide bandwidth positioning in a wireless local area network in accordance with one or more aspects of the present disclosure. The operations of the method 2500 may be implemented by an AP or an STA or its components as described herein. For example, the operations of the method 2500 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2505, the method may include generating, for a ranging measurement procedure between the first device and a second device, a sequence of pseudo-random octets associated with one or more ranging null data packets (NDPs), a bandwidth of the one or more ranging NDPs being greater than 160 megahertz (MHz). The operations of 2505 may be performed in accordance with examples as disclosed herein. In some examples, aspects of the operations of 2505 may be performed by a sequence generation component 1945 as described with reference to FIG. 19.

At 2510, the method may include segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The operations of 2510 may be performed in accordance with examples as disclosed herein. In some examples, aspects of the operations of 2510 may be performed by a segmentation component 1950 as described with reference to FIG. 19.

At 2515, the method may include transmitting, to the second device, the one or more ranging NDPs based on segmenting the sequence of pseudo-random octets into the set of multiple sequence segments. The operations of 2515 may be performed in accordance with examples as disclosed herein. In some examples, aspects of the operations of 2515 may be performed by a ranging component 1925 as described with reference to FIG. 19.

At 2520, the method may include determining, based on the one or more ranging NDPs, a distance between the first device and the second device. The operations of 2520 may be performed in accordance with examples as disclosed herein. In some examples, aspects of the operations of 2520 may be performed by a distance measurement component 1930 as described with reference to FIG. 19.

Figure 26:
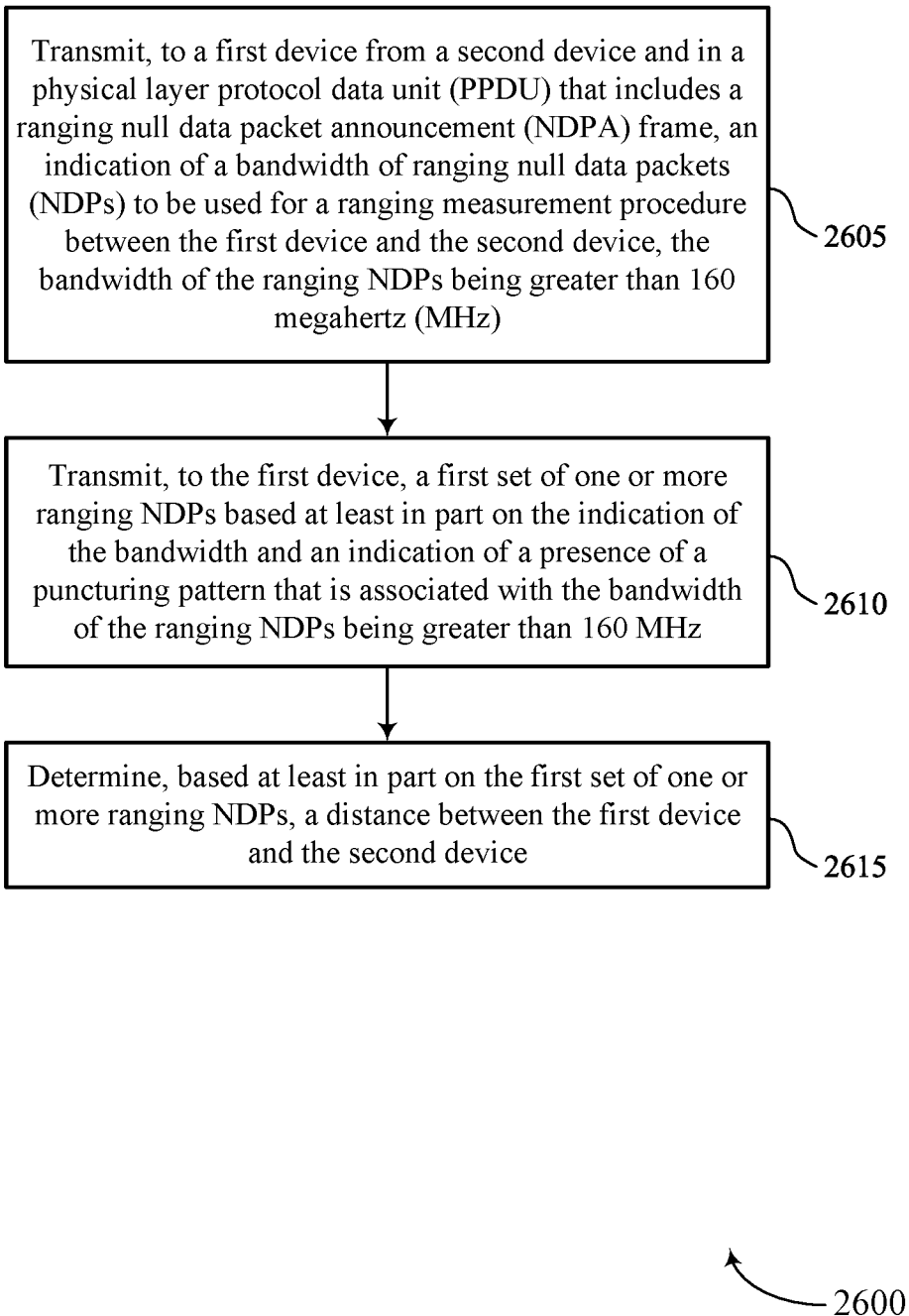

FIG. 26 shows a flowchart illustrating a method 2600 that supports techniques for wide bandwidth positioning in a wireless local area network in accordance with one or more aspects of the present disclosure. The operations of the method 2600 may be implemented by an AP or an STA or its components as described herein. For example, the operations of the method 2600 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2605, the method may include transmitting, to a first device from a second device and in a physical layer protocol data unit (PPDU) that includes a ranging null data packet announcement (NDPA) frame, an indication of a bandwidth of ranging null data packets (NDPs) to be used for a ranging measurement procedure between the first device and the second device, the bandwidth of the ranging NDPs being greater than 160 megahertz (MHz). The operations of 2605 may be performed in accordance with examples as disclosed herein. In some examples, aspects of the operations of 2605 may be performed by a ranging component 1925 as described with reference to FIG. 19.

At 2610, the method may include transmitting, to the first device, a first set of one or more ranging NDPs based on the indication of the bandwidth and an indication of a presence of a puncturing pattern that is associated with the bandwidth of the ranging NDPs being greater than 160 MHz. The operations of 2610 may be performed in accordance with examples as disclosed herein. In some examples, aspects of the operations of 2610 may be performed by a ranging component 1925 as described with reference to FIG. 19.

At 2615, the method may include determining, based on the first set of one or more ranging NDPs, a distance between the first device and the second device. The operations of 2615 may be performed in accordance with examples as disclosed herein. In some examples, aspects of the operations of 2615 may be performed by a distance measurement component 1930 as described with reference to FIG. 19.

Figure 27:
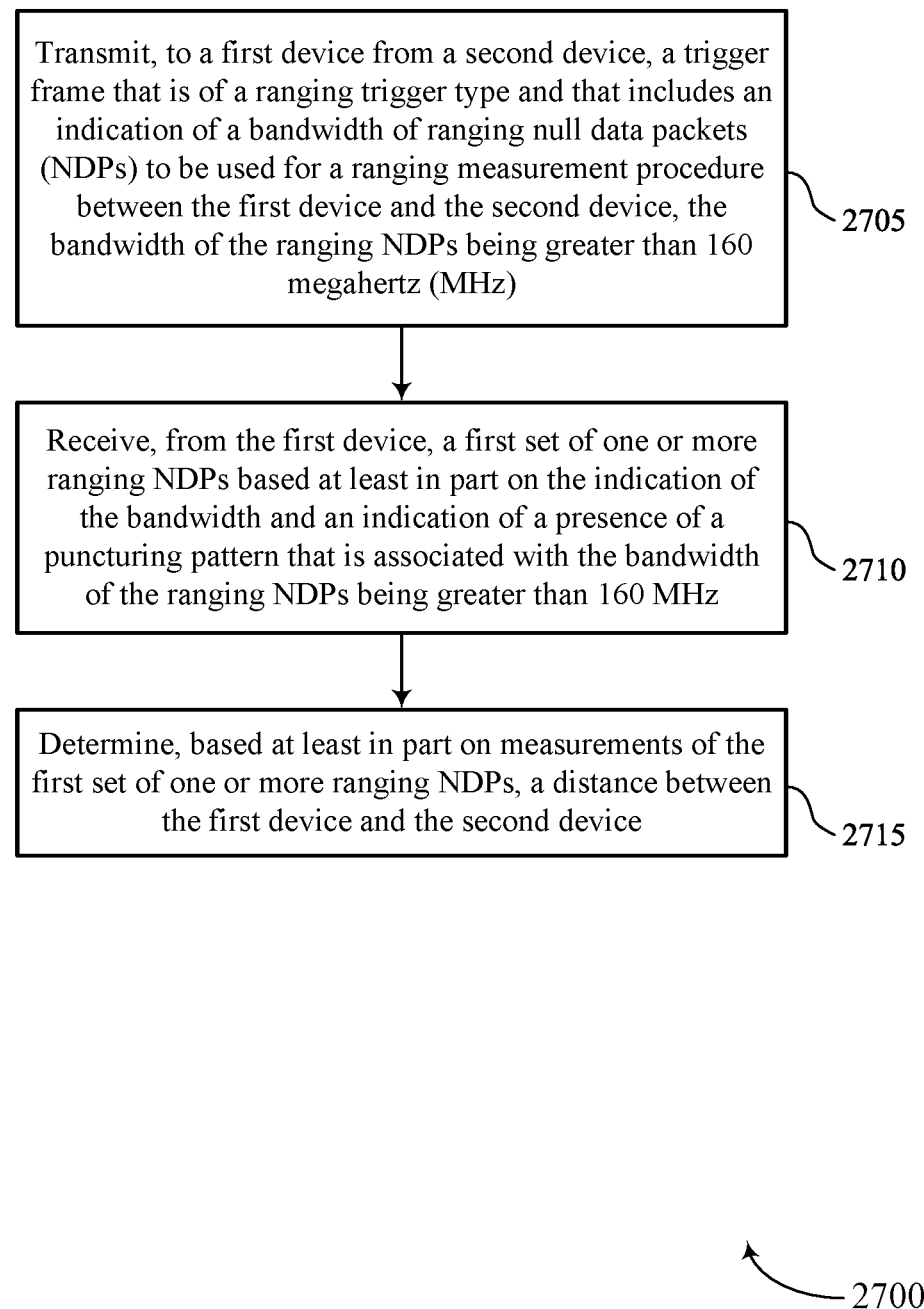

FIG. 27 shows a flowchart illustrating a method 2700 that supports techniques for wide bandwidth positioning in a wireless local area network in accordance with one or more aspects of the present disclosure. The operations of the method 2700 may be implemented by an AP or an STA or its components as described herein. For example, the operations of the method 2700 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2705, the method may include transmitting, to a first device from a second device, a trigger frame that is of a ranging trigger type and that includes an indication of a bandwidth of ranging null data packets (NDPs) to be used for a ranging measurement procedure between the first device and the second device, the bandwidth of the ranging NDPs being greater than 160 megahertz (MHz). The operations of 2705 may be performed in accordance with examples as disclosed herein. In some examples, aspects of the operations of 2705 may be performed by a trigger frame component 1935 as described with reference to FIG. 19.

At 2710, the method may include receiving, from the first device, a first set of one or more ranging NDPs based on the indication of the bandwidth and an indication of a presence of a puncturing pattern that is associated with the bandwidth of the ranging NDPs being greater than 160 MHz. The operations of 2710 may be performed in accordance with examples as disclosed herein. In some examples, aspects of the operations of 2710 may be performed by a ranging component 1925 as described with reference to FIG. 19.

At 2715, the method may include determining, based on measurements of the first set of one or more ranging NDPs, a distance between the first device and the second device. The operations of 2715 may be performed in accordance with examples as disclosed herein. In some examples, aspects of the operations of 2715 may be performed by a distance measurement component 1930 as described with reference to FIG. 19.

Figure 28:
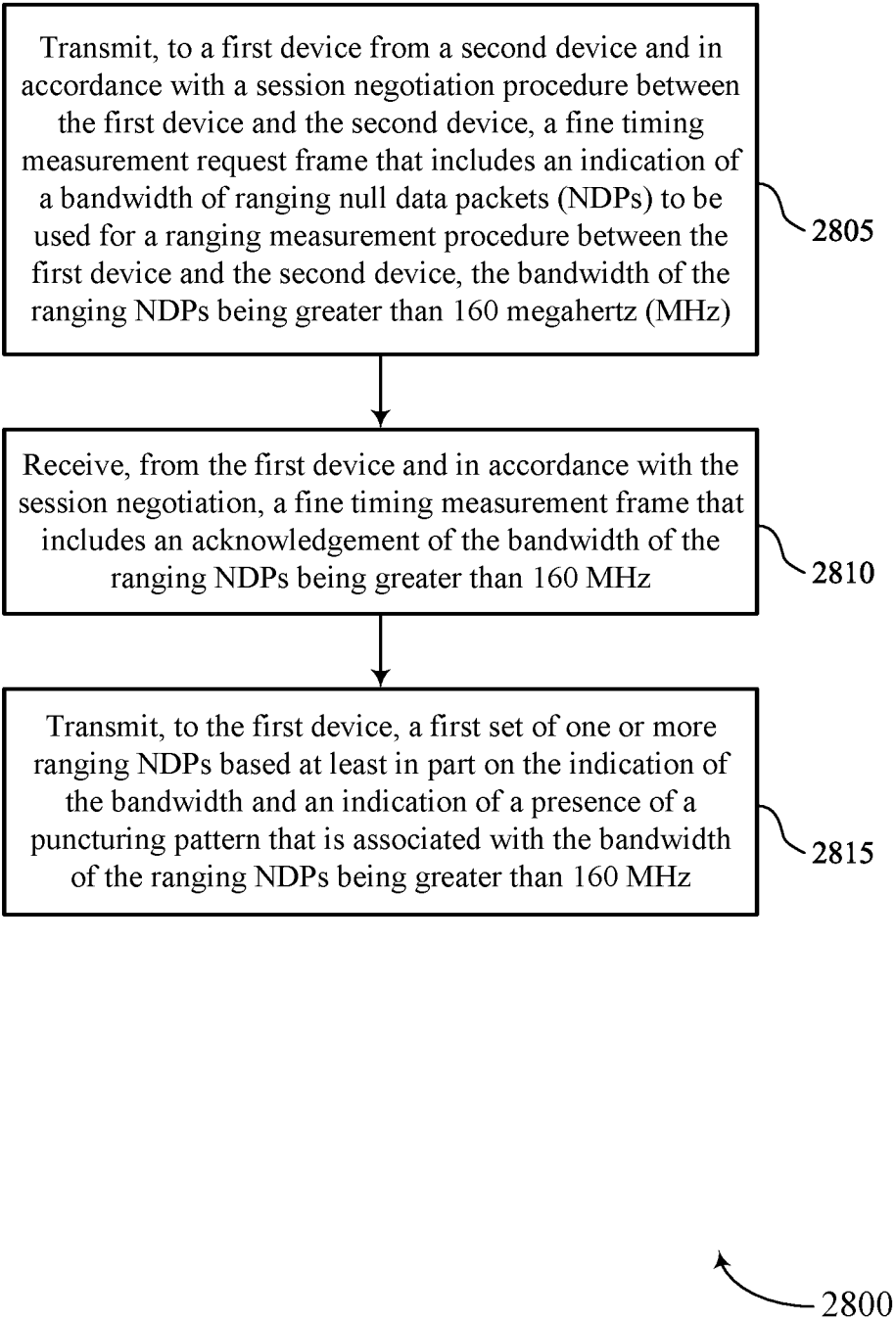

FIG. 28 shows a flowchart illustrating a method 2800 that supports techniques for wide bandwidth positioning in a wireless local area network in accordance with one or more aspects of the present disclosure. The operations of the method 2800 may be implemented by an AP or an STA or its components as described herein. For example, the operations of the method 2800 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2805, the method may include transmitting, to a first device from a second device and in accordance with a session negotiation procedure between the first device and the second device, a fine timing measurement request frame that includes an indication of a bandwidth of ranging null data packets (NDPs) to be used for a ranging measurement procedure between the first device and the second device, the bandwidth of the ranging NDPs being greater than 160 megahertz (MHz). The operations of 2805 may be performed in accordance with examples as disclosed herein. In some examples, aspects of the operations of 2805 may be performed by a timing measurement component 1940 as described with reference to FIG. 19.

At 2810, the method may include receiving, from the first device and in accordance with the session negotiation, a fine timing measurement frame that includes an acknowledgement of the bandwidth of the ranging NDPs being greater than 160 MHz. The operations of 2810 may be performed in accordance with examples as disclosed herein. In some examples, aspects of the operations of 2810 may be performed by a timing measurement component 1940 as described with reference to FIG. 19.

At 2815, the method may include transmitting, to the first device, a first set of one or more ranging NDPs based on the indication of the bandwidth and an indication of a presence of a puncturing pattern that is associated with the bandwidth of the ranging NDPs being greater than 160 MHz. The operations of 2815 may be performed in accordance with examples as disclosed herein. In some examples, aspects of the operations of 2815 may be performed by a ranging component 1925 as described with reference to FIG. 19.

Figure 29:
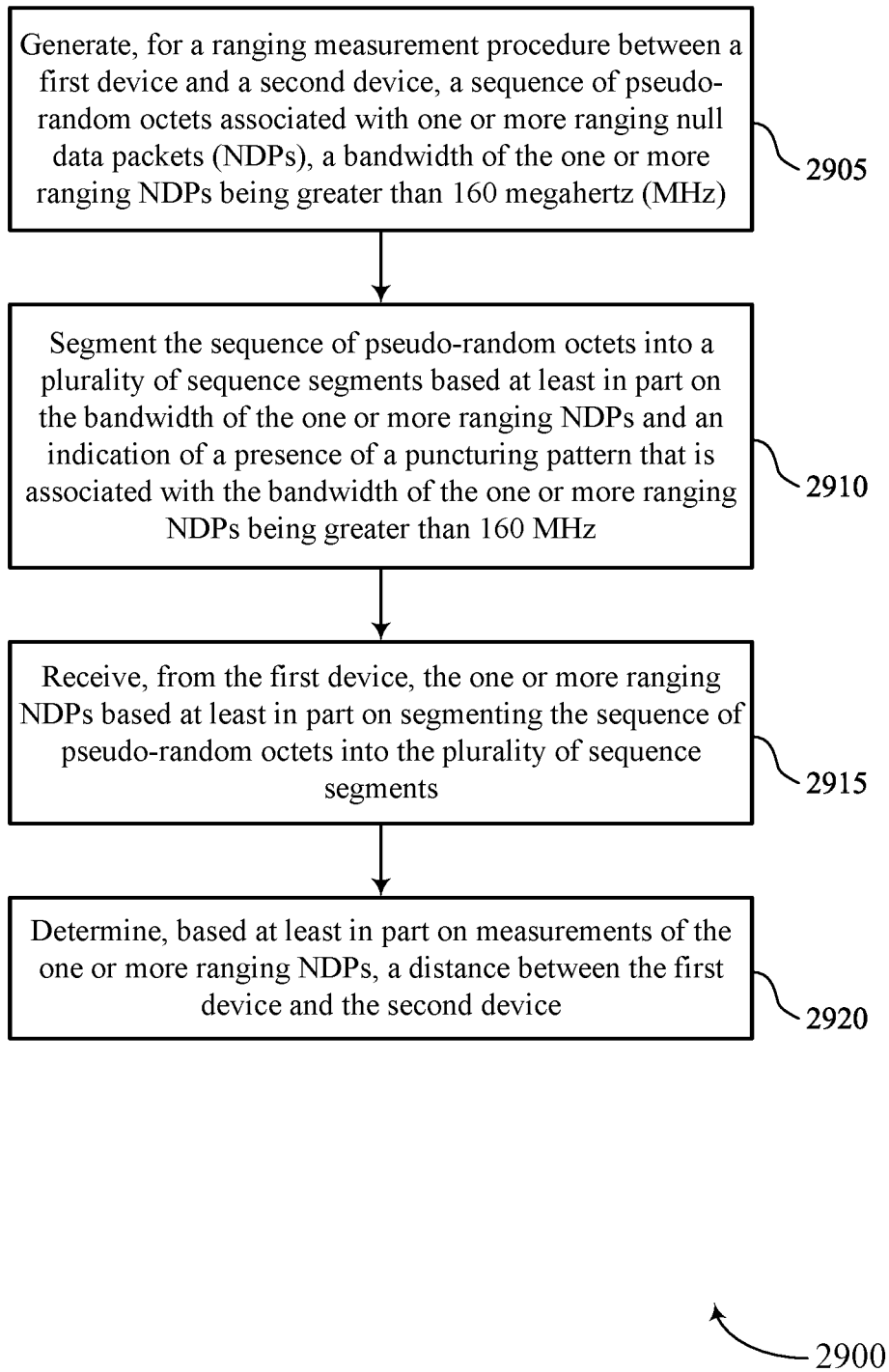

FIG. 29 shows a flowchart illustrating a method 2900 that supports techniques for wide bandwidth positioning in a wireless local area network in accordance with one or more aspects of the present disclosure. The operations of the method 2900 may be implemented by an AP or an STA or its components as described herein. For example, the operations of the method 2900 may be performed by an AP or an STA as described with reference to FIGS. 1 through 21. In some examples, an AP or an STA may execute a set of instructions to control the functional elements of the AP or the STA to perform the described functions. Additionally, or alternatively, the AP or the STA may perform aspects of the described functions using special-purpose hardware.

At 2905, the method may include generating, for a ranging measurement procedure between a first device and a second device, a sequence of pseudo-random octets associated with one or more ranging null data packets (NDPs), a bandwidth of the one or more ranging NDPs being greater than 160 megahertz (MHz). The operations of 2905 may be performed in accordance with examples as disclosed herein. In some examples, aspects of the operations of 2905 may be performed by a sequence generation component 1945 as described with reference to FIG. 19.

At 2910, the method may include segmenting the sequence of pseudo-random octets into a set of multiple sequence segments based on the bandwidth of the one or more ranging NDPs and an indication of a presence of a puncturing pattern that is associated with the bandwidth of the one or more ranging NDPs being greater than 160 MHz. The operations of 2910 may be performed in accordance with examples as disclosed herein. In some examples, aspects of the operations of 2910 may be performed by a segmentation component 1950 as described with reference to FIG. 19.

At 2915, the method may include receiving, from the first device, the one or more ranging NDPs based on segmenting the sequence of pseudo-random octets into the set of multiple sequence segments. The operations of 2915 may be performed in accordance with examples as disclosed herein. In some examples, aspects of the operations of 2915 may be performed by a ranging component 1925 as described with reference to FIG. 19.

At 2920, the method may include determining, based on measurements of the one or more ranging NDPs, a distance between the first device and the second device. The operations of 2920 may be performed in accordance with examples as disclosed herein. In some examples, aspects of the operations of 2920 may be performed by a distance measurement component 1930 as described with reference to FIG. 19.

The following provides an overview of aspects of the present disclosure:

Aspect 1: A method for wireless communication at a first device, comprising: receiving, from a second device and in a PPDU that includes an NDPA frame, an indication of a bandwidth of ranging NDPs to be used for a ranging measurement procedure between the first device and the second device, the bandwidth of the ranging NDPs being greater than 160 MHz; receiving, from the second device, a first set of one or more ranging NDPs based at least in part on the indication of the bandwidth and an indication of a presence of a puncturing pattern that is associated with the bandwidth of the ranging NDPs being greater than 160 MHz; and determining, based at least in part on measurements made of the first set of one or more ranging NDPs, a distance between the first device and the second device.

Aspect 2: The method of aspect 1, wherein receiving the indication of the bandwidth of the ranging NDPs comprises: receiving the indication of the bandwidth via a bandwidth (BW) field in a universal signal (U-SIG) field of the PPDU.

Aspect 3: The method of aspect 2, wherein the PPDU is an extremely high throughput multi-user PPDU (EHT MU PPDU), and the U-SIG field is located in a physical preamble portion of the EHT MU PPDU.

Aspect 4: The method of aspect 1, wherein receiving the indication of the bandwidth of the ranging NDPs comprises: receiving the indication of the bandwidth via a bit in a SERVICE field of the PPDU.

Aspect 5: The method of aspect 4, wherein the PPDU is a non-high throughput duplicate PPDU (non-HT duplicate PPDU), and the bit is a seventh bit in the SERVICE field and is set to a one value to indicate the bandwidth of the ranging NDPs.

Aspect 6: The method of any of aspects 1 through 5, further comprising: receiving, in one or more of a beacon frame, a fine timing measurement request frame, or a fine timing measurement frame, a message that indicates a configuration of the puncturing pattern for the ranging NDPs.

Aspect 7: The method of any of aspects 1 through 6, further comprising: receiving, in the ranging NDPA frame including the indication of the bandwidth of the ranging NDPs, a message that indicates a dynamic configuration of the puncturing pattern for the ranging NDPs.

Aspect 8: The method of aspect 7, further comprising: applying the puncturing pattern that is associated with the bandwidth of the ranging NDPs to the first set of one or more ranging NDPs; and applying a different puncturing pattern to other ranging NDPs outside of the first set of one or more ranging NDPs.

Aspect 9: The method of any of aspects 7 through 8, wherein the indication of the puncturing pattern that is associated with the bandwidth is received in an association identifier subfield of an STA information field of the ranging NDPA frame, and the ranging NDPA frame is transmitted in a non-high throughput duplicate PPDU (non-HT duplicate PPDU).

Aspect 10: The method of any of aspects 1 through 9, further comprising: transmitting, to the second device, a second set of one or more ranging NDPs based at least in part on the bandwidth and the indication of the presence of the puncturing pattern, wherein determining the distance between the first device and the second device is based at least in part on a round-trip time associated with the first set of one or more ranging NDPs and the second set of one or more ranging NDPs.

Aspect 11: The method of any of aspects 1 through 10, wherein the PPDU includes, in a physical layer service data unit (PSDU) portion of the PPDU, the ranging NDPA frame including an NDP announcement variant subfield, the NDP announcement variant subfield including a first bit set to a zero value and a second bit set to a one value.

Aspect 12: The method of any of aspects 1 through 11, further comprising: performing a radio frequency sensing based at least in part on the first set of one or more ranging NDPs to obtain channel state information of a local environment.

Aspect 13: The method of any of aspects 1 through 12, wherein the bandwidth of the ranging NDPs is 320 MHz.

Aspect 14: A method for wireless communication at a first device, comprising: receiving, from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz; transmitting, to the second device, a first set of one or more ranging NDPs based at least in part on the indication of the bandwidth and an indication of a presence of a puncturing pattern that is associated with the bandwidth of the ranging NDPs being greater than 160 MHz; and determining, based at least in part on the first set of one or more ranging NDPs, a distance between the first device and the second device.

Aspect 15: The method of aspect 14, wherein receiving the trigger frame comprises: receiving the indication of the bandwidth based at least in part on an association identifier subfield and a bandwidth (BW) subfield of a user information field in the trigger frame.

Aspect 16: The method of aspect 15, wherein receiving the trigger frame further comprises: receiving a bit in a common information field of the trigger frame that indicates a presence of the user information field in the trigger frame, wherein the user information field immediately follows the common information field, and wherein receiving the indication of the bandwidth via the association identifier subfield of the user information field in the trigger frame is based at least in part on the bit of the common information field indicating the presence of the user information field in the trigger frame.

Aspect 17: The method of aspect 14, wherein receiving the trigger frame comprises: receiving the indication of the bandwidth via one or more common information fields in the trigger frame.

Aspect 18: The method of aspect 17, wherein the indication of the bandwidth is included in an uplink high-efficiency signal A2 reserved (UL-HE-SIG-A2 reserved) subfield, and a bit of the UL-RE-SIG-A2 reserved subfield is set to a zero value to indicate the bandwidth of the ranging NDPs.

Aspect 19: The method of any of aspects 17 through 18, wherein the indication of the bandwidth is included in a common information field or in a trigger-dependent common information field, and at least a bit in the common information field or in the trigger-dependent common information field is set to a one value to indicate the bandwidth of the ranging NDPs.

Aspect 20: The method of any of aspects 14 through 19, wherein receiving the trigger frame comprises: receiving a resource unit allocation subfield of a user information field in the trigger frame that indicates the puncturing pattern.

Aspect 21: The method of any of aspects 14 through 19, wherein receiving the trigger frame comprises: receiving a user information field in the trigger frame that indicates the puncturing pattern via a field format exclusively associated with indicating the puncturing pattern.

Aspect 22: The method of any of aspects 14 through 19, further comprising: receiving, in one or more of a beacon frame, a fine timing measurement request frame, or a fine timing measurement frame, a message that indicates the puncturing pattern for the ranging NDPs.

Aspect 23: The method of any of aspects 14 through 22, further comprising: receiving, from the second device, a second set of one or more ranging NDPs based at least in part on the bandwidth and the indication of the presence of the puncturing pattern, wherein determining the distance between the first device and the second device is based at least in part on a round-trip time associated with the first set of one or more ranging NDPs and the second set of one or more ranging NDPs.

Aspect 24: The method of any of aspects 14 through 23, wherein the bandwidth of the ranging NDPs is 320 MHz.

Aspect 25: A method for wireless communication at a first device, comprising: receiving, from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the NDPs being greater than 160 MHz; transmitting, to the second device and in accordance with the session negotiation procedure, a fine timing measurement frame that includes an acknowledgement of the bandwidth of the NDPs being greater than 160 MHz; and receiving, from the second device, a first set of one or more ranging NDPs based at least in part on the indication of the bandwidth and an indication of a presence of a puncturing pattern that is associated with the bandwidth of the ranging NDPs being greater than 160 MHz.

Aspect 26: The method of aspect 25, wherein transmitting the fine timing measurement frame comprises: transmitting one or both of the indication of the bandwidth and an indication of the puncturing pattern via a format and bandwidth field of the fine timing measurement frame.

Aspect 27: The method of aspect 26, wherein each value of a subset of values of the format and bandwidth field of the fine timing measurement frame corresponds to one or more of a unique bandwidth that is greater than 160 MHz, a quantity of local oscillators associated with the unique bandwidth, and a puncturing pattern associated with the unique bandwidth.

Aspect 28: The method of aspect 25, wherein transmitting the fine timing measurement frame comprises: transmitting, in one or more sub-elements of the fine timing measurement frame that are associated with the ranging measurement procedure, a sub-element that indicates the puncturing pattern.

Aspect 29: The method of aspect 28, wherein the sub-element includes an extremely high throughput (EHT) operation element of a beacon frame of a basic serving set (BSS) to which the first device belongs.

Aspect 30: The method of aspect 28, wherein the sub-element includes a format exclusively associated with indicating the puncturing pattern, or the sub-element includes a bitmap to be used for indicating the puncturing pattern.

Aspect 31: The method of any of aspects 25 through 30, wherein transmitting the fine timing measurement frame comprises: transmitting, in one or more sub-elements of the fine timing measurement frame that are associated with the ranging measurement procedure, a sub-element that indicates a transmission power envelope associated with the ranging NDPs, wherein a transmit power configuration indicated by the transmission power envelope is associated with the bandwidth of the ranging NDPs being greater than 160 MHz.

Aspect 32: The method of any of aspects 25 through 31, further comprising: transmitting, to the second device, one or more session update messages associated with one or both of an updated bandwidth for the ranging NDPs and an updated puncturing pattern for the ranging NDPs; receiving, from the second device, a second set of one or more ranging NDPs based at least in part on the updated bandwidth and the updated puncturing pattern; and determining, based at least in part on measurements made of the second set of one or more ranging NDPs, an updated distance between the first device and the second device.

Aspect 33: The method of aspect 32, further comprising: receiving, from the second device, a second fine timing measurement request frame that indicates one or both of the updated bandwidth of the ranging NDPs and the updated puncturing pattern for the ranging NDPs based at least in part on the one or more session update messages being associated with a session termination; and transmitting, to the second device, a second fine timing measurement frame that acknowledges one or both of the updated bandwidth of the ranging NDPs and the updated puncturing pattern for the ranging NDPs.

Aspect 34: The method of any of aspects 25 through 33, wherein transmitting the fine timing measurement frame comprises: transmitting the acknowledgement of one or both of the bandwidth and the puncturing pattern via a format and bandwidth field of the fine timing measurement frame.

Aspect 35: The method of any of aspects 25 through 34, wherein transmitting the fine timing measurement frame comprises: transmitting an acknowledgement of the puncturing pattern via a sub-element of one or more sub-elements of the fine timing measurement frame that are associated with the ranging measurement procedure.

Aspect 36: The method of any of aspects 25 through 35, further comprising: transmitting, to the second device, a second set of one or more ranging NDPs based at least in part on the bandwidth and the puncturing pattern, wherein a distance between the first device and the second device is based at least in part on a round-trip time associated with the first set of one or more ranging NDPs and the second set of one or more ranging NDPs.

Aspect 37: The method of any of aspects 25 through 36, wherein the bandwidth of the ranging NDPs is 320 MHz.

Aspect 38: The method of any of aspects 25 through 37, wherein receiving the fine timing measurement frame comprises: receiving an acknowledgement of the puncturing pattern via a sub-element of one or more sub-elements of the fine timing measurement frame that are associated with the ranging measurement procedure.

Aspect 39: A method for wireless communication at a first device, comprising: generating, for a ranging measurement procedure between the first device and a second device, a sequence of pseudo-random octets associated with one or more ranging NDPs, a bandwidth of the one or more ranging NDPs being greater than 160 MHz; segmenting the sequence of pseudo-random octets into a plurality of sequence segments based at least in part on the bandwidth of the one or more ranging NDPs and an indication of a presence of a puncturing pattern that is associated with the bandwidth of the one or more ranging NDPs being greater than 160 MHz; transmitting, to the second device, the one or more ranging NDPs based at least in part on segmenting the sequence of pseudo-random octets into the plurality of sequence segments; and determining, based at least in part on the one or more ranging NDPs, a distance between the first device and the second device.

Aspect 40: The method of aspect 39, wherein segmenting the sequence of pseudo-random octets into the plurality of sequence segments comprises: inputting the sequence of pseudo-random octets into a segment parser to obtain a quantity of outputs equal to a quantity of the plurality of sequence segments, wherein the segment parser is based at least in part on the bandwidth and the puncturing pattern; modulating the quantity of outputs; and allocating, for each of the quantity of outputs, information of an output of the quantity of outputs to frequency domain tones of a respective sequence segment of the plurality of sequence segments.

Aspect 41: The method of aspect 40, wherein the bandwidth is of a first value, and a sequence segment bandwidth of each of the plurality of sequence segments is a second value that is evenly divisible into the first value.

Aspect 42: The method of any of aspects 40 through 41, wherein segmenting the sequence of pseudo-random octets into the plurality of sequence segments comprises: segmenting, using the segment parser, the sequence of pseudo-random octets into four sequence segments based at least in part on the puncturing pattern corresponding to a lack of puncturing.

Aspect 43: The method of aspect 42, wherein the bandwidth of the one or more ranging NDPs is 320 MHz, and the four sequence segments are allocated to frequency domain tones of respective 80 MHz segments of the 320 MHz.

Aspect 44: The method of any of aspects 40 through 41, wherein segmenting the sequence of pseudo-random octets into the plurality of sequence segments comprises: segmenting, using the segment parser, the sequence of pseudo-random octets into three sequence segments based at least in part on the puncturing pattern corresponding to an 80 MHz puncturing.

Aspect 45: The method of aspect 44, wherein the bandwidth of the one or more ranging NDPs is 320 MHz, and the three sequence segments are allocated to frequency domain tones of respective 80 MHz segments of the 320 MHz, and one 80 MHz segment of the 320 MHz is punctured in accordance with the puncturing pattern corresponding to the 80 MHz puncturing.

Aspect 46: The method of aspect 40, wherein the bandwidth is of a first value, and a first sequence segment bandwidth of each of a first subset of the plurality of sequence segments is a second value that is evenly divisible into the first value, and a second sequence segment bandwidth of each of a second subset of the plurality of sequence segments is a third value that is evenly divisible into the second value.

Aspect 47: The method of any of aspects 40 or 46, wherein segmenting the sequence of pseudo-random octets into the plurality of sequence segments comprises: segmenting, using the segment parser, the sequence of pseudo-random octets into four sequence segments based at least in part on the puncturing pattern corresponding to a 40 MHz puncturing.

Aspect 48: The method of aspect 47, wherein the bandwidth of the one or more ranging NDPs is 320 MHz, and three of the four sequence segments are allocated to frequency domain tones of respective 80 MHz segments of the 320 MHz, and a first portion of a remaining sequence segment is allocated to frequency domain tones of a 40 MHz segment of the 320 MHz and a second portion of the remaining sequence segment is dropped.

Aspect 49: The method of any of aspects 39 through 48, further comprising: receiving, from the second device, a second set of one or more ranging NDPs based at least in part on the bandwidth and the puncturing pattern, wherein determining the distance between the first device and the second device is based at least in part on a round-trip time associated with the first set of one or more ranging NDPs and the second set of one or more ranging NDPs.

Aspect 50: The method of any of aspects 39 through 49, wherein the one or more ranging NDPs include a packet extension field of eight microseconds based at least in part on the bandwidth of the one or more ranging NDPs being greater than 160 MHz.

Aspect 51: A method for wireless communications, comprising: transmitting, to a first device from a second device and in a PPDU that includes an NDPA frame, an indication of a bandwidth of ranging NDPs to be used for a ranging measurement procedure between the first device and the second device, the bandwidth of the ranging NDPs being greater than 160 MHz; transmitting, to the first device, a first set of one or more ranging NDPs based at least in part on the indication of the bandwidth and an indication of a presence of a puncturing pattern that is associated with the bandwidth of the ranging NDPs being greater than 160 MHz; and determining, based at least in part on the first set of one or more ranging NDPs, a distance between the first device and the second device.

Aspect 52: The method of aspect 51, wherein transmitting the indication of the bandwidth of the ranging NDPs comprises: transmitting the indication of the bandwidth via a bandwidth (BW) field in a universal signal (U-SIG) subfield of the PPDU.

Aspect 53: The method of aspect 52, wherein the PPDU is an extremely high throughput multi-user PPDU (EHT MU PPDU), and the U-SIG subfield is located in a physical preamble portion of the EHT MU PPDU.

Aspect 54: The method of aspect 51, wherein transmitting the indication of the bandwidth of the ranging NDPs comprises: transmitting the indication of the bandwidth via a bit in a SERVICE field of the PPDU.

Aspect 55: The method of aspect 54, wherein the PPDU is a non-high throughput duplicate PPDU (non-HT duplicate PPDU), and the bit is a seventh bit in the SERVICE field and is set to a one value to indicate the bandwidth of the ranging NDPs.

Aspect 56: The method of any of aspects 51 through 55, further comprising: transmitting, in one or more of a beacon frame, a fine timing measurement request frame, or a fine timing measurement frame, a message that indicates a configuration of the puncturing pattern for the ranging NDPs.

Aspect 57: The method of any of aspects 51 through 56, further comprising: transmitting, in the ranging NDPA frame including the indication of the bandwidth of the ranging NDPs, a message that indicates a dynamic configuration of the puncturing pattern for the ranging NDPs.

Aspect 58: The method of aspect 57, further comprising: applying the puncturing pattern that is associated with the bandwidth of the ranging NDPs to the first set of one or more ranging NDPs; and applying a different puncturing pattern to other ranging NDPs outside of the first set of one or more ranging NDPs.

Aspect 59: The method of any of aspects 57 through 58, wherein the indication of the puncturing pattern that is associated with the bandwidth is transmitted in an association identifier subfield of an STA information field of the ranging NDPA frame, and the ranging NDPA frame is transmitted in a non-high throughput duplicate PPDU (non-HT duplicate PPDU).

Aspect 60: The method of any of aspects 51 through 59, further comprising: receiving, from the first device, a second set of one or more ranging NDPs based at least in part on the bandwidth and the indication of the presence of the puncturing pattern, wherein determining the distance between the first device and the second device is based at least in part on a round-trip time associated with the first set of one or more ranging NDPs and the second set of one or more ranging NDPs.

Aspect 61: The method of any of aspects 51 through 60, wherein the PPDU includes, in a physical layer service data unit (PSDU) portion of the PPDU, the ranging NDPA frame including an NDP announcement variant subfield, the NDP announcement variant subfield including a first bit set to a one value and a second bit set to a zero value.

Aspect 62: The method of any of aspects 51 through 61, further comprising: performing a radio frequency sensing based at least in part on the first set of one or more ranging NDPs to obtain an interference measurement of a local environment.

Aspect 63: The method of any of aspects 51 through 62, wherein the bandwidth of the ranging NDPs is 320 MHz.

Aspect 64: A method for wireless communications, comprising: transmitting, to a first device from a second device, a trigger frame that is of a ranging trigger type and that includes an indication of a bandwidth of ranging NDPs to be used for a ranging measurement procedure between the first device and the second device, the bandwidth of the ranging NDPs being greater than 160 MHz; receiving, from the first device, a first set of one or more ranging NDPs based at least in part on the indication of the bandwidth and an indication of a presence of a puncturing pattern that is associated with the bandwidth of the ranging NDPs being greater than 160 MHz; and determining, based at least in part on measurements of the first set of one or more ranging NDPs, a distance between the first device and the second device.

Aspect 65: The method of aspect 64, wherein transmitting the trigger frame comprises: transmitting the indication of the bandwidth based at least in part on an association identifier subfield and a bandwidth (BW) subfield of a user information field in the trigger frame.

Aspect 66: The method of aspect 65, wherein transmitting the trigger frame further comprises: transmitting a bit in a common information field of the trigger frame that indicates a presence of the user information field in the trigger frame, wherein the user information field immediately follows the common information field, and wherein transmitting the indication of the bandwidth via the association identifier subfield of the user information field in the trigger frame is based at least in part on the bit of the common information field indicating the presence of the user information field in the trigger frame.

Aspect 67: The method of aspect 64, wherein transmitting the trigger frame comprises: transmitting the indication of the bandwidth via one or more common information fields in the trigger frame.

Aspect 68: The method of aspect 67, wherein the indication of the bandwidth is included in an uplink high-efficiency signal A2 reserved (UL-HE-SIG-A2 reserved) subfield, and a bit of the UL-RE-SIG-A2 reserved subfield is set to a zero value to indicate the bandwidth of the ranging NDPs.

Aspect 69: The method of any of aspects 67 through 68, wherein the indication of the bandwidth is included in a common information field or in a trigger-dependent common information field, and at least a bit in the common information field or in the trigger-dependent common information field is set to a one value to indicate the bandwidth of the ranging NDPs.

Aspect 70: The method of any of aspects 64 through 69, wherein transmitting the trigger frame comprises: transmitting a resource unit allocation subfield of a user information field in the trigger frame that indicates the puncturing pattern.

Aspect 71: The method of any of aspects 64 through 69, wherein transmitting the trigger frame comprises: transmitting a user information field in the trigger frame that indicates the puncturing pattern via a field format exclusively associated with indicating the puncturing pattern.

Aspect 72: The method of any of aspects 64 through 69, further comprising: transmitting, in one or more of a beacon frame, a fine timing measurement request frame, or a fine timing measurement frame, a message that indicates the puncturing pattern for the ranging NDPs.

Aspect 73: The method of any of aspects 64 through 72, further comprising: transmitting, to the first device, a second set of one or more ranging NDPs based at least in part on the bandwidth and the indication of the presence of the puncturing pattern, wherein determining the distance between the first device and the second device is based at least in part on a round-trip time associated with the first set of one or more ranging NDPs and the second set of one or more ranging NDPs.

Aspect 74: The method of any of aspects 64 through 73, wherein the bandwidth of the ranging NDPs is 320 MHz.

Aspect 75: A method for wireless communications, comprising: transmitting, to a first device from a second device and in accordance with a session negotiation procedure between the first device and the second device, a fine timing measurement request frame that includes an indication of a bandwidth of ranging NDPs to be used for a ranging measurement procedure between the first device and the second device, the bandwidth of the ranging NDPs being greater than 160 MHz; receiving, from the first device and in accordance with the session negotiation, a fine timing measurement frame that includes an acknowledgement of the bandwidth of the ranging NDPs being greater than 160 MHz; and transmitting, to the first device, a first set of one or more ranging NDPs based at least in part on the indication of the bandwidth and an indication of a presence of a puncturing pattern that is associated with the bandwidth of the ranging NDPs being greater than 160 MHz.

Aspect 76: The method of aspect 75, wherein receiving the fine timing measurement frame comprises: receiving one or both of the indication of the bandwidth and an indication of the puncturing pattern via a format and bandwidth field of the fine timing measurement frame.

Aspect 77: The method of aspect 76, wherein each value of a subset of values of the format and bandwidth field of the fine timing measurement frame corresponds to one or more of a unique bandwidth that is greater than 160 MHz, a quantity of local oscillators associated with the unique bandwidth, and a puncturing pattern associated with the unique bandwidth.

Aspect 78: The method of aspect 75, wherein receiving the fine timing measurement frame comprises: receiving, in one or more sub-elements of the fine timing measurement frame that are associated with the ranging measurement procedure, a sub-element that indicates the puncturing pattern.

Aspect 79: The method of aspect 78, wherein the sub-element includes an extremely high throughput (EHT) operation element of a beacon frame of a basic serving set (BSS) to which the first device belongs.

Aspect 80: The method of aspect 78, wherein the sub-element includes a format exclusively associated with indicating the puncturing pattern, or the sub-element includes a bitmap to be used for indicating the puncturing pattern.

Aspect 81: The method of any of aspects 75 through 80, wherein receiving the fine timing measurement frame comprises: receiving, in one or more sub-elements of the fine timing measurement frame that are associated with the ranging measurement procedure, a sub-element that indicates a transmission power envelope associated with the ranging NDPs, wherein a transmit power configuration indicated by the transmission power envelope is associated with the bandwidth of the ranging NDPs being greater than 160 MHz.

Aspect 82: The method of any of aspects 75 through 81, further comprising: receiving, from the first device, one or more session update messages associated with one or both of an updated bandwidth for the ranging NDPs and an updated puncturing pattern for the ranging NDPs; transmitting, to the first device, a second set of one or more ranging NDPs based at least in part on the updated bandwidth and the updated puncturing pattern; and determining, based at least in part on the second set of one or more ranging NDPs, an updated distance between the first device and the second device.

Aspect 83: The method of aspect 82, further comprising: transmitting, to the first device, a second fine timing measurement request frame that indicates one or both of the updated bandwidth of the ranging NDPs and the updated puncturing pattern for the ranging NDPs based at least in part on the one or more session update messages being associated with a session termination; and receiving, from the first device, a second fine timing measurement frame that acknowledges one or both of the updated bandwidth of the ranging NDPs and the updated puncturing pattern for the ranging NDPs.

Aspect 84: The method of any of aspects 75 through 83, wherein receiving the fine timing measurement frame comprises: receiving the acknowledgement of one or both of the bandwidth and the puncturing pattern via a format and bandwidth field of the fine timing measurement frame.

Aspect 85: The method of any of aspects 75 through 84, further comprising: receiving, from the first device, a second set of one or more ranging NDPs based at least in part on the bandwidth and the puncturing pattern, wherein a distance between the first device and the second device is based at least in part on a round-trip time associated with the first set of one or more ranging NDPs and the second set of one or more ranging NDPs.

Aspect 86: The method of any of aspects 75 through 85, wherein the bandwidth of the ranging NDPs is 320 MHz.

Aspect 87: A method for wireless communications, comprising: generating, for a ranging measurement procedure between a first device and a second device, a sequence of pseudo-random octets associated with one or more ranging NDPs, a bandwidth of the one or more ranging NDPs being greater than 160 MHz; segmenting the sequence of pseudo-random octets into a plurality of sequence segments based at least in part on the bandwidth of the one or more ranging NDPs and an indication of a presence of a puncturing pattern that is associated with the bandwidth of the one or more ranging NDPs being greater than 160 MHz; receiving, from the first device, the one or more ranging NDPs based at least in part on segmenting the sequence of pseudo-random octets into the plurality of sequence segments; and determining, based at least in part on measurements of the one or more ranging NDPs, a distance between the first device and the second device.

Aspect 88: The method of aspect 87, wherein segmenting the sequence of pseudo-random octets into the plurality of sequence segments comprises inputting the sequence of pseudo-random octets into a segment parser to obtain a quantity of pseudo-random outputs equal to a quantity of the plurality of sequence segments, the segment parser being based at least in part on the bandwidth and the puncturing pattern, and receiving the one or more ranging NDPs comprises receiving, for each of the quantity of pseudo-random outputs, information of an output of the quantity of pseudo-random outputs over frequency domain tones of a respective sequence segment of the plurality of sequence segments.

Aspect 89: The method of aspect 88, wherein the bandwidth is of a first value, and a sequence segment bandwidth of each of the plurality of sequence segments is a second value that is evenly divisible into the first value.

Aspect 90: The method of any of aspects 88 through 89, wherein segmenting the sequence of pseudo-random octets into the plurality of sequence segments comprises: segmenting, using the segment parser, the sequence of pseudo-random octets into four sequence segments based at least in part on the puncturing pattern corresponding to a lack of puncturing.

Aspect 91: The method of aspect 90, wherein the bandwidth of the one or more ranging NDPs is 320 MHz, and the four sequence segments are allocated to frequency domain tones of respective 80 MHz segments of the 320 MHz.

Aspect 92: The method of any of aspects 88 through 89, wherein segmenting the sequence of pseudo-random octets into the plurality of sequence segments comprises: segmenting, using the segment parser, the sequence of pseudo-random octets into three sequence segments based at least in part on the puncturing pattern corresponding to an 80 MHz puncturing.

Aspect 93: The method of aspect 92, wherein the bandwidth of the one or more ranging NDPs is 320 MHz, and the three sequence segments are allocated to frequency domain tones of respective 80 MHz segments of the 320 MHz, and one 80 MHz segment of the 320 MHz is punctured in accordance with the puncturing pattern corresponding to the 80 MHz puncturing.

Aspect 94: The method of aspect 88, wherein the bandwidth is of a first value, and a first sequence segment bandwidth of each of a first subset of the plurality of sequence segments is a second value that is evenly divisible into the first value, and a second sequence segment bandwidth of each of a second subset of the plurality of sequence segments is a third value that is evenly divisible into the second value.

Aspect 95: The method of any of aspects 88 or 94, wherein segmenting the sequence of pseudo-random octets into the plurality of sequence segments comprises: segmenting, using the segment parser, the sequence of pseudo-random octets into four sequence segments based at least in part on the puncturing pattern corresponding to a 40 MHz puncturing.

Aspect 96: The method of aspect 95, wherein the bandwidth of the one or more ranging NDPs is 320 MHz, and three of the four sequence segments are allocated to frequency domain tones of respective 80 MHz segments of the 320 MHz, and a first portion of a remaining sequence segment is allocated to frequency domain tones of a 40 MHz segment of the 320 MHz and a second portion of the remaining sequence segment is dropped.

Aspect 97: The method of any of aspects 87 through 96, further comprising: transmitting, to the first device, a second set of one or more ranging NDPs based at least in part on the bandwidth and the puncturing pattern, wherein determining the distance between the first device and the second device is based at least in part on a round-trip time associated with the first set of one or more ranging NDPs and the second set of one or more ranging NDPs.

Aspect 98: The method of any of aspects 87 through 97, wherein the one or more ranging NDPs include a packet extension field of eight microseconds based at least in part on the bandwidth of the one or more ranging NDPs being greater than 160 MHz.

Aspect 99: An apparatus for wireless communication at a first device, comprising a processor; memory coupled with the processor; and instructions stored in the memory and executable by the processor to cause the apparatus to perform a method of any of aspects 1 through 13.

Aspect 100: An apparatus for wireless communication at a first device, comprising at least one means for performing a method of any of aspects 1 through 13.

Aspect 101: A non-transitory computer-readable medium storing code for wireless communication at a first device, the code comprising instructions executable by a processor to perform a method of any of aspects 1 through 13.

Aspect 102: An apparatus for wireless communication at a first device, comprising a processor; memory coupled with the processor; and instructions stored in the memory and executable by the processor to cause the apparatus to perform a method of any of aspects 14 through 24.

Aspect 103: An apparatus for wireless communication at a first device, comprising at least one means for performing a method of any of aspects 14 through 24.

Aspect 104: A non-transitory computer-readable medium storing code for wireless communication at a first device, the code comprising instructions executable by a processor to perform a method of any of aspects 14 through 24.

Aspect 105: An apparatus for wireless communication at a first device, comprising a processor; memory coupled with the processor; and instructions stored in the memory and executable by the processor to cause the apparatus to perform a method of any of aspects 25 through 38.

Aspect 106: An apparatus for wireless communication at a first device, comprising at least one means for performing a method of any of aspects 25 through 38.

Aspect 107: A non-transitory computer-readable medium storing code for wireless communication at a first device, the code comprising instructions executable by a processor to perform a method of any of aspects 25 through 38.

Aspect 108: An apparatus for wireless communication at a first device, comprising a processor; memory coupled with the processor; and instructions stored in the memory and executable by the processor to cause the apparatus to perform a method of any of aspects 39 through 50.

Aspect 109: An apparatus for wireless communication at a first device, comprising at least one means for performing a method of any of aspects 39 through 50.

Aspect 110: A non-transitory computer-readable medium storing code for wireless communication at a first device, the code comprising instructions executable by a processor to perform a method of any of aspects 39 through 50.

Aspect 111: An apparatus for wireless communications, comprising a processor; memory coupled with the processor; and instructions stored in the memory and executable by the processor to cause the apparatus to perform a method of any of aspects 51 through 63.

Aspect 112: An apparatus for wireless communications, comprising at least one means for performing a method of any of aspects 51 through 63.

Aspect 113: A non-transitory computer-readable medium storing code for wireless communications, the code comprising instructions executable by a processor to perform a method of any of aspects 51 through 63.

Aspect 114: An apparatus for wireless communications, comprising a processor; memory coupled with the processor; and instructions stored in the memory and executable by the processor to cause the apparatus to perform a method of any of aspects 64 through 74.

Aspect 115: An apparatus for wireless communications, comprising at least one means for performing a method of any of aspects 64 through 74.

Aspect 116: A non-transitory computer-readable medium storing code for wireless communications, the code comprising instructions executable by a processor to perform a method of any of aspects 64 through 74.

Aspect 117: An apparatus for wireless communications, comprising a processor; memory coupled with the processor; and instructions stored in the memory and executable by the processor to cause the apparatus to perform a method of any of aspects 75 through 86.

Aspect 118: An apparatus for wireless communications, comprising at least one means for performing a method of any of aspects 75 through 86.

Aspect 119: A non-transitory computer-readable medium storing code for wireless communications, the code comprising instructions executable by a processor to perform a method of any of aspects 75 through 86.

Aspect 120: An apparatus for wireless communications, comprising a processor; memory coupled with the processor; and instructions stored in the memory and executable by the processor to cause the apparatus to perform a method of any of aspects 87 through 98.

Aspect 121: An apparatus for wireless communications, comprising at least one means for performing a method of any of aspects 87 through 98.

Aspect 122: A non-transitory computer-readable medium storing code for wireless communications, the code comprising instructions executable by a processor to perform a method of any of aspects 87 through 98.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the WLAN 100 and the wireless communications system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first device, comprising:
   one or more processors; and
   one or more memories coupled with the one or more processors and that store processor-executable code that, when executed by the one or more processors, is configured to cause the apparatus to:
      receive a physical layer protocol data unit (PPDU) that includes a ranging null data packet announcement (NDPA) frame, wherein the PPDU includes an indication of a bandwidth of ranging null data packets (NDPs) to be used for a ranging measurement procedure between the first device and a second device, the bandwidth of the ranging NDPs being greater than 160 megahertz (MHz), and an indication of a puncturing pattern that is associated with the bandwidth of the ranging NDPs being greater than 160 MHZ, and
      receive a first set of one or more ranging NDPs based at least in part on the indication of the bandwidth and the indication of the puncturing pattern that is associated with the bandwidth of the ranging NDPs being greater than 160 MHz,
      wherein a distance between the first device and the second device is based at least in part on measurements made of the first set of one or more ranging NDPs.

2. The apparatus of claim 1, wherein, to receive the indication of the bandwidth of the ranging NDPs, the processor-executable code, when executed by the one or more processors, is configured to cause the apparatus to:
   receive the indication of the bandwidth via a bandwidth (BW) field in a universal signal (U-SIG) field of the PPDU.

3. The apparatus of claim 2, wherein:
   the PPDU is an extremely high throughput multi-user PPDU (EHT MU PPDU); and
   the U-SIG field is located in a physical preamble portion of the EHT MU PPDU.

4. The apparatus of claim 1, wherein, to receive the indication of the bandwidth of the ranging NDPs, the processor-executable code, when executed by the one or more processors, is configured to cause the apparatus to:
   receive the indication of the bandwidth via a bit in a SERVICE field of the PPDU.

5. The apparatus of claim 4, wherein:
   the PPDU is a non-high throughput duplicate PPDU (non-HT duplicate PPDU); and
   the bit is a seventh bit in the SERVICE field and is set to a one value to indicate the bandwidth of the ranging NDPs.

6. The apparatus of claim 1, wherein the processor-executable code, when executed by the one or more processors, is configured to cause the apparatus to:
   receive, in one or more of a beacon frame, a fine timing measurement request frame, or a fine timing measurement frame, a message that indicates a configuration of the puncturing pattern for the ranging NDPs.

7. The apparatus of claim 1, wherein the processor-executable code, when executed by the one or more processors, is configured to cause the apparatus to:
   receive, in the ranging NDPA frame including the indication of the bandwidth of the ranging NDPs, a message that indicates a dynamic configuration of the puncturing pattern for the ranging NDPs.

8. The apparatus of claim 7, wherein the processor-executable code, when executed by the one or more processors, is configured to cause the apparatus to:
   apply the puncturing pattern that is associated with the bandwidth of the ranging NDPs to the first set of one or more ranging NDPs; and
   apply a different puncturing pattern to other ranging NDPs outside of the first set of one or more ranging NDPs.

9. The apparatus of claim 7, wherein:
   the indication of the puncturing pattern that is associated with the bandwidth is received in an association identifier subfield of a station (STA) information field of the ranging NDPA frame; and
   the ranging NDPA frame is transmitted in a non-high throughput duplicate PPDU (non-HT duplicate PPDU).

10. The apparatus of claim 1, wherein the processor-executable code, when executed by the one or more processors, is configured to cause the apparatus to:
    transmit a second set of one or more ranging NDPs based at least in part on the bandwidth and the indication of the puncturing pattern, wherein determining the distance between the first device and the second device is based at least in part on a round-trip time associated with the first set of one or more ranging NDPs and the second set of one or more ranging NDPs.

11. The apparatus of claim 1, wherein the PPDU includes, in a physical layer service data unit (PSDU) portion of the PPDU, the ranging NDPA frame including an NDP announcement variant subfield, the NDP announcement variant subfield including a first bit set to a zero value and a second bit set to a one value.

12. The apparatus of claim 1, wherein the processor-executable code, when executed by the one or more processors, is configured to cause the apparatus to:
    perform a radio frequency sensing based at least in part on the first set of one or more ranging NDPs to obtain channel state information of a local environment.

13. The apparatus of claim 1, wherein the bandwidth of the ranging NDPs is 320 MHz.

14. An apparatus for wireless communications at a first device, comprising:
one or more processors; and
one or more memories coupled with the one or more processors and that store processor-executable code that, when executed by the one or more processors, is configured to cause the apparatus to:
transmit a physical layer protocol data unit (PPDU) that includes a ranging null data packet announcement (NDPA) frame, wherein the PPDU includes an indication of a bandwidth of ranging null data packets (NDPs) to be used for a ranging measurement procedure between the first device and a second device, the bandwidth of the ranging NDPs being greater than 160 megahertz (MHz), and an indication of a puncturing pattern that is associated with the bandwidth of the ranging NDPs being greater than 160 MHZ; and
transmit a first set of one or more ranging NDPs based at least in part on the indication of the bandwidth and the indication of the puncturing pattern that is associated with the bandwidth of the ranging NDPs being greater than 160 MHz,
wherein a distance between the first device and the second device is based at least in part on the first set of one or more ranging NDPs.

15. The apparatus of claim 14, wherein, to transmit the indication of the bandwidth of the ranging NDPs, the processor-executable code, when executed by the one or more processors, is configured to cause the apparatus to:
transmit the indication of the bandwidth via a bandwidth (BW) field in a universal signal (U-SIG) field of the PPDU.

16. The apparatus of claim 15, wherein:
the PPDU is an extremely high throughput multi-user PPDU (EHT MU PPDU); and
the U-SIG field is located in a physical preamble portion of the EHT MU PPDU.

17. The apparatus of claim 14, wherein, to transmit the indication of the bandwidth of the ranging NDPs, the processor-executable code, when executed by the one or more processors, is configured to cause the apparatus to:
transmit the indication of the bandwidth via a bit in a SERVICE field of the PPDU.

18. The apparatus of claim 17, wherein:
the PPDU is a non-high throughput duplicate PPDU (non-HT duplicate PPDU); and
the bit is a seventh bit in the SERVICE field and is set to a one value to indicate the bandwidth of the ranging NDPs.

19. The apparatus of claim 14, wherein the processor-executable code, when executed by the one or more processors, is configured to cause the apparatus to:
transmit, in one or more of a beacon frame, a fine timing measurement request frame, or a fine timing measurement frame, a message that indicates a configuration of the puncturing pattern for the ranging NDPs.

20. The apparatus of claim 14, wherein the processor-executable code, when executed by the one or more processors, is configured to cause the apparatus to:
transmit, in the ranging NDPA frame including the indication of the bandwidth of the ranging NDPs, a message that indicates a dynamic configuration of the puncturing pattern for the ranging NDPs.

21. The apparatus of claim 20, wherein the processor-executable code, when executed by the one or more processors, is configured to cause the apparatus to:
apply the puncturing pattern that is associated with the bandwidth of the ranging NDPs to the first set of one or more ranging NDPs; and
apply a different puncturing pattern to other ranging NDPs outside of the first set of one or more ranging NDPs.

22. The apparatus of claim 20, wherein:
the indication of the puncturing pattern that is associated with the bandwidth is transmitted in an association identifier subfield of a station (STA) information field of the ranging NDPA frame; and
the ranging NDPA frame is transmitted in a non-high throughput duplicate PPDU (non-HT duplicate PPDU).

23. The apparatus of claim 14, wherein the processor-executable code, when executed by the one or more processors, is configured to cause the apparatus to:
receive a second set of one or more ranging NDPs based at least in part on the bandwidth and the indication of the puncturing pattern, wherein determining the distance between the first device and the second device is based at least in part on a round-trip time associated with the first set of one or more ranging NDPs and the second set of one or more ranging NDPs.

24. The apparatus of claim 14, wherein the PPDU includes, in a physical layer service data unit (PSDU) portion of the PPDU, the ranging NDPA frame including an NDP announcement variant subfield, the NDP announcement variant subfield including a first bit set to a zero value and a second bit set to a one value.

25. The apparatus of claim 14, wherein the processor-executable code, when executed by the one or more processors, is configured to cause the apparatus to:
perform a radio frequency sensing based at least in part on the first set of one or more ranging NDPs to obtain channel state information of a local environment.

26. The apparatus of claim 14, wherein the bandwidth of the ranging NDPs is 320 MHz.

27. A method for wireless communication at a first device, comprising:
receiving a physical layer protocol data unit (PPDU) that includes a ranging null data packet announcement (NDPA) frame, wherein the PPDU includes an indication of a bandwidth of ranging null data packets (NDPs) to be used for a ranging measurement procedure between the first device and a second device, the bandwidth of the ranging NDPs being greater than 160 megahertz (MHz), and an indication of a puncturing pattern that is associated with the bandwidth of the ranging NDPs being greater than 160 MHz; and
receiving a first set of one or more ranging NDPs based at least in part on the indication of the bandwidth and the indication of the puncturing pattern that is associated with the bandwidth of the ranging NDPs being greater than 160 MHz,
wherein a distance between the first device and the second device is based at least in part on measurements made of the first set of one or more ranging NDPs.

28. The method of claim 27, wherein receiving the indication of the bandwidth of the ranging NDPs comprises:
receiving the indication of the bandwidth via a bit in a SERVICE field of the PPDU.

29. A method for wireless communications at a first device, comprising:
transmitting a physical layer protocol data unit (PPDU) that includes a ranging null data packet announcement (NDPA) frame, wherein the PPDU includes an indication of a bandwidth of ranging null data packets (NDPs) to be used for a ranging measurement procedure between the first device and a second device, the bandwidth of the ranging NDPs being greater than 160 megahertz (MHz), and an indication of a puncturing pattern that is associated with the bandwidth of the ranging NDPs being greater than 160 MHz; and transmitting a first set of one or more ranging NDPs based at least in part on the indication of the bandwidth and the indication of the puncturing pattern that is associated with the bandwidth of the ranging NDPs being greater than 160 MHz, wherein a distance between the first device and the second device is based at least in part on the first set of one or more ranging NDPs.

30. The method of claim 29, wherein transmitting the indication of the bandwidth of the ranging NDPs comprises:

transmitting the indication of the bandwidth via a bit in a SERVICE field of the PPDU.

* * * * *